United States Patent
Inomata et al.

(10) Patent No.: US 8,359,440 B2
(45) Date of Patent: Jan. 22, 2013

(54) MANAGEMENT SERVER DEVICE FOR MANAGING VIRTUAL STORAGE DEVICE, AND METHOD FOR MANAGING VIRTUAL STORAGE DEVICE

(75) Inventors: Hirofumi Inomata, Tokyo (JP); Tomoki Sekiguchi, Sagamihara (JP); Futoshi Haga, Sagamihara (JP); Machiko Asaie, Koshigaya (JP); Takayuki Nagai, Machida (JP); Norio Shimozono, Machida (JP)

(73) Assignee: Hitachi, Ltd., Tokyo (JP)

( * ) Notice: Subject to any disclaimer, the term of this patent is extended or adjusted under 35 U.S.C. 154(b) by 783 days.

(21) Appl. No.: 12/501,854

(22) Filed: Jul. 13, 2009

(65) Prior Publication Data
US 2010/0274984 A1 Oct. 28, 2010

(30) Foreign Application Priority Data
Apr. 22, 2009 (JP) ................................ 2009-103536

(51) Int. Cl.
*G06F 12/00* (2006.01)
(52) U.S. Cl. ........ 711/162; 711/161; 711/165; 711/154; 711/170; 711/E12.002; 711/E12.084
(58) Field of Classification Search .................. 711/154, 711/161, 162, 165, 170, E12.002, E12.084
See application file for complete search history.

(56) References Cited

PUBLICATIONS

Brocade Fabric OS, Storage Area Network, The Platform for Intelligent SAN Fabrics, San Data Sheet, Online, Searched on Mar. 24, 2009, 4 Sheets, URL:http://www.brocade.com/downloads/documents/data_sheets/product_data_sheets/FabricOS_DS_09.pdf.
NPIV Functionality Profile, Presentation #T11/02-340v1, Textt # T11/02-338v1, Aug. 5, 2002, Online, Searched on Mar. 24, 2009, 7 Sheets, URL:http://www.t11.org/ftp/t11/pub/fc/da/02-340v1.pdf.
VMware, VMware Storage vMotion, Non-Disruptive, Live Migration of Virtual Machine Storage, Online, Searched on Mar. 24, 2009, 2 Sheets, URL:http://www.vmware.com/files/pdf/storage_vmotion_datasheet.pdf.

*Primary Examiner* — Midys Rojas
(74) *Attorney, Agent, or Firm* — Foley & Lardner LLP

(57) ABSTRACT

The computer system has a plurality of physical server devices, a plurality of physical storage devices, and a management server device, and when migrating at least one of a plurality of first virtual server devices to another physical server device, the management server device compares at least one physical server device in which the plurality of first virtual server devices are disposed after the migration, with at least one physical server device in which a plurality of second virtual server devices are disposed, to calculate a first evaluation value, and also compares at least one physical server device in which the plurality of first virtual server devices are disposed after the migration, with at least one physical server device in which a plurality of third virtual server devices are disposed, to calculate a second evaluation value. Based on the first evaluation value and the second evaluation value, the management server device issues an instruction to migrate the first virtual storage device to the other physical storage device.

15 Claims, 57 Drawing Sheets

VIRTUAL SYSTEM CONFIGURATION INFORMATION

| SYSTEM IDENTIFI CATION INFORMA TION | VIRTUAL SERVER DEVICE IDENTIFI CATION INFORMA TION | PHYSICAL SERVER DEVICE IDENTIFI CATION INFORMA TION | VIRTUAL HBA IDENTIFI CATION INFORMA TION | VIRTUAL STORAGE DEVICE IDENTIFI CATION INFORMA TION | VIRTUAL STORAGE DEVICE LU IDENTIFI CATION INFORMA TION |
|---|---|---|---|---|---|
| A | 1-1 | 1 | i1-1 | t1-1 | 0 |
| A | 1-2 | 1 | i1-2 | t1-2 | 1 |
| ... | ... | ... | ... | ... | ... |
| B | 2-1 | 2 | i2-1 | t1-1 | 1 |
| B | 2-2 | 2 | i2-2 | t1-2 | 0 |

SYSTEM OPERATING STATE INFORMATION

| SYSTEM IDENTIFICATION INFORMATION | VIRTUAL SERVER DEVICE IDENTIFICATION INFORMATION | VIRTUAL SERVER DEVICE OPERATING STATE |
|---|---|---|
| A | 1-1 | STOPPED |
| A | 2-1 | STOPPED |
| B | 1-2 | STOPPED |
| B | 2-2 | STOPPED |
| ... | ... | ... |

170200
VIRTUAL SERVER DEVICE CONFIGURATION INFORMATION

| VIRTUAL STORAGE DEVICE IDENTIFICATION INFORMATION | VIRTUAL SERVER DEVICE IDENTIFICATION INFORMATION | PHYSICAL SERVER DEVICE IDENTIFICATION INFORMATION |
|---|---|---|
| t1-1 | 1-1 | 1 |
| t1-2 | 2-1 | 2 |
| t1-1 | 1-2 | 1 |
| t1-2 | 2-2 | 2 |
| ... | ... | ... |

VIRTUAL STORAGE DEVICE CONFIGURATION INFORMATION

| VIRTUAL STORAGE DEVICE IDENTIFICATION INFORMATION | PHYSICAL STORAGE DEVICE IDENTIFICATION INFORMATION | VIRTUAL SAN IDENTIFICATION INFORMATION | OPERATING STATE |
|---|---|---|---|
| t1-1 | 1 | A | ACTIVE |
| t1-2 | 1 | B | INACTIVE |
| ... | ... | ... | ... |

PHYSICAL STORAGE DEVICE INFORMATION 170202

| PHYSICAL STORAGE DEVICE IDENTIFICATION INFORMATION | ASSIGNMENT ORDER | THE MAXIMUM NUMBER OF VIRTUAL STORAGE DEVICES TO BE HOUSED | THE NUMBER OF VIRTUAL STORAGE DEVICES TO BE HOUSED | THE MAXIMUM NUMBER OF ACTIVE VIRTUAL STORAGE DEVICES | THE NUMBER OF ACTIVE VIRTUAL STORAGE DEVICES |
|---|---|---|---|---|---|
| 1 | 1 | 30 | 15 | 10 | 5 |
| 2 | 2 | 30 | 5 | 10 | 0 |
| 3 | 3 | 15 | 10 | 5 | 2 |
| ... | ... | ... | ... | ... | ... |
| 350101 | 350102 | 350103 | 350104 | 350105 | 350106 |

VIRTUAL STORAGE DEVICE ASSIGNMENT NEXT
CANDIDATE INFORMATION

| NEXT CANDIDATE |
|---|
| 2 |

EVALUATION RESULT 380100

| VIRTUAL STORAGE DEVICE IDENTIFI CATION INFORMA TION | EVALUATION VALUE (CORRE LATION DEGREE) | PHYSICAL STORAGE DEVICE IDENTIFI CATION INFORMA TION | THE NUMBER OF REMAINING ACTIVE VIRTUAL STORAGES |
|---|---|---|---|
| t1-1 | 0 | 1 | 5 |
| t1-2 | 0 | 1 | 5 |
| ... | 0 | 1 | 5 |
| t2-1 | 1 | 2 | 10 |
| t2-2 | 0.5 | 2 | 10 |
| ... | ... | ... | ... |

380101   380102   380103   380104

EXAMPLE OF COMPUTING CORRELATION DEGREE (VS1, VS2)

$$cor(vs1, vs2) = \frac{\sum_{ps1}(Vm(vs1, ps1) \cdot Vm(vs2, ps1))}{Max(\sum_{ps2} Vm(vs1, ps2), \sum Vm(vs2, ps3))}$$

HOWEVER,
  vs, vs1, vs2 ∈ CONSOLIDATION {VIRTUAL STORAGE DEVICE}
  ps, ps1, ps2, ps3 ∈ CONSOLIDATION {PHYSICAL SERVER DEVICE}

$Vm(vs, ps) = \begin{cases} 1, & \text{IF (VIRTUAL SERVER DEVICE USING VIRTUAL STORAGE vs EXISTS IN PHYSICAL SERVER DEVICE ps)} \\ 0, & \text{IF (OTHER THAN THE ABOVE))} \end{cases}$

WORK AREA

TABLE "RELOCATION DESTINATION ADVICE"

| MAXIMUM EVALUATION VALUE | PHYSICAL STORAGE DEVICE IDENTIFI CATION INFORMATION | THE NUMBER OF VIRTUAL STORAGE DEVICES TO BE HOUSED | THE NUMBER OF REMAINING ACTIVE VIRTUAL STORAGE DEVICES |
|---|---|---|---|
| 1 | 2 | 5 | 10 |
| 0.5 | 3 | 15 | 3 |
| 0 | 1 | 5 | 5 |
| ... | ... | ... | ... |

390101  390102  390103  390104

WORK AREA

FIG. 29

DISPLAYED LIST "RELOCATION DESTINATION ADVICE FOR VIRTUAL STORAGE 1-2"

| MAXIMUM EVALUATION VALUE | PHYSICAL STORAGE DEVICE IDENTIFI CATION INFORMATION | THE NUMBER OF REMAINING HOUSED VIRTUAL STORAGE DEVICES | THE NUMBER OF REMAINING ACTIVE VIRTUAL STORAGE DEVICES |
|---|---|---|---|
| 1 | 2 | 5 | 10 |
| 0.5 | 3 | 15 | 3 |
| 0 | 1 | 5 | 5 |
| ... | ... | ... | ... |

SCREEN-DISPLAYED CONTENTS OF DISPLAY DEVICE OF STORAGE MANAGEMENT SERVER

FIG. 50
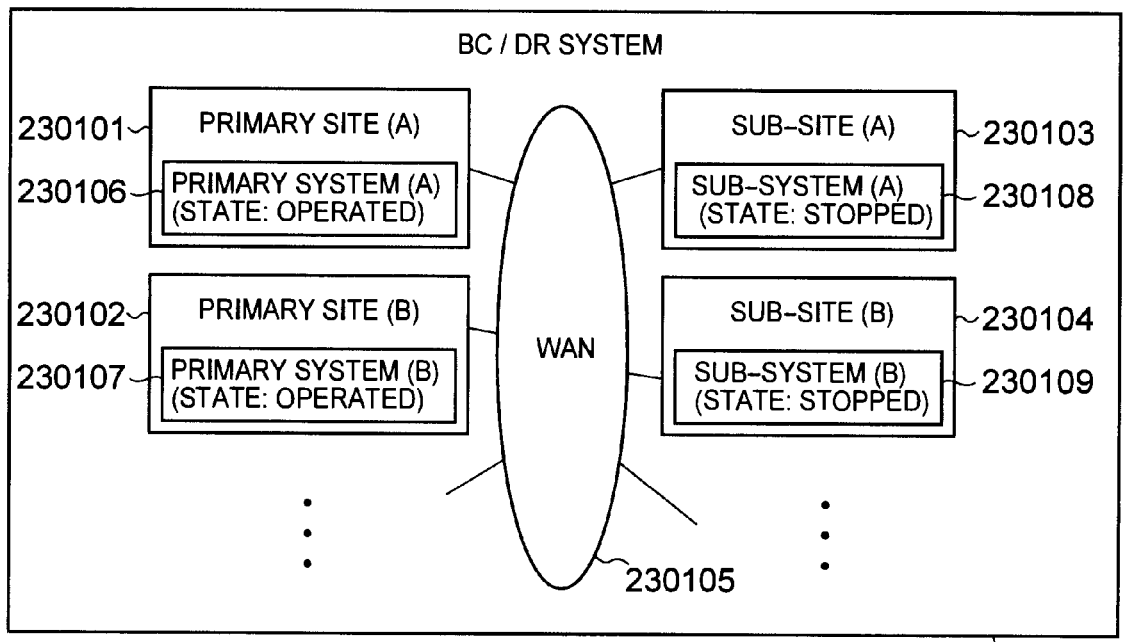
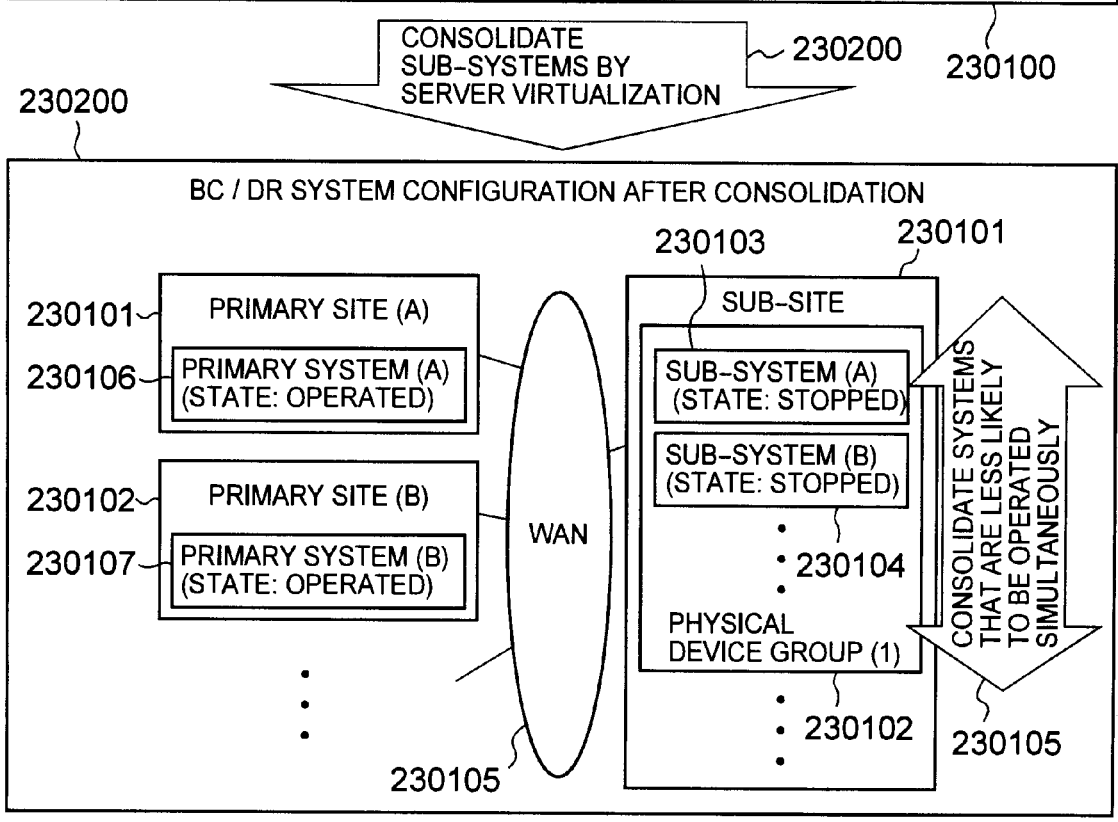

FIG. 53

TABLE "VIRTUAL STORAGE LU CONFIGURATION INFORMATION" 170204

| VIRTUAL STORAGE IDENTIFICATION INFORMATION | VIRTUAL STORAGE LU IDENTIFICATION INFORMATION | PHYSICAL STORAGE IDENTIFICATION INFORMATION | IDENTIFICATION INFORMATION ON STORAGE AREA OF PHYSICAL STORAGE |
|---|---|---|---|
| t1-1 | 0 | 1 | 25 |
| t1-2 | 1 | 1 | 44 |
| ... | ... | ... | ... |
| t5-2 | 1 | 1 | 44 |
| ... | ... | ... | ... |
| t2-1 | 0 | 2 | 2 |
| t2-2 | 1 | 2 | 66 |
| ... | ... | ... | ... |

610101   610102   610103   610104

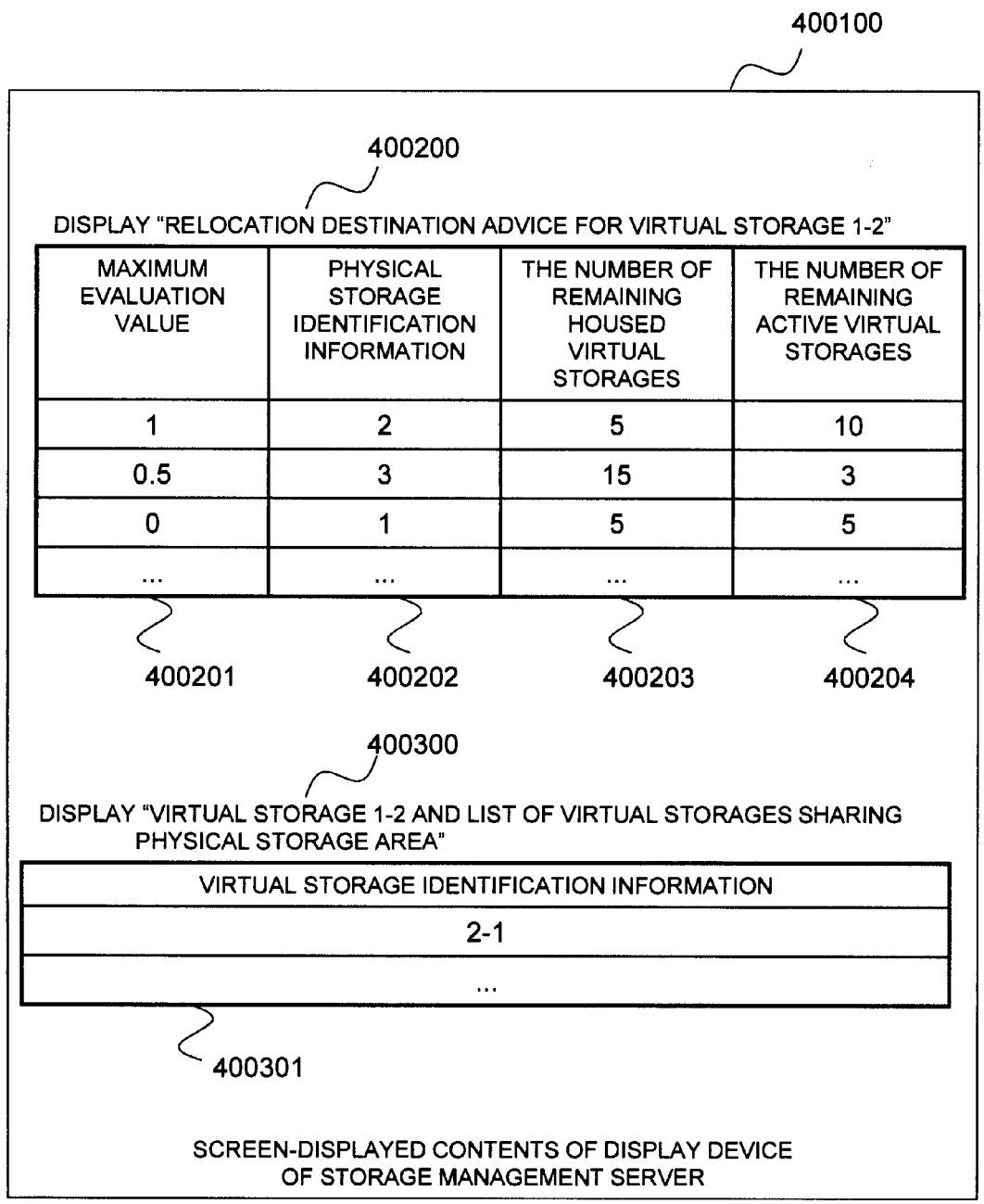

EXAMPLE OF COMPUTING CORRELATION DEGREE (VS1, VS2):

$$\mathrm{cor}(vs1, vs2) = \frac{\sum_{ps1} (Vm(vs1, ps1) \cdot Vm(vs2, ps1))}{\mathrm{Min}(\sum_{ps2} Vm(vs1, ps2), \sum_{ps3} Vm(vs2, ps3))}$$

HOWEVER,
  vs, vs1, vs2 ∈ CONSOLIDATION {VIRTUAL STORAGE DEVICE}
  ps, ps1, ps2, ps3 ∈ CONSOLIDATION {PHYSICAL SERVER DEVICE}

$$Vm(vs, ps) = \begin{cases} 1, & \text{if (VIRTUAL SERVER DEVICE USING VIRTUAL STORAGE vs EXISTS IN PHYSICAL SERVER DEVICE ps)} \\ 0, & \text{if (OTHER THAN THE ABOVE)} \end{cases}$$

MANAGEMENT SERVER DEVICE FOR MANAGING VIRTUAL STORAGE DEVICE, AND METHOD FOR MANAGING VIRTUAL STORAGE DEVICE

CROSS-REFERENCE TO PRIOR APPLICATION

This application relates to and claims the benefit of priority from Japanese Patent Application number 2009-103536, filed on Apr. 22, 2009 the entire disclosure of which is incorporated herein by reference.

BACKGROUND

The present invention generally relates to a management server device of a storage system and a method for managing the storage system. Particularly, the present invention relates to a management server device for managing a virtual storage device in a storage system having a virtualization function, as well as to a method for managing the virtual storage device.

A computer system is configured by a plurality of server devices, a plurality of storage devices, and various networks connecting these devices. A virtualization technology is applied to the server devices, the storage devices and the network equipment that configure the computer system, in order to improve the use efficiency of the physical resources.

Note that a server device virtualization technology provides a computer with one physical server device in the form of one or more virtual server devices. A storage device virtualization technology also provides a server device with one physical storage device in the form of one or more virtual storage devices.

Internet URL:http://www.t11.org/ftp/t11/pub/fc/da/02-340v1.pdf ([online] [Searched on Mar. 24, 2009]) discloses a protocol for accessing a fiber channel port (FCPort) of a storage device from a fiber channel host bus adopter (HBA) of a server device, wherein the access is made from a virtual HBA (v-HBA) of a virtual server device realized by the server device, to the storage device. Internet URL:http://www.t11.org/ftp/t11/pub/fc/da/02-340v1.pdf ([online] [Searched on Mar. 24, 2009]) also discloses a protocol for accessing, from the HBA of the server device, a virtual fiber channel port (v-FCPort) of a virtual storage device realized by the storage device. By using these protocols, the access can be made from the v-HBA of the virtual server device to the v-FCPort of the virtual storage device. Further, worldwide names (WWN) are assigned to the v-HBA and the v-FCPort. By assigning the WWNs, the v-HBA and the v-FCPort can be treated as physical HBA and FCPort in a storage device area network (SAN). Note that the SAN is a group of FC switches having one or more fiber channel switches (FC switches) connected. In addition, WWNs are identification information for uniquely identifying a connection source and a connection destination in the connection and communication on the SAN.

Internet URL:http://www.vmware.com/files/pdf/storage_vmotion_datasheet.pdf ([online] [Searched on Mar. 24, 2009]) discloses a method for migrating a disk volume (LU) used by a virtual server device to another storage device without stopping the virtual server device in a server device virtualization platform. Identification information (LU number and WWN of the FC port) used by the virtual server device to access a migration destination LU is changed as the LU is migrated. Due to the change of the identification information, access from the virtual server device cannot be made. The server device virtualization platform operates to convert the identification information without allowing the virtual server device to acknowledge it.

Internet <URL: http://www.brocade.com/downloads/documents/data_sheets/product_data_sheets/FabricOS_DS_09.pdf> ([online] [Searched on Mar. 24, 2009]) discloses a structure of an FC switch device that configures a SAN intermediating an access from a server device to a storage device, wherein the HBA of the server device and an FC port group of the storage device are managed and operated as independently developed virtual SANs (described as "LSAN" in this patent literature) for each group.

SUMMARY

A virtualization technology is applied to a server device or a storage device in order to improve the use efficiency of the physical resources of a computer system. The virtualization technology has a substantial effect on the improvement of the use efficiency of the physical resources. However, it is difficult to manage a virtual resource realized on the physical resources. Further, because a plurality of virtual resources are realized by one physical resource, an operational error occurs in the operation management of a few physical resources, eventually causing an impact on many IT systems. For this reason, when applying the virtualization technology to the physical resources of the computer system requiring high reliability, a method for managing the virtual resources is required for redeeming these disadvantages.

The computer system is configured by a plurality of server devices, a plurality of storage devices, a communication network (NW), and a SAN that intermediates access between the server devices and the storage devices. When applying the virtualization technology to the computer system, a virtualization technology is applied to each of the IT devices to realize the virtual resources. For example, "a virtual server device" is constructed in each "server device," "a virtual storage device" in each "storage device," "a virtual NW" in the "NW," and "a virtual SAN" in the "SAN." Here, the "virtual NW" is, for example, a VLAN (Virtual LAN).

When applying the virtualization technology to each of the IT devices configuring the computer system, the problem is that which one of the physical resources is used to dispose and construct the virtual resource of each IT device. In other words, selecting a location on the physical resource to dispose the virtual resource thereon (repository) is the problem. There are two selections in selecting a repository of the virtual resource: selecting a repository on a physical server device of the virtual server device, and selecting a repository on a physical storage device of the virtual storage device. When the repositories of the virtual server device and the virtual storage device are selected, the virtual NW and the virtual SAN are determined in accordance with the repositories.

It is necessary to select the repository of the virtual storage device on the physical storage device in consideration of the repository of the virtual server device on the physical server device. When applying the virtualization technology to each of the IT devices configuring the computer system, it is difficult to manage the repositories of the virtualized IT devices, and the management operation thereof is complicated. Therefore, the risk of the occurrence of operational errors increases.

From the perspective of business continuity/disaster recovery (BC/DR), in order to increase the business system (same as the IT system) availability in an extensive disaster, some companies build up a backup system in a distant backup site. The server device virtualization technology is capable of aggregating a plurality of backup systems and is expected to reduce the cost. The backup systems are required to not only improve the use efficiency by disposing an appropriate virtual resource, but also increase the reliability concerning the operation management.

A computer system for solving the problems described above has: a plurality of physical server devices, each of which provides a virtual server device; a plurality of physical storage devices, which are coupled to the plurality of physical server devices and each of which provides a virtual storage device; and a management server device, which is coupled to the plurality of physical storage devices and retains first configuration information relating to a plurality of first virtual server devices included in a first virtual system and disposed in at least one of the plurality of physical server devices and to a first virtual storage device included in the first virtual system and disposed in any of the plurality of physical storage devices, second configuration information relating to a plurality of second virtual server devices included in a second virtual system and disposed in at least one of the plurality of physical server devices and to a second virtual storage device included in the second virtual system and disposed in any of the plurality of physical storage devices, and third configuration information relating to a plurality of third virtual server devices included in a third virtual system and disposed in at least one of the plurality of physical server devices and to a third virtual storage device included in the third virtual system and disposed in any of the plurality of physical storage devices, wherein when migrating at least one of the plurality of first virtual server devices to another physical server device, the management server device refers to the first configuration information and the second configuration information and compares at least one physical server device in which the plurality of first virtual server devices are disposed after the migration, with at least one physical server device in which the plurality of second virtual server devices are disposed, to calculate a first evaluation value, and refers to the first configuration information and the third configuration information and compares at least one physical server device in which the plurality of first virtual server devices are disposed after the migration, with at least one physical server device in which the plurality of third virtual server devices are disposed, to calculate a second evaluation value, and wherein the management server device instructs the plurality of physical storage devices to migrate the first virtual storage device to another physical storage device, on the basis of the first evaluation value and the second evaluation value.

A management method for solving the problems described above is a management method of a management server device that manages a plurality of physical storage devices which are coupled to a plurality of physical server devices each providing a virtual server device, and each of which provides a virtual storage device, the management server device being coupled to the plurality of physical storage devices, wherein the management method has the steps of: retaining first configuration information relating to a plurality of first virtual server devices included in a first virtual system and disposed in at least one of the plurality of physical server devices and to a first virtual storage device included in the first virtual system and disposed in any of the plurality of physical storage devices, second configuration information relating to a plurality of second virtual server devices included in a second virtual system and disposed in at least one of the plurality of physical server devices and to a second virtual storage device included in the second virtual system and disposed in any of the plurality of physical storage devices, and third configuration information relating to a plurality of third virtual server devices included in a third virtual system and disposed in at least one of the plurality of physical server devices and to a third virtual storage device included in the third virtual system and disposed in any of the plurality of physical storage devices; when migrating at least one of the plurality of first virtual server devices to anther physical server device, referring to the first configuration information and the second configuration information and comparing at least one physical server device in which the plurality of first virtual server devices are disposed after the migration, with at least one physical server device in which the plurality of second virtual server devices are disposed, to calculate a first evaluation value; referring to the first configuration information and the third configuration information and comparing at least one physical server device in which the plurality of first virtual server devices are disposed after the migration, with at least one physical server device in which the plurality of third virtual server devices are disposed, to calculate a second evaluation value; and instructing the plurality of physical storage devices to migrate the first virtual storage device to another physical storage device, on the basis of the first evaluation value and the second evaluation value.

According to the present invention, the repositories of the virtual storage devices on the physical storage devices can be managed in accordance with the repositories of the virtual server devices on the physical server devices.

BRIEF DESCRIPTION OF THE DRAWINGS

FIG. 20 shows an example of virtual system configuration information according to Embodiment 1;

FIG. 21 shows an example of system operating state information according to Embodiment 1;

FIG. 22 shows an example of virtual server device configuration information according to Embodiment 1;

FIG. 23 shows an example of virtual storage device configuration information according Embodiment 1;

FIG. 24 shows an example of physical storage device information according to Embodiment 1;

FIG. 25 shows an example of virtual storage device assignment next candidate information according to Embodiment 1;

FIG. 27 shows an example of evaluation results retained by the work area according to Embodiment 1;

FIG. 28 shows an example of a relocation destination advice retained by the work area according to Embodiment 1;

FIG. 29 shows an example of an output device of the storage management server device according to Embodiment 1;

FIG. 50 shows an example of how sub-systems are consolidated in a duplexing system for an extensive disaster, according to Embodiment 1;

FIG. 53 shows an example of virtual storage device LU configuration information according to Embodiment 2;

FIG. 54 shows an example of an output device of a storage management server device according to Embodiment 2;

FIG. 55 shows an example of an evaluation formula according to Embodiment 1;

DETAILED DESCRIPTION OF THE EMBODIMENT

Hereinafter, embodiments for implementing the present invention are described with reference to the drawings.

<Embodiment 1>

Figure 1:
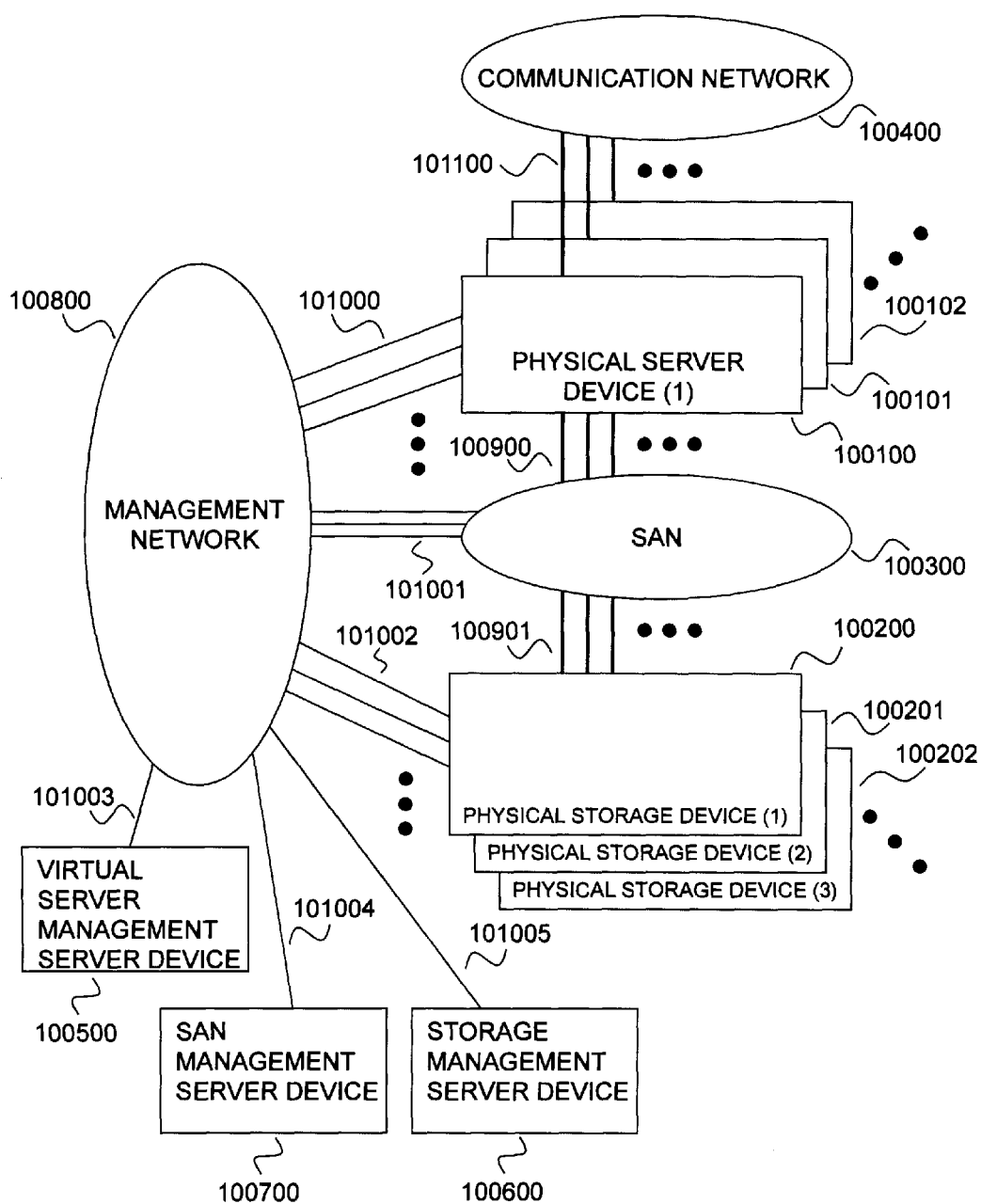
FIG. 1 shows an example of the entire configuration of a physical system according to Embodiment 1.

FIG. 1 shows an example of the entire configuration of a physical system according to Embodiment 1. The system of the present embodiment has physical server devices 100100 to 100102, physical storage devices 100200 to 100202, a communication network 100400, a storage area network (SAN) 100300, a management network 100800, a virtual server management server device 100500, a storage management server device 100600, a SAN management server device 100700, and data paths 100900, 100901, and 101000 to 101005 connecting these components.

The physical server devices 100100 to 100102 are described in detail with reference to FIG. 2.

The physical storage devices 100200 to 100202 are described in detail with reference to FIG. 4.

The communication network 100400 is, for example, a LAN or the Internet for performing IP communication, or other network for carrying out data communication between the server devices or with the outside.

The SAN 100300 is a network that interconnects the server devices and the storage devices and intermediates access made from the server devices to the storage devices via a fiber channel (FC) protocol. For example, one or more FC switch devices are interconnected to configure the SAN. Note that in the embodiments the SAN management server device manages the FC switch devices, for simplification of the explanation.

The management network 100800 is, for example, Ethernet™ for performing IP communication or other network that intermediates data communication for management and protection, among the virtual server management server device 100500, the SAN management server device 100700, the storage management server device 100600, the physical server device 100100, the FC switch devices configuring the SAN 100300, and the physical storage devices.

The virtual server management server device 100500 is described in detail with reference to FIG. 5.

The storage management server device 100600 is described in detail with reference to FIG. 7.

The SAN management server device 100700 is described in detail with reference to FIG. 9.

Figure 2:
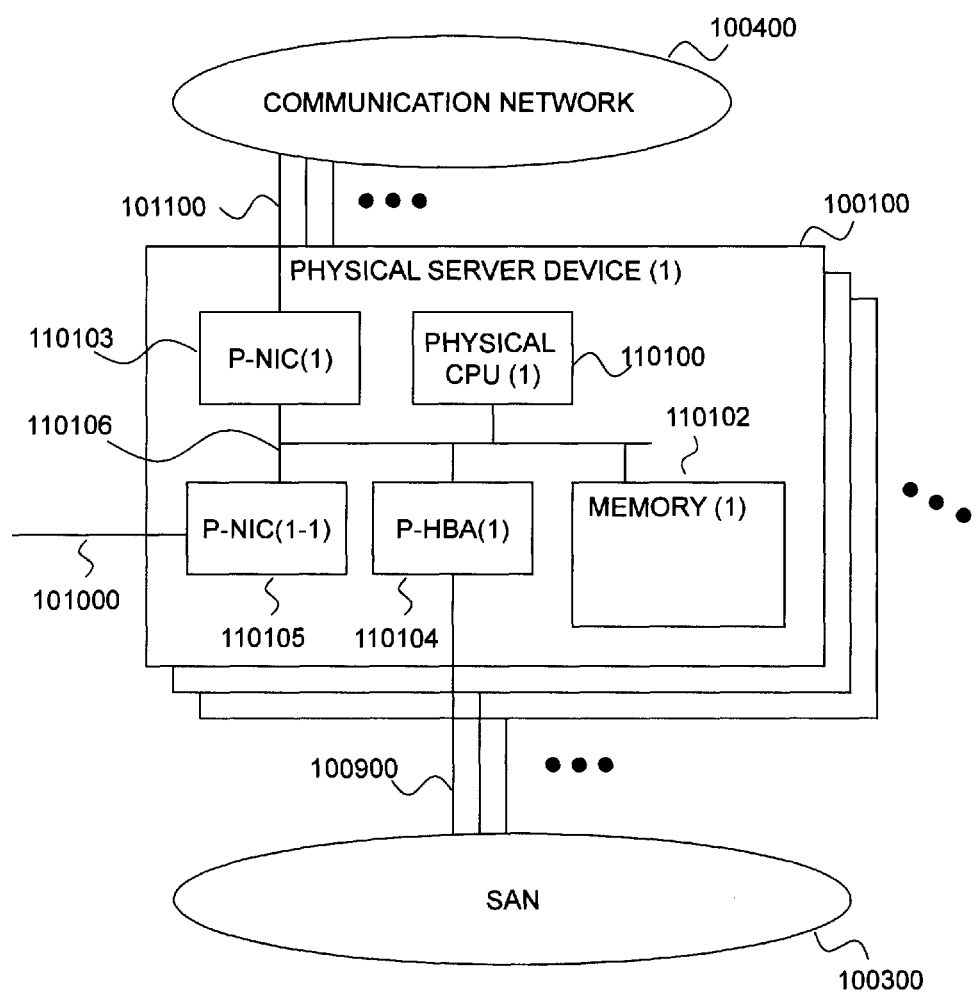
FIG. 2 shows an example of a physical configuration of a physical server device according to Embodiment 1.

FIG. 2 shows an example of a physical configuration of the physical server device (1) 100100 according to the present embodiment. The physical server device (1) 100100 has a physical CPU (1) 110100, a memory (1) 110102, a physical network interface card (p-NIC) (1) 110103, which is a physical interface connected to the communication network 100400, a physical Host Bus Adaptor (p-HBA) (1) 110104, which is a physical interface connected to the SAN 100300, a p-NIC (1) 110105, which is an interface connected to the management network 100800, and a data bus 110106 connecting these components. Note that the other physical server devices 100101 and 100102 described in the present embodiment also have the same configuration.

Figure 3:
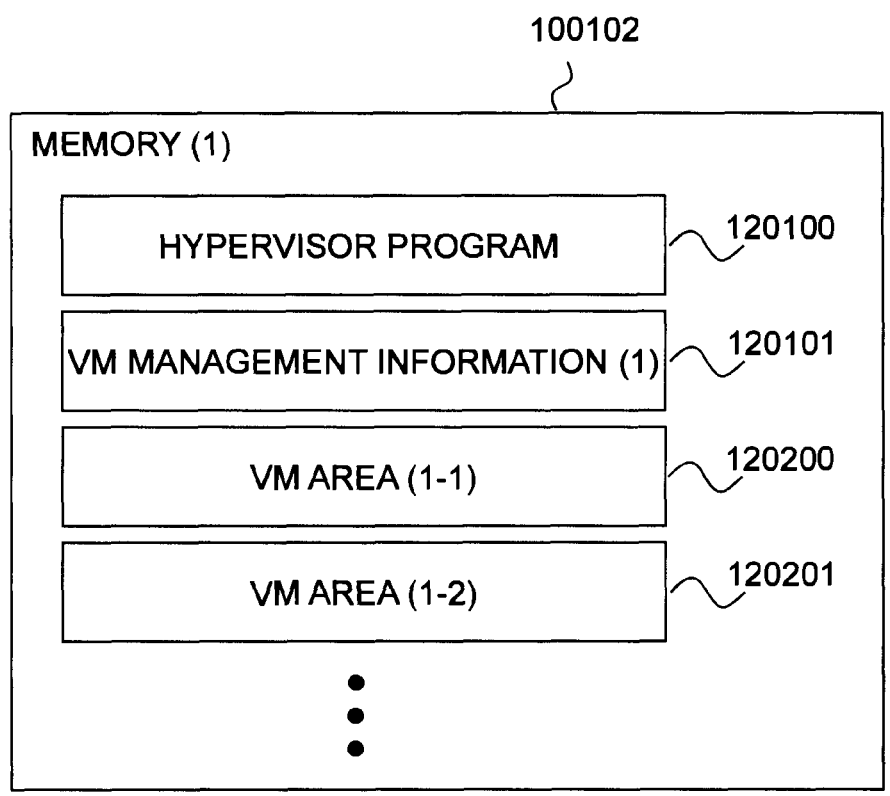
FIG. 3 shows an example of a configuration of data stored in a memory on the physical server device according to Embodiment 1.

FIG. 3 shows an example of a configuration of data stored in the memory (1) 110102 on the physical server device (1) 100100 according to the present embodiment. The memory (1) 110102 has a storage area that stores a hypervisor program 120100, VM management information (1) 120101, a VM area (1-1) 120200, and a VM area (1-2) 120201.

The hypervisor program 120100 is a program for realizing virtual server devices in the physical server device. The hypervisor program 120100 creates/deletes and activates/stops the virtual server devices in response to an instruction issued by the virtual server management server device 100500. Further, the hypervisor program 120100 relocates the virtual server devices in concert with another physical server device. In fact, the physical CPU 110100 executes the hypervisor program 120100 and thereby executes the operation for generating/deleting and activating/stopping the virtual server devices. The program is mainly described hereinafter, but the CPU serving as a processor for executing the program actually executes the program and performs the processing.

The VM management information (1) 120101, accessed mainly by the hypervisor program 120100, has information that manages the configuration or state for managing the virtual server devices.

The VM areas (1-1) 120200 to 120201 are each a storage area used as a virtual memory for configuring each virtual server device.

Figure 4:
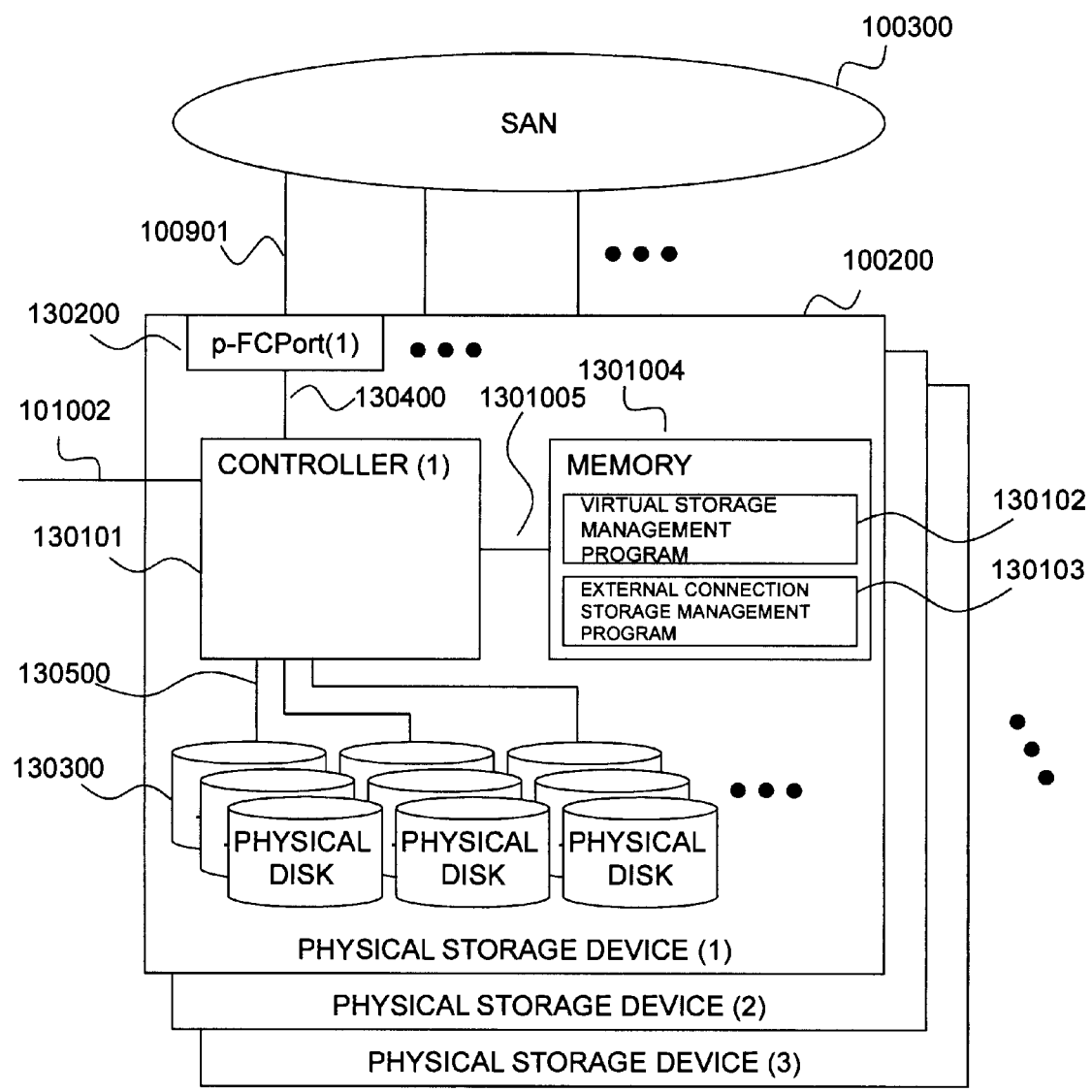
FIG. 4 shows an example of a configuration of a physical storage device according to Embodiment 1.

FIG. 4 shows an example of a configuration of the physical storage device (1) 100200 according to the present embodiment. Note that the other physical storage devices (2) and (3) of the present embodiment have the same configuration. The physical storage device (1) 100200 has a controller (1) 130101 for controlling the storage device, a memory 1301004 that retains program data for realizing the operation of the controller, a p-FCPort 130200, which is a fiber channel port connected to the SAN 100300, one or more physical disks 130300, and data paths 1301005, 130400 and 130500 connecting these components.

The controller (1) 130101 controls the storage device. The controller is configured by, for example, a microprocessor, a built-in microcomputer, a microprogram sequencer, or the like.

The memory 1301004 stores a virtual storage management program 130102 and external connection storage management program 130103 that are executed by the controller (1) 130101.

The virtual storage management program 130102 is a program for managing the virtual storage device realized by the physical storage device.

The external connection storage management program 130103 is a program that executes an operation for relaying an access to the virtual storage device as an access to another storage device (regardless of the physical storage device and virtual storage device), and an operation for assigning a physical storage area to the virtual storage device and retaining a copy of data of a connection destination storage device.

Figure 5:
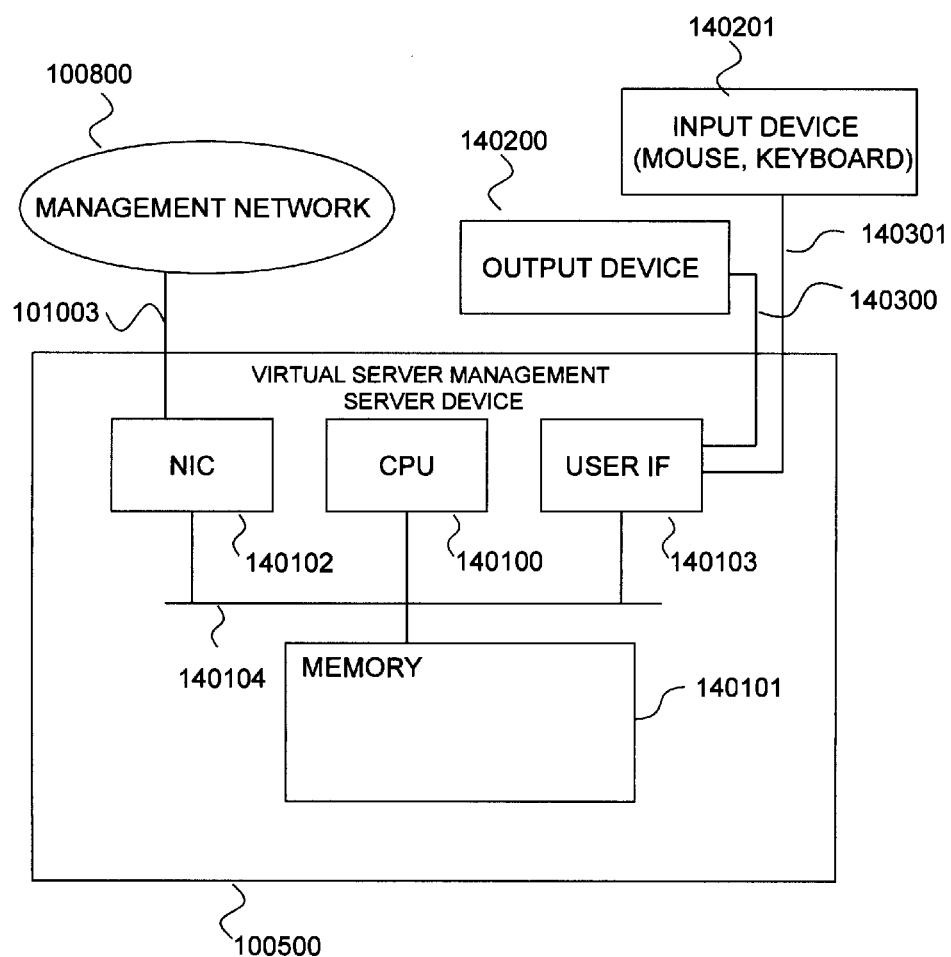
FIG. 5 shows an example of a configuration of a virtual server management server device according to Embodiment 1.
Figure 7:
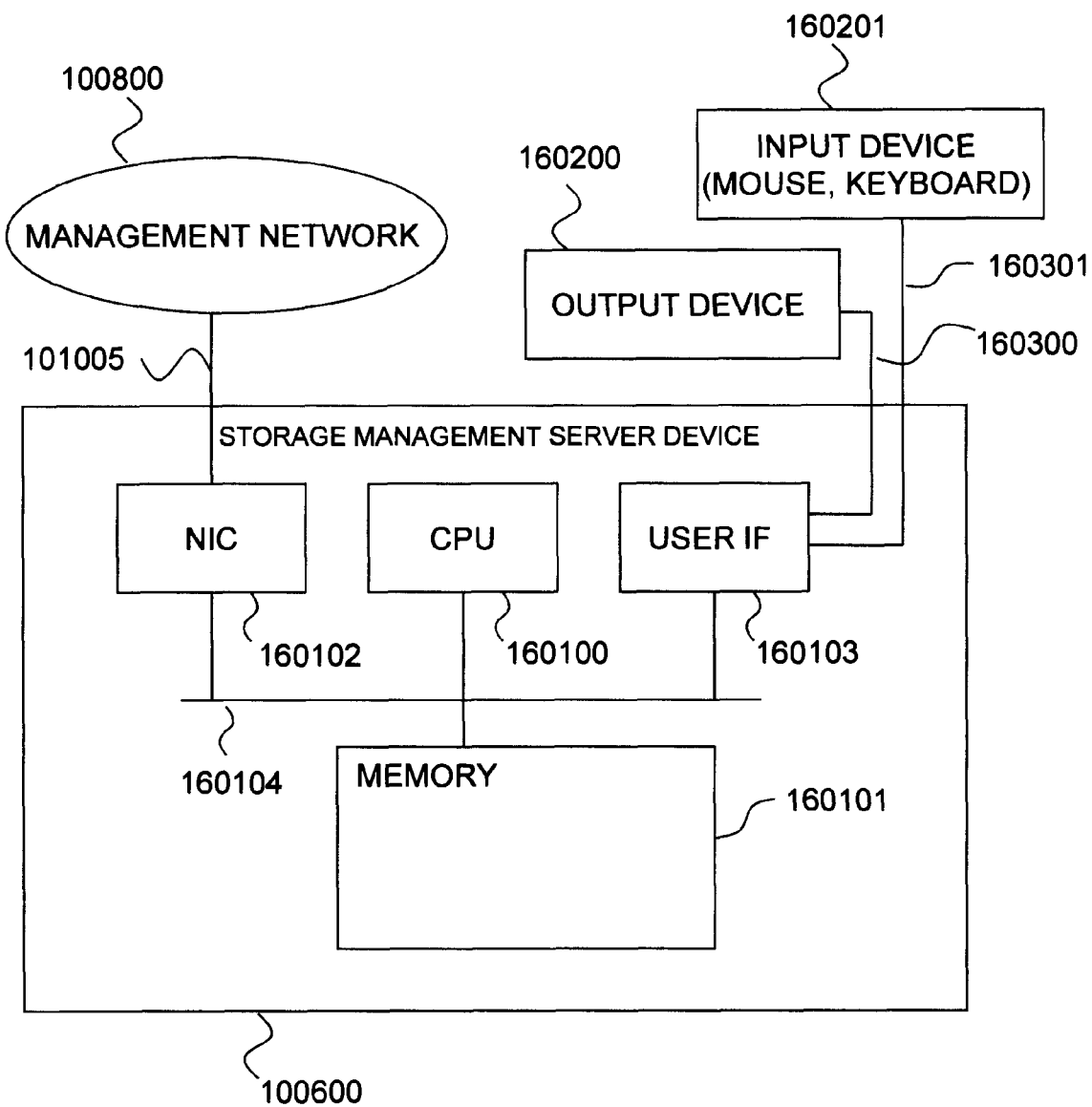
FIG. 7 shows an example of a configuration of a storage management server device according to Embodiment 1.
Figure 9:
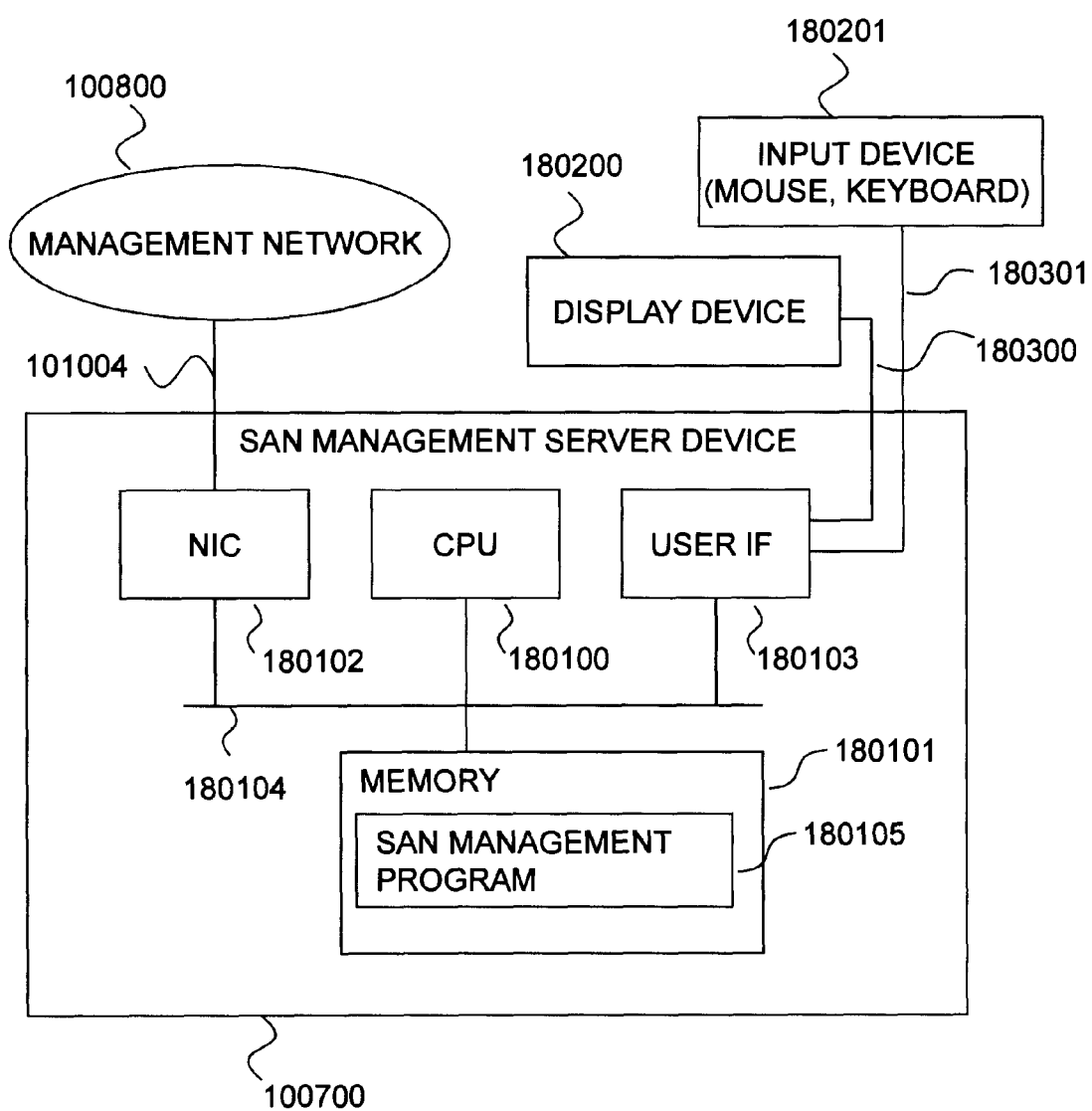
FIG. 9 shows an example of a configuration of a SAN management server device according to Embodiment 1.

FIGS. 5, 7 and 9 show configurations of various management server devices. Various management server devices may be taken as separate server devices as in the present embodiment, or may allow one server device to retain the configurations of all of the management server devices. In the present embodiment, when a system management server device that operates and manages the entire IT system retains programs 150102, 150103 and 150104 and tables 150201 and 150202 that are stored in a memory 140101 of the virtual server management server device 100500, the virtual server management server device 100500 may be read as "system management server device."

FIG. 5 shows an example of the configuration of the virtual server management server device 100500 according to the present embodiment. The virtual server management server device 100500 has a CPU 140100, the memory 140101, a user IF 140103, a NIC 140102, which is an interface connected to the management network 100800, and a data bus 140104 connecting these components. Further, the user IF 140103 is connected to an output device 140200 for displaying information to an operator of, for example, a display device or the like, as well as to an input device 140201 used by the operator of, for example, a mouse or a keyboard to issue an operation instruction.

Figure 6:
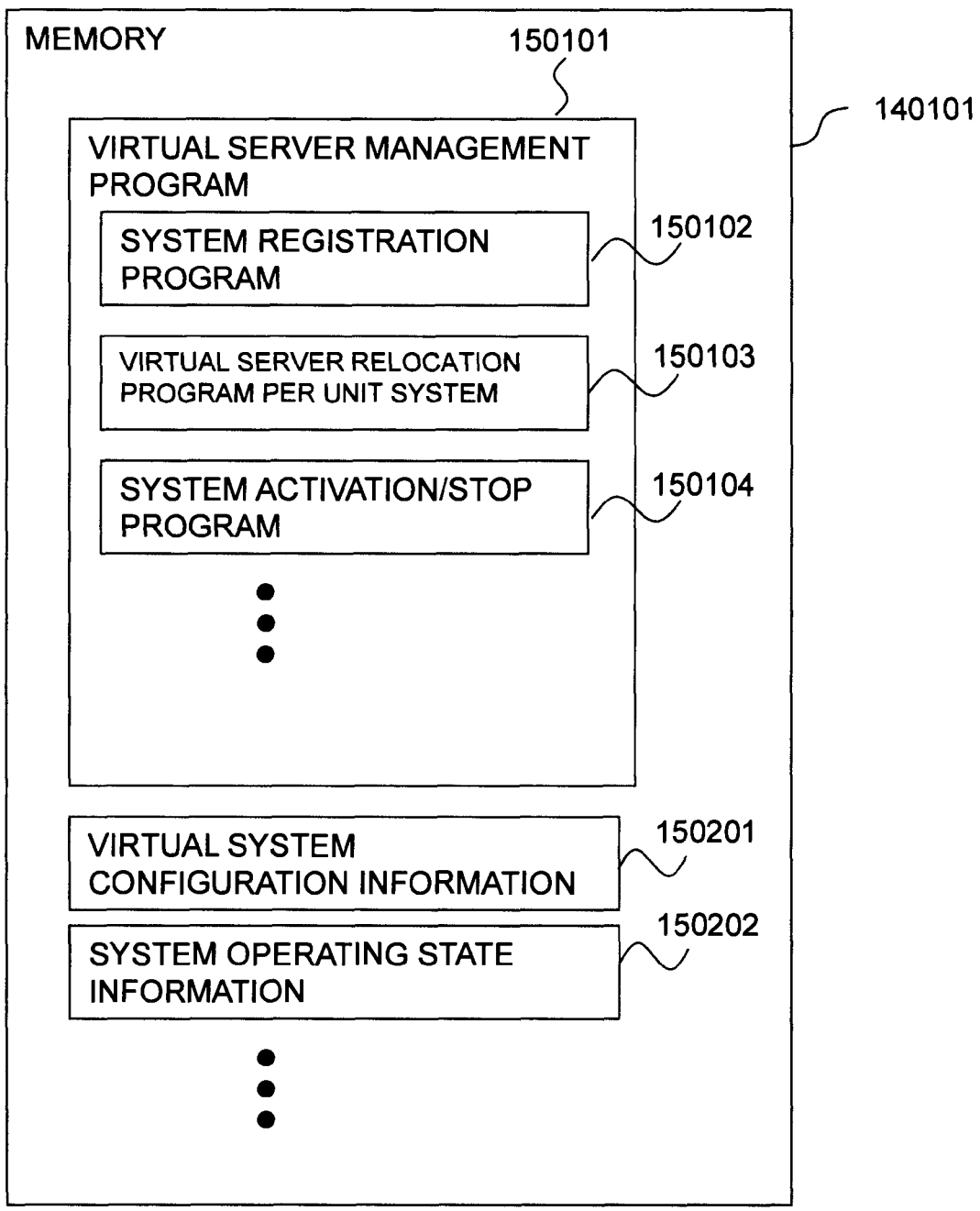
FIG. 6 shows an example of a configuration of a memory retained by the virtual server management server device according to Embodiment 1.

FIG. 6 shows an example of the configuration of the memory 140101 retained by the virtual server management server device 100500 according to the present embodiment. The memory 140101 stores a virtual server management program 150101, virtual system configuration information 150201, and system operating state information 150202. The virtual server management program 150101 is a program for managing the virtual server devices, and retains a system registration program 150102, a virtual server device relocation program 150103, and a system activation/stop program 150104. The operation of each of these programs is described hereinafter.

The system registration program 150102 is a program for registering one or more virtual server devices and one or more virtual storage devices that configure a virtual system, in order to construct the virtual system. The virtual server device relocation program 150103 is a program that carries out an operation for changing the repositories of the virtual server devices on the physical server device, the virtual server devices configuring the virtual system.

Here, "repositories" means the arrangement of the virtual server devices on the physical server device. In other words, it is information that indicates which physical server device executes the virtual server devices. In addition, repository information means information that indicates the correspondence relationship between each of the virtual server devices and the physical server device in which the virtual server devices are disposed.

The system activation/stop program 150104 is a program for executing an operation for changing the operating state (operated/stopped) of each virtual server device.

The virtual system configuration information 150201 is information that retains configuration information on the repositories of the virtual server devices of the virtual system, as well as identification information of the virtual storage device used by the virtual server devices.

The system operating state information 150202 is information that retains information indicating the operating state of each virtual system.

FIG. 7 shows an example of the configuration of the storage management server device 100600 according to the present embodiment. The storage management server device 100600 is different from the virtual server management server device 100500 in terms of the information retained by the memory. The storage management server device 100600 has a CPU 160100, a NIC 160102, a user IF 160103, a memory 160101, and a data bus 160104 connecting these devices. The user IF 160103 is connected to an output device 160200, such as a display device, and to an input device 160201, such as a mouse or a keyboard.

Figure 8:
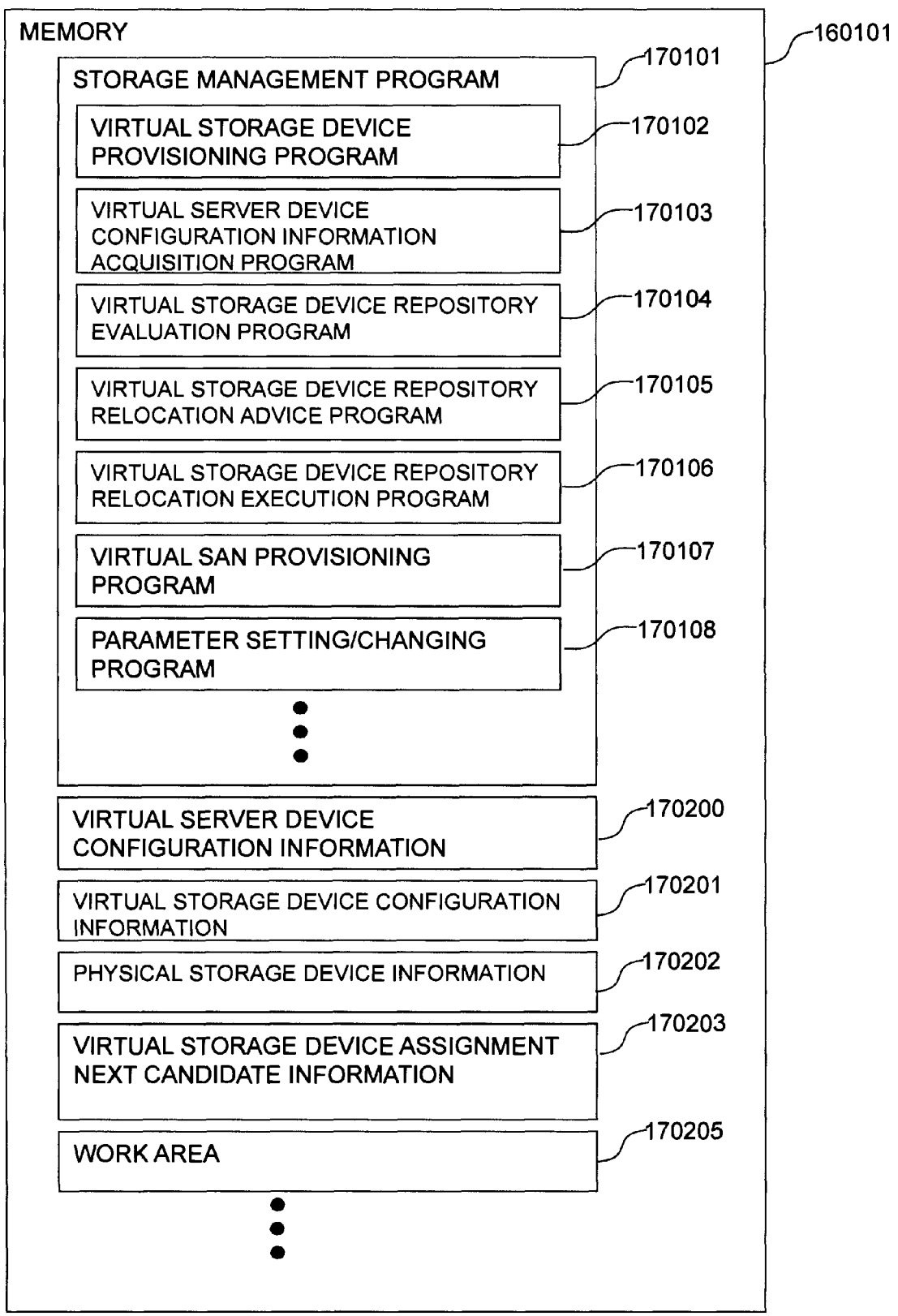
FIG. 8 shows an example of a configuration of a memory retained by the storage management server device according to Embodiment 1.

FIG. 8 shows an example of the configuration of the memory 160101 retained by the storage management server device 100600 according to the present embodiment. The memory 160101 retains a storage management program 170101, virtual server device configuration information 170200, virtual storage device configuration information 170201, physical storage device information 170202, virtual storage device assignment next candidate information 170203, and a work area 170205.

The storage management program 170101 is a program for managing the storage device. More specifically, a virtual storage device provisioning program 170102, virtual server device configuration information acquisition program 170103, virtual storage device repository evaluation program 170104, virtual storage device repository relocation advice program 170105, virtual storage device repository relocation execution program 170106, virtual SAN provisioning program 170107, and parameter setting/changing program 170108 are retained. The operation of each of these programs is described hereinafter.

The virtual storage device provisioning program 170102 is a program for instructing the physical storage device to create the virtual storage device. The virtual server device configuration information acquisition program 170103 is a program for acquiring the configuration information of the virtual server devices from the virtual server management server device. The virtual storage device repository evaluation program 170104 is a program for computing an evaluation value using an evaluation formula or the like, for a candidate for the physical server device realizing the virtual storage device.

The virtual storage device repository relocation advice program 170105 is a program for presenting, to the operator, a candidate for the physical storage device realizing the virtual storage device. The virtual storage device repository relocation execution program 170106 is a program for relocating the virtual storage device to the selected physical storage device.

The virtual SAN provisioning program 170107 is a program for instructing the SAN management server device to configure the virtual SAN by using the virtual server devices and virtual storage device contained in the virtual system.

The parameter setting/changing program 170108 is a program for setting and changing parameters.

Here, the virtual SAN is a SAN that is obtained by logically dividing the physical SAN 100300. With this virtual SAN, the FC switch devices are operated to prevent the exchange of data or performance interference between the virtual SANs.

The virtual server device configuration information 170200 is information that retains the repository information of the virtual server devices that are acquired from the virtual server management server device.

The virtual storage device configuration information 170201 is information that retains the repository information and operation information of the virtual storage devices. The physical storage device information 170202 is information that retains management information of the physical storage devices. The virtual storage device assignment next candidate information 170203 is information that stores information for determining an assignment order when candidates for the physical storage device executed by the virtual storage device have the same evaluation value.

The work area 170205 is a storage area for temporarily storing data with respect to the operation of the storage management program. The detail of each component is described hereinafter.

FIG. 9 shows an example of the configuration of the SAN management server device 100700 according to the present embodiment. The SAN management server device 100700 is different from the virtual server management server device 100500 in terms of the information retained by the memory. The SAN management server device 100700 has a CPU 180100, a NIC 180102, a user IF 180103, a memory 180101, and a data bus 180104 connecting these devices. The user IF 180103 is connected to an output device 180200, such as a display device, as well as to an input device 180201, such as a mouse or a keyboard.

The memory 180101 retains a SAN management program 180105. The SAN management program 180105 is a program for managing the SAN 100300 configured by one or more FC switch devices, and creates the virtual SAN that is logically connected to the virtual servers or virtual storage contained in the virtual system. Furthermore, in the SAN to which one or more FC switch devices are connected, one representative FC switch device may be operated as the SAN management server device.

Figure 10:
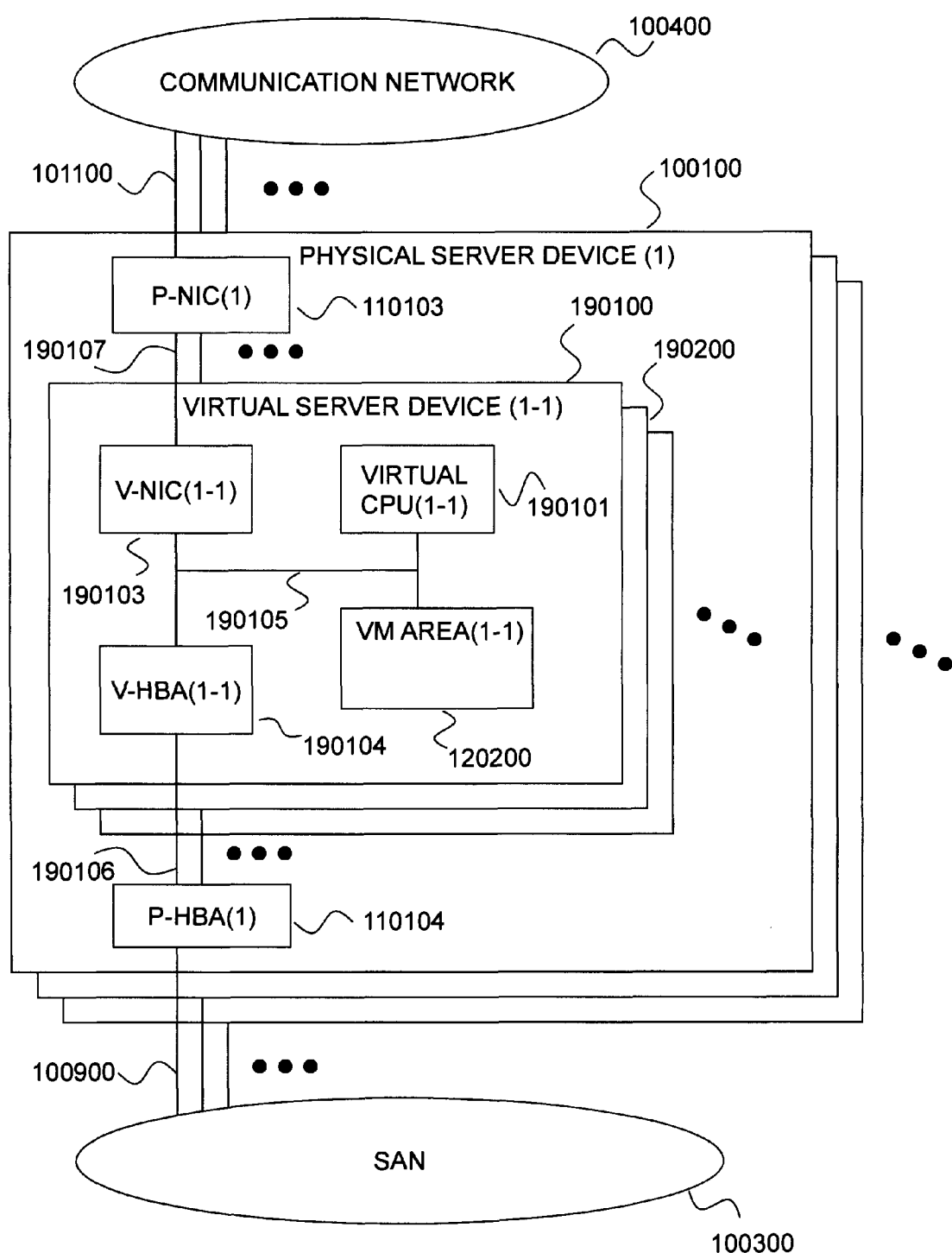
FIG. 10 shows an example of a configuration of a virtual server device realized on the physical server device according to Embodiment 1.

FIG. 10 shows an example of the configuration of the virtual server devices realized on the physical server device according to the present embodiment. Specifically, a configuration example of the virtual server devices that are realized on the physical server device by means of the hypervisor program 120100 is illustrated. The physical server device (1) 100100 retains one or more virtual server devices 190100, 190200. The virtual server device 190100 has a virtual CPU (1-1) 190101, the VM area (1-1) 120200, which is a virtual memory, a virtual Host Bus Adaptor (v-HBA) (1-1) 120200, which is a virtual host bus adaptor, a virtual network card (v-NIC) (1-1) 190103, which is a virtual NIC, and a data path 190105 connected these components. Note that there may be a plurality of components configuring this virtual server device.

The virtual CPU (1-1) 190101 is a resource that is obtained by logically dividing a CPU of the physical server device executing the virtual server devices, in accordance with the proportion. It is also a resource obtained by time-dividing the CPU in accordance with the proportion.

The VM area (1-1) 120200 is a partial storage area of the memory possessed by the physical server device.

The virtual server device (1) 190100 is connected to an external communication network from the v-NIC (1-1) 190103 by the p-NIC (1) 110103. This configuration indicates that one or more v-NICs are provided to the virtual server device by sharing or logically dividing the internal resource of the p-NIC.

Similarly, the virtual server device (1) 190100 is connected to the SAN 100300 from the v-HBA (1-1) 190104 by the p-HBA (1) 110104. This configuration indicates that one or more v-HBAs are provided to the virtual server device by sharing or logically dividing the internal resource of the p-HBA.

The hypervisor program operated by the physical server device associates a virtual resource with a physical resource.

Figure 11:
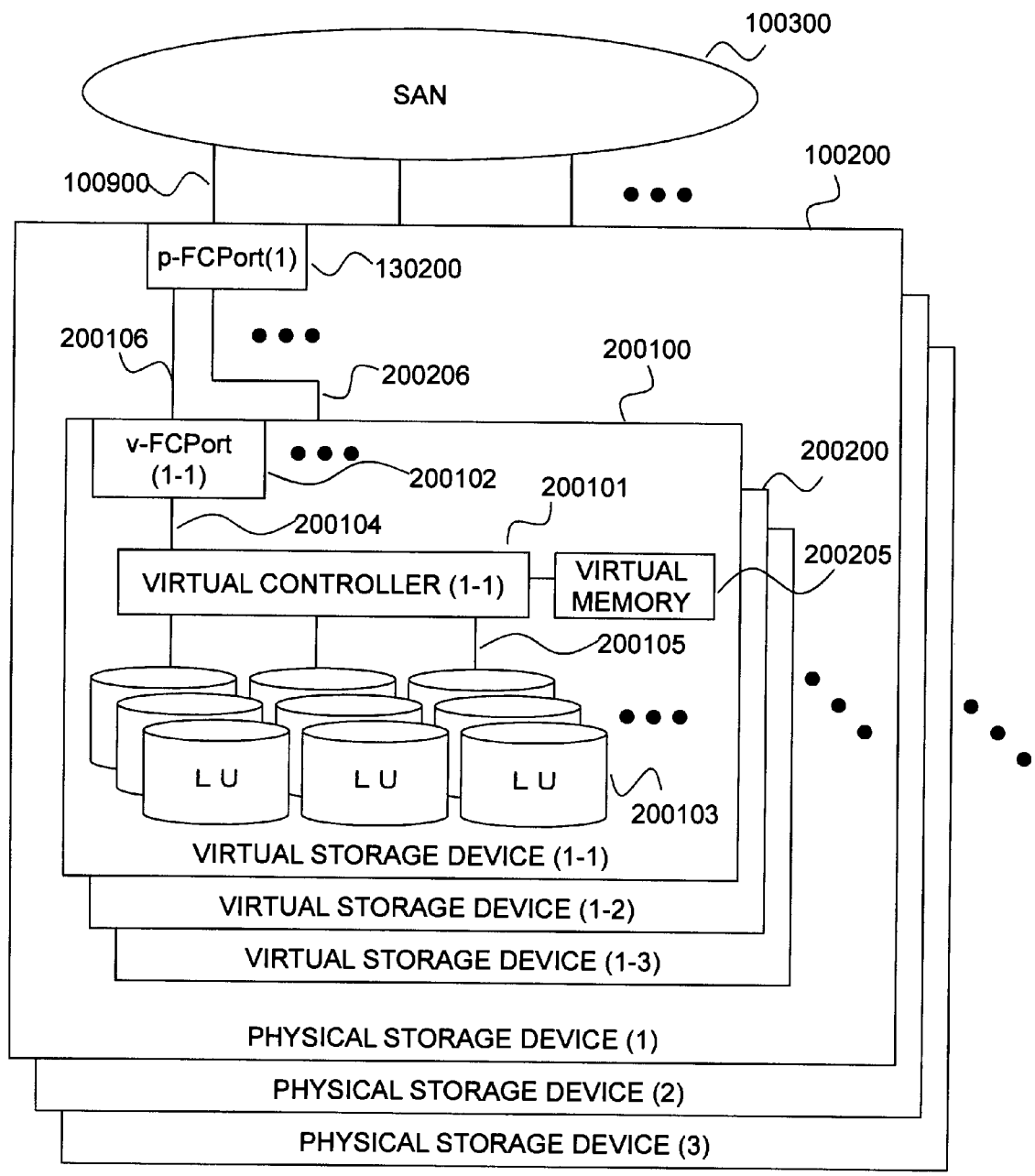
FIG. 11 shows an example of a configuration of a virtual storage device realized on the physical storage device according to Embodiment 1.

FIG. 11 shows an example of the configuration of the virtual storage device realized on the physical storage device according to the present embodiment. Specifically, a configuration example of the virtual storage device that is realized on the physical storage device by means of the virtual storage management program 130102 is illustrated. The physical storage device (1) 100200 realizes one or more virtual storage devices 200100, 200200. The virtual storage device (1-1) 200100 has a virtual controller (1-1) 200101, a virtual memory 200205, a v-FCPort (1-1) 200102, which is a virtual fiber channel port, and one or more LUs 200103. Note that the storage areas of the LUs retained by the virtual storage device are assigned to the storage areas on the one or more physical disks 130300 retained by the physical storage device, unless otherwise particularly specified.

The virtual controller (1-1) 200101 is a resource obtained by logically dividing the controller of the physical storage device executing the virtual storage device, in accordance with the proportion. It is also a resource obtained by time-dividing the controller in accordance with the proportion.

A partial storage area of the memory (physical) is assigned to the virtual memory 200205.

The virtual storage device (1-1) 200100 is connected to an external SAN from the v-FCPort (1-1) 200102 via the p-FCPort (1) 130200. This configuration indicates that one or more v-FCPorts are provided to the virtual storage device by sharing or logically dividing the internal resource of the p-FCPort.

Figure 12:
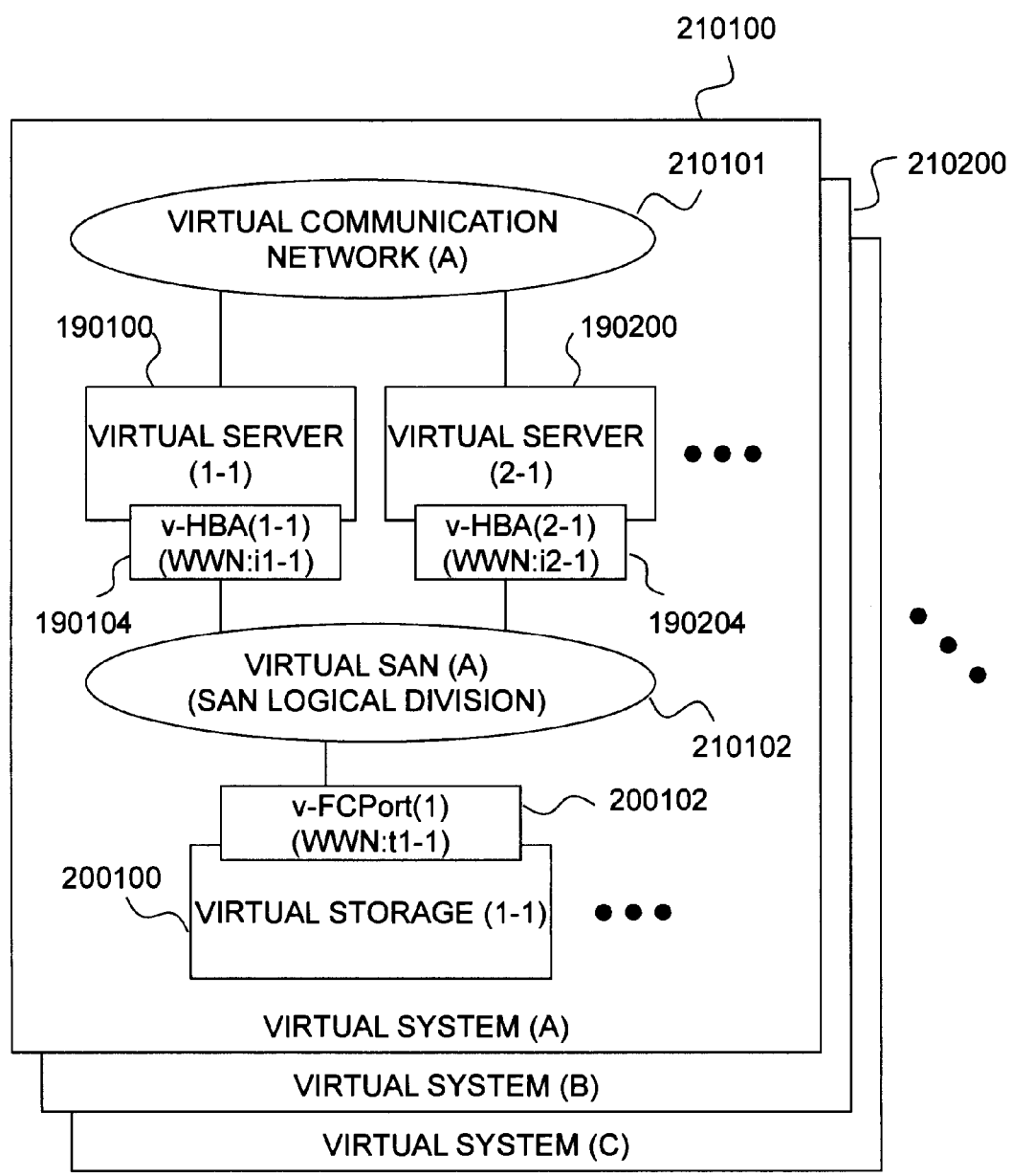
FIG. 12 shows an example of a configuration of a virtual system according to Embodiment 1.

FIG. 12 shows an example of the configuration of the virtual system according to the present embodiment. Specifically, a configuration example of one or more pairs of virtual systems 210100, 210200 that are realized on the physical system shown in FIG. 1 is illustrated.

The virtual system 210100 retains one or more virtual server devices (1-1) 190100, one or more virtual storage devices (1-1) 200100, a virtual communication network (A) 210101, and a virtual SAN (A) 210102.

The virtual communication network (A) 210101 is, for example, a VLAN for assigning the communication network to each virtual system. The virtual SAN (A) 210102 is a logical SAN assigned to each virtual system. With this virtual communication network (A) 210101, the independence and security between the virtual systems are ensured in each network.

Hereinafter, the present embodiment illustrates the outlines of "a method for determining a physical storage device in which a virtual storage device is disposed, when constructing a virtual system," and "a method for changing the physical storage device in which the virtual storage device is disposed, in response to relocation of the virtual server devices." However, the outlines are not limited to the present embodiment.

Figure 13:
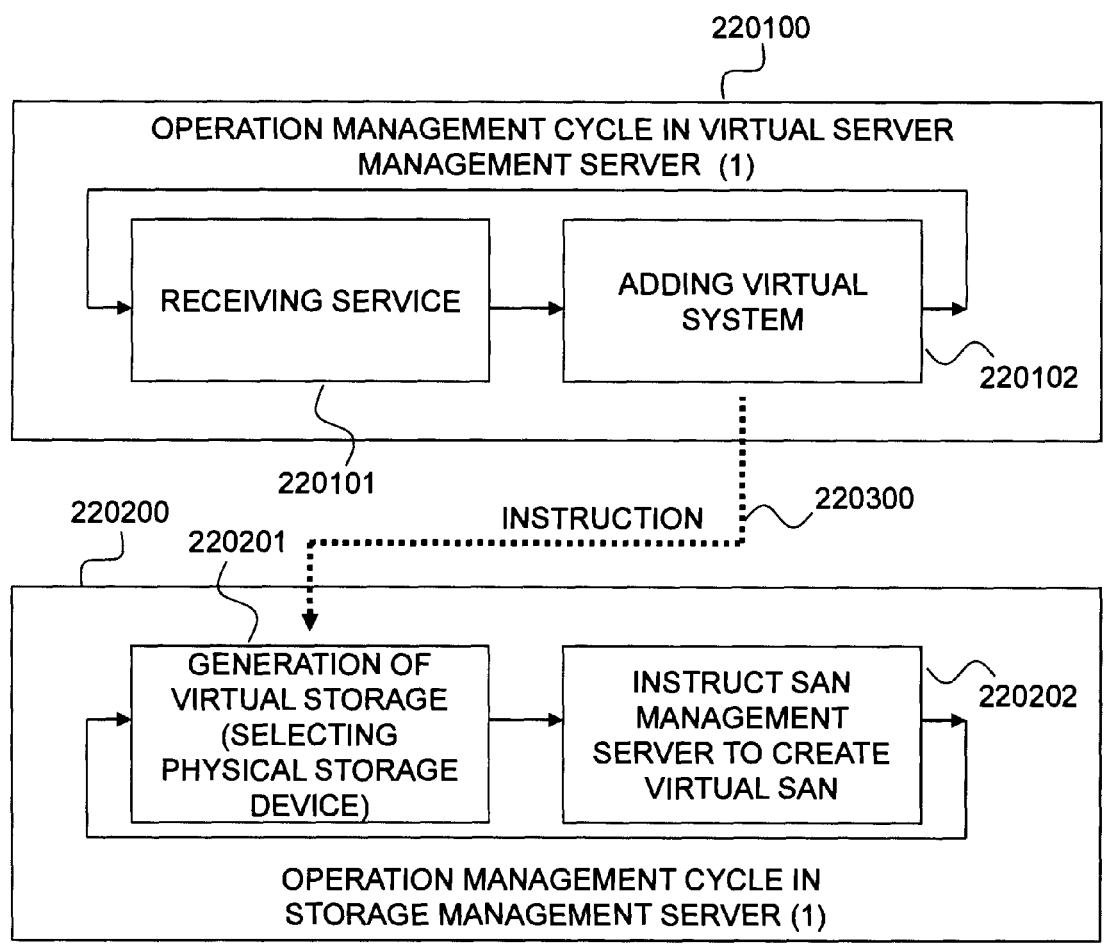
FIG. 13 shows an example of how a new virtual system is added to the physical system according to Embodiment 1.
Figure 14:
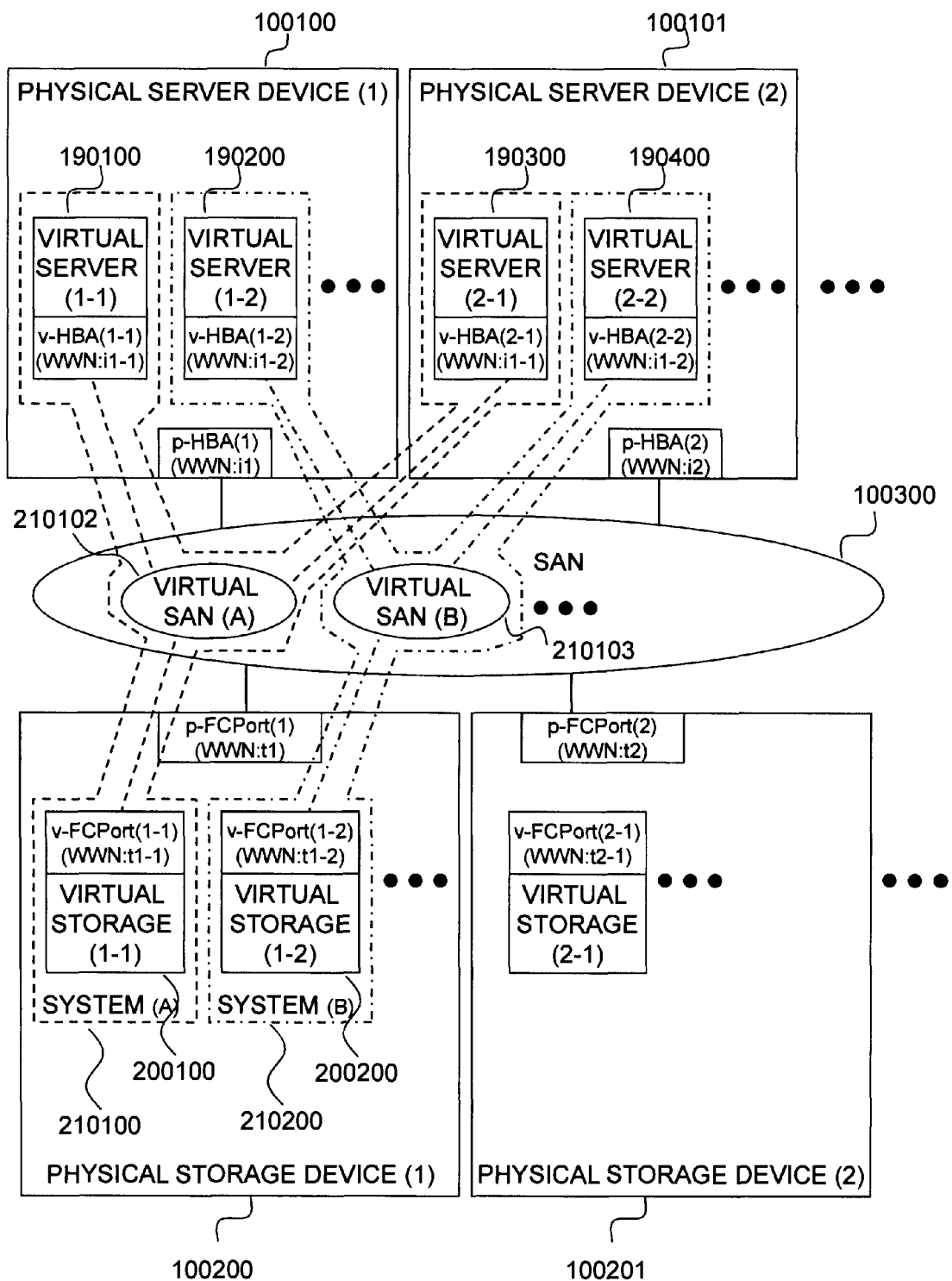
FIG. 14 is a configuration diagram showing an example of the virtual system according to Embodiment 1.

FIGS. 13 and 14 each show an example of the outline of "a method for determining a physical storage device in which a virtual storage device is disposed, when constructing a virtual system."

FIG. 13 shows an example of how a new virtual system is added to the physical system illustrated in FIG. 1. An operation management cycle (1) 220100 of the virtual server management server device executes service reception 220101 and virtual system addition 220102. When the virtual system addition 220102 is executed, an instruction 220300 to create a virtual storage device is issued to an operation management cycle (1) 220200 of the storage management server device.

The operation management cycle (1) 220200 of the storage management server device executes to create a virtual storage device 220201, and thereafter instructs the SAN management server device to create the virtual SAN. The generation of a virtual storage device 220201 is executed in response to the instruction 220300 issued when the virtual system addition 220102 is performed, whereby a physical storage device for disposing the virtual storage device therein is selected.

Figure 51:
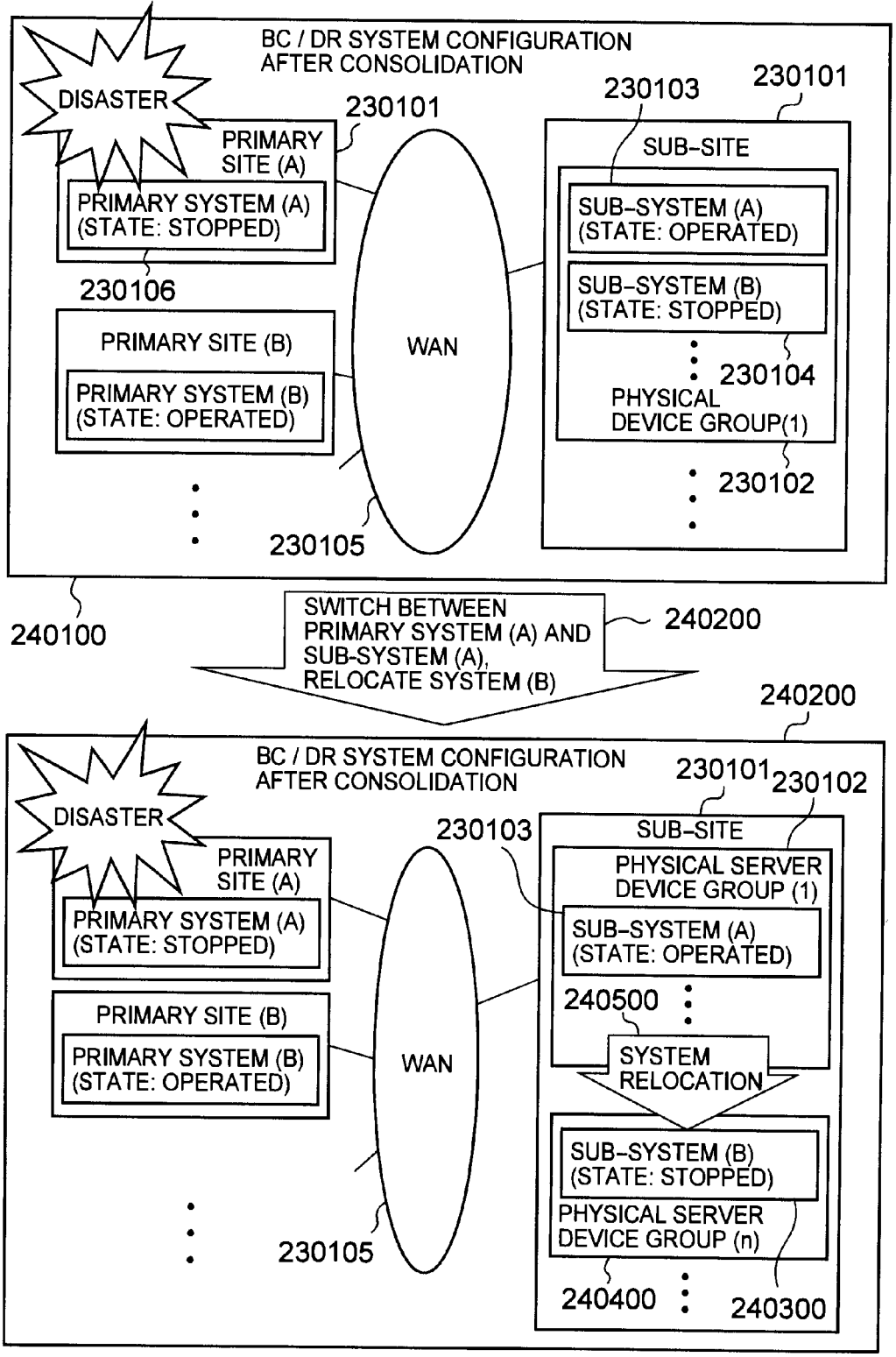
FIG. 51 shows an example of how the sub-systems are consolidated in the duplexing system for an extensive disaster, according to Embodiment 1.

FIG. 14 is a configuration diagram showing an example of the virtual system according to the present embodiment. For example, a repository configuration example of a sub-system (A) 230103 and a sub-system (B) 230104 of a BC/DR system 240100 shown in FIG. 51 is illustrated. The system (A) 210100 shown in FIG. 14 represents the sub-system (A) 230103 and the system (B) 210200 represents the sub-system (B) 230104.

For example, the present embodiment is applied for determining which physical storage device is used to dispose the virtual storage device, when constructing the configuration of the virtual system shown in FIG. 14.

FIGS. 15 to 19 each show an example of the outline of "a method for changing the physical storage device in which the virtual storage device is disposed, in response to relocation of the virtual server devices," according to the present embodiment.

Figure 15:
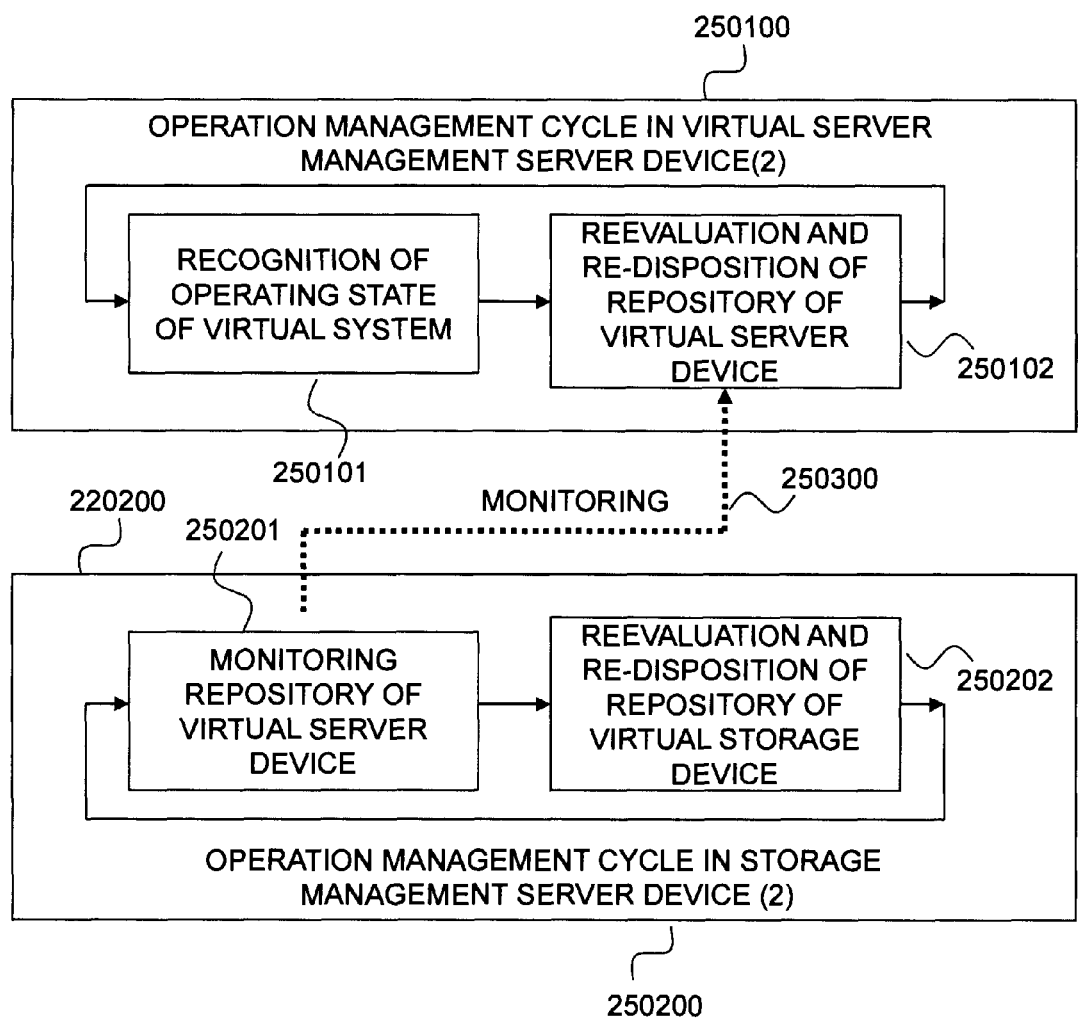
FIG. 15 shows an example of an operation management cycle obtained when the virtual system of Embodiment 1 is migrated.

FIG. 15 shows an example of an operation management cycle (2) for migrating the virtual system. For example, the diagram shows an example of the operation management cycle (2) for relocating the sub-systems shown in FIG. 51.

The operation management cycle (2) 250100 of the virtual server management server device executes recognition 250101 of the operating state of the virtual system in response to the instruction from the manager (or automatically), reevaluates the repositories of the virtual server devices in the virtual system, and performs re-disposition 250102 of the virtual server devices. Further, an operation management cycle (2) 250200 of the storage management server device executes monitoring 250201 of the repositories of the virtual server devices, and, when the repositories of the virtual server devices are changed, reevaluates the repositories of the virtual storage devices and performs re-disposition 250202 thereof. When monitoring 250201 of the repositories of the virtual server devices is performed, a result indicating whether or not the repositories of the virtual server devices are re-disposed is monitored in the virtual server management server device.

Figure 16:
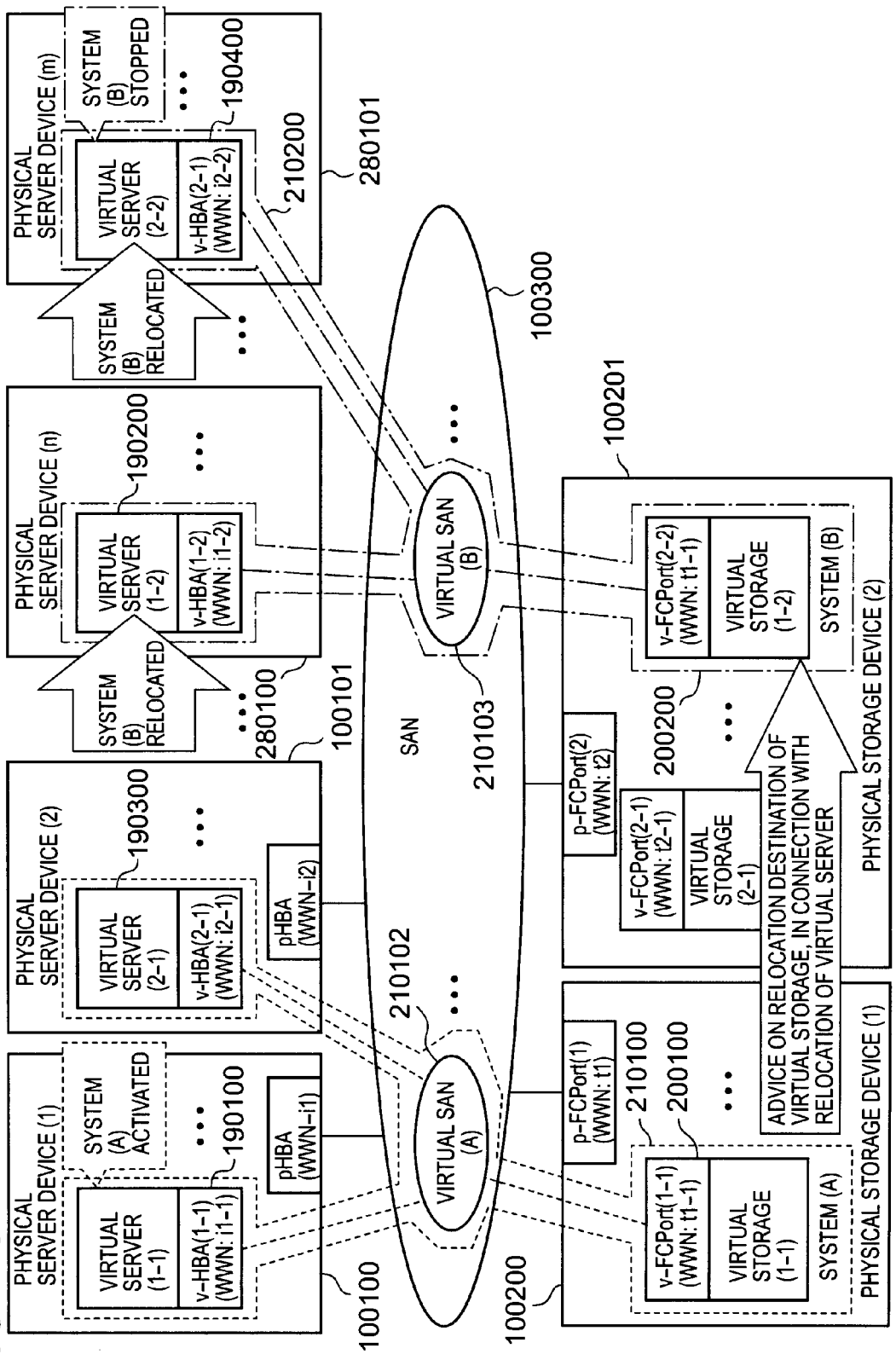
FIG. 16 shows an example of how a virtual server device is migrated to another physical server device in the virtual server management server device, in Embodiment 1.

FIG. 16 schematically shows an example of how the virtual server device of the system (B) 210200 is migrated to the other physical server devices (physical server device (n) 280100 and physical server device (m) 280101) in the virtual server management server device 100500 by the operator (or automatically). In conjunction with relocation of the virtual server device, the storage management server device 100600 executes reevaluation of the repository, advises the operator to relocate the virtual storage device to a physical storage device (2) 100201. In conjunction with re-disposition of the repository of the virtual server device, the storage management server device reevaluates the repository of the virtual storage device and executes re-disposition thereof, in the manner described above.

Figure 17:
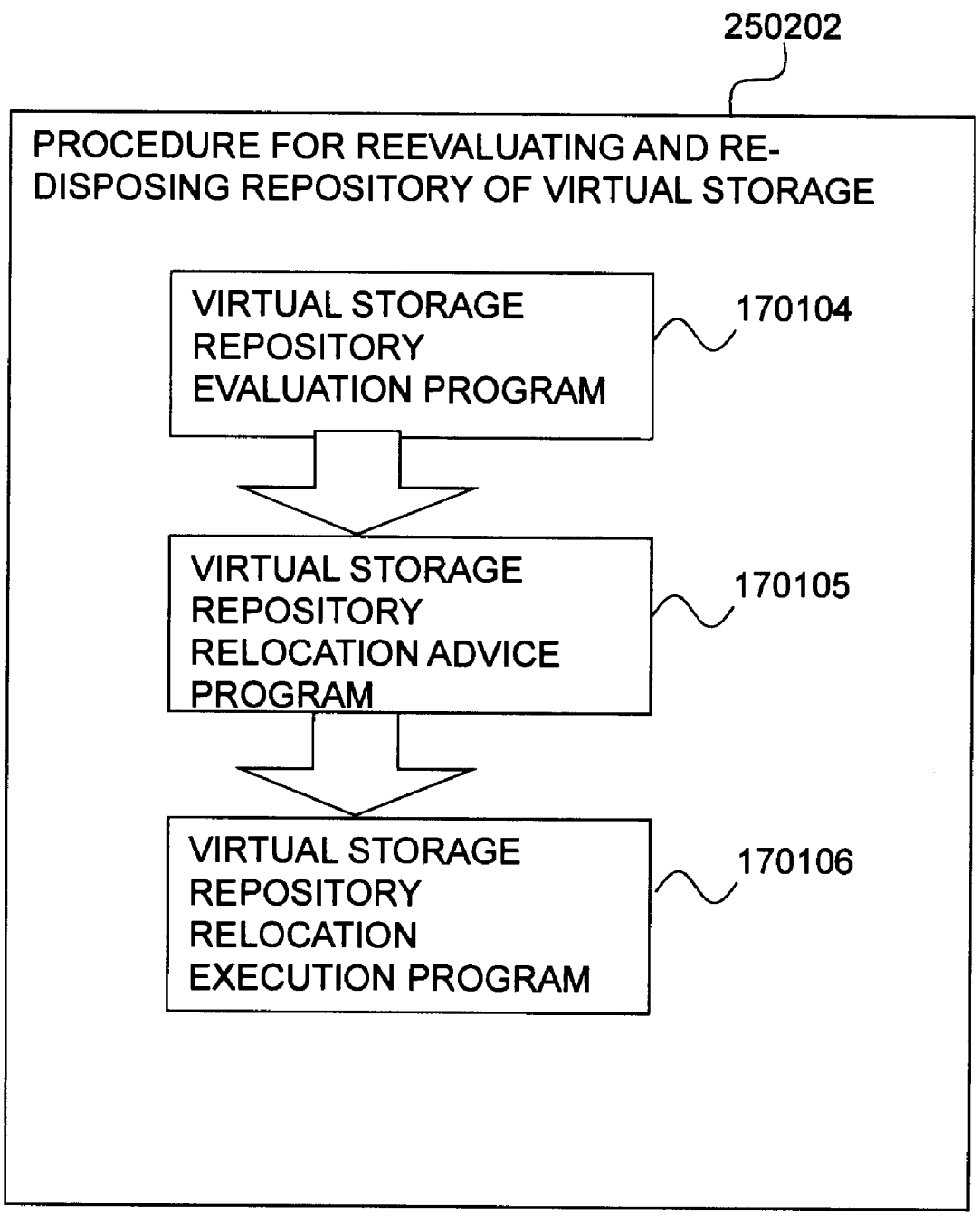
FIG. 17 shows an example of a procedure for reevaluating and re-disposing a repository of the virtual storage device according to Embodiment 1.

FIG. 17 shows an example of a procedure for reevaluating and re-disposing the repository of the virtual storage device according to the present embodiment. The virtual storage device repository reevaluation and re-disposition 250202 is configured by the execution of the virtual storage device repository evaluation program 170104, the execution of the virtual storage device repository relocation advice program 170105, and the execution of the virtual storage device repository relocation execution program 170106. The detail of this procedure is described hereinafter.

Figure 18:
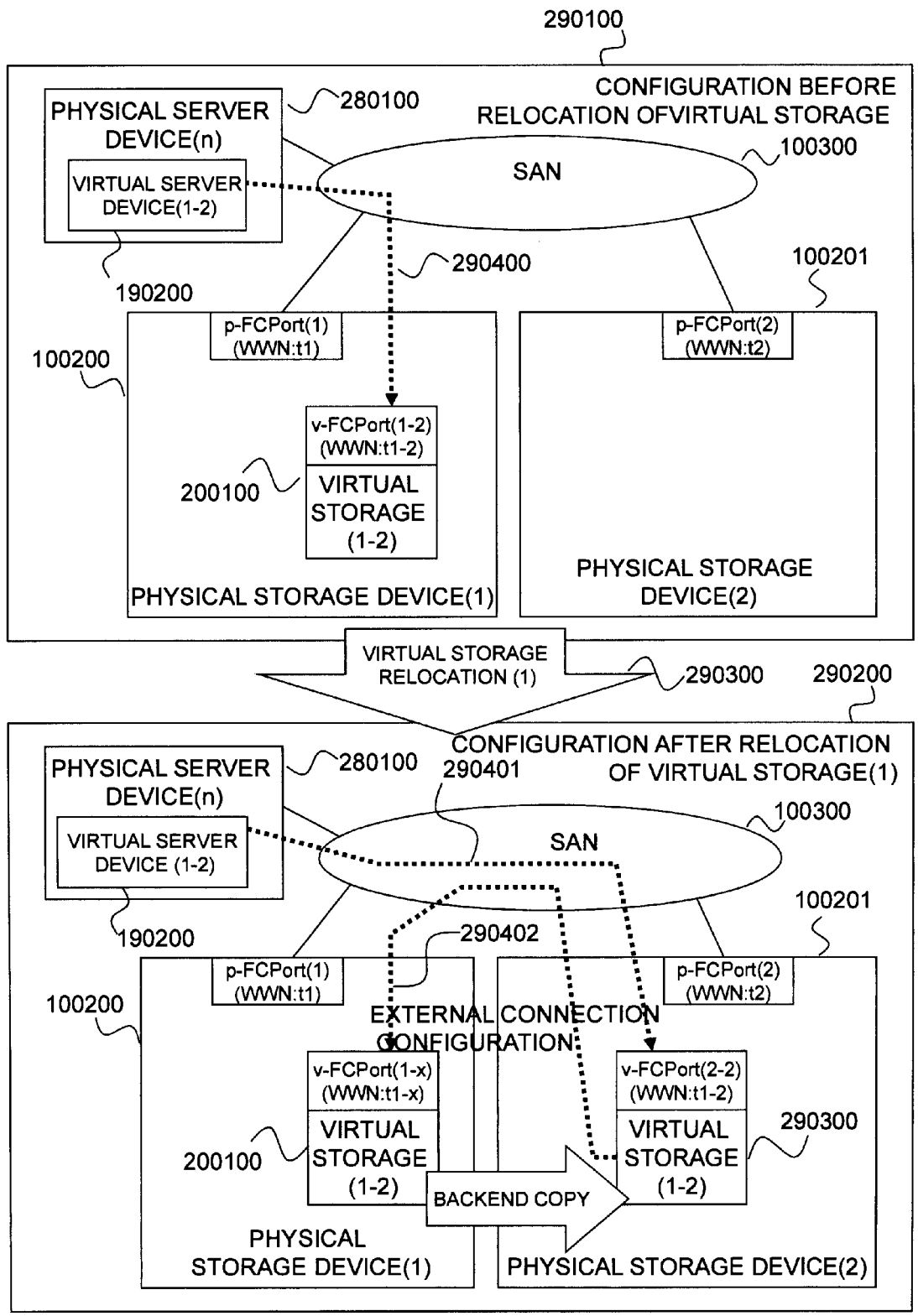
FIG. 18 shows an example of a method for relocating the virtual storage device according to Embodiment 1.

FIG. 18 shows an example (1) of a method for relocating the virtual storage device according to the present embodiment. The virtual storage device is migrated from the physical storage device (1) to the physical storage device (2).

First, in a relocation destination physical storage device 100200, a virtual storage device 290300 having the same WWN value (t1-2) as the migration source virtual storage device 200100 is created. Then, the WWN value of the relocation source virtual storage device 200100 is changed to a temporal value (t1-x). The relocation destination virtual storage device 290300 executes the external connection storage management program 130103 to handle the data of the relocation source virtual storage device 200100. Accordingly, the relocation destination physical storage device (2) 290200 performs an operation for relaying an access to the virtual storage device 290300 as an access to the relocation source virtual storage device 200100. Thereafter, the data of the relocation source virtual storage device 200100 is copied to the relocation destination virtual storage device 290300 to migrate the data.

Figure 19:
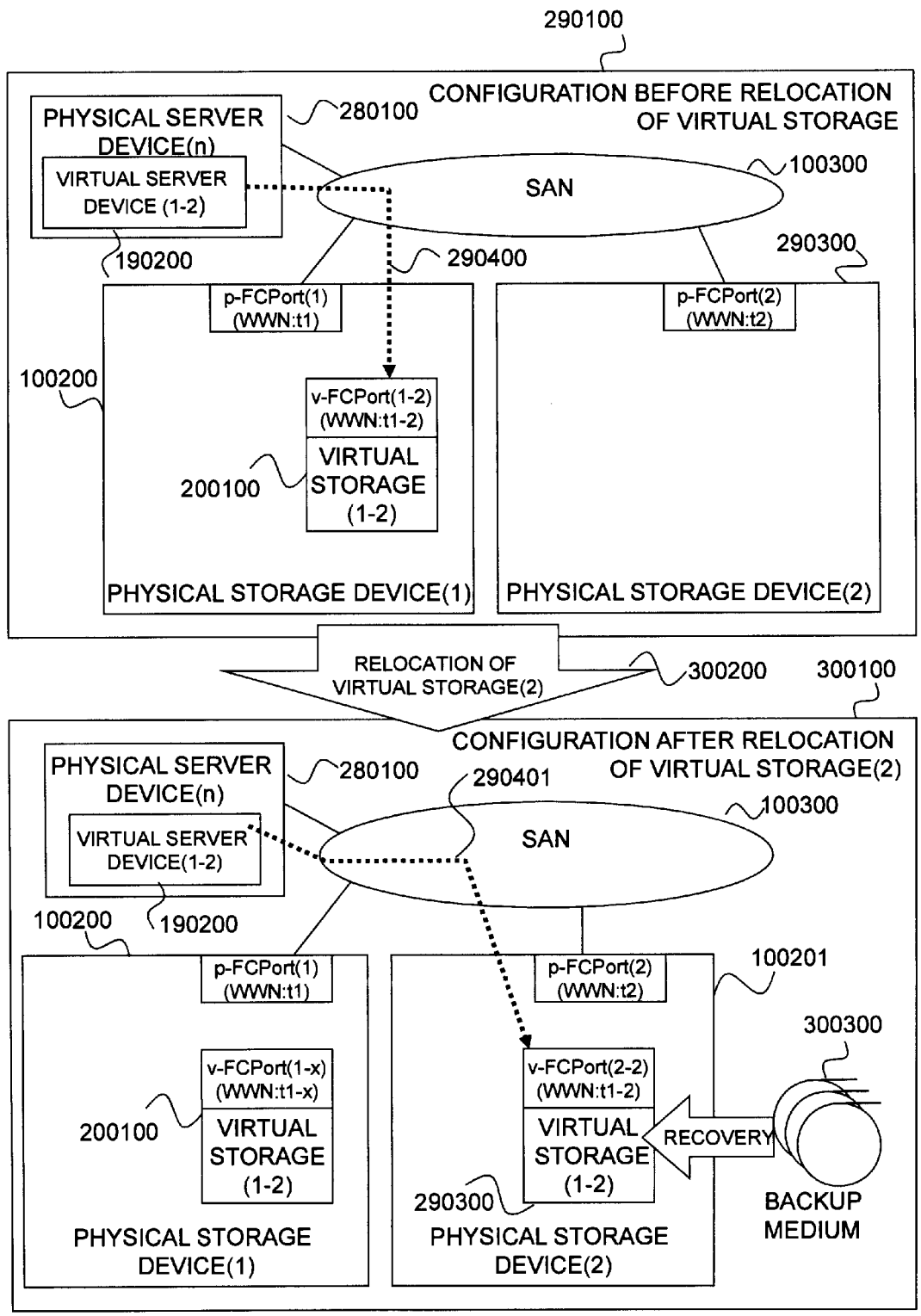
FIG. 19 shows an example of the method for relocating the virtual storage device according to Embodiment 1.

FIG. 19 shows another example (2) of the method for relocating the virtual storage device. Because the load on the physical storage device 100200 retaining the migration source virtual storage device 200100 is greater than a threshold value, this method is effective when the migration destination physical storage device cannot migrate the data. When the load on the migration source physical storage device is greater than the threshold value, it means that the virtual storage device that is realized on the physical storage device is in an operating state a predetermined number of times or more.

The WWN value of the relocation source virtual storage device 200100 is changed to the temporal value (t1-x). The relocation destination virtual storage device 290300 is created in the relocation destination physical storage device 100201. The WWN of the relocation destination virtual storage device is set at the WWN (t1-2) used by the relocation source. The data of the relocation destination virtual storage device 290300 is restored from a device other than the migration source physical storage device 100200, such as a backup medium. The backup medium here is, for example, a tape recording medium or a hard disk recording medium, which backs up disk image data of the LU of the virtual storage device. Note that examples of the format of data recorded on the backup medium include not only a RAW data format but also a format in which the data is retained in a file format, as in a disk image file. In the case of a sub-system in a cold standby, for example, this backup may be carried out regularly for system operation protection, after updating software or after updating large data. This restoration can be generally performed using backup tool software for carrying out the backup.

The operation of each program is described hereinafter in detail. FIGS. 20 to 29 each show the information required for operating each program. In the following definitions and explanations of the information, the columns of the same name represent the same meaning. FIGS. 30 to 49 each show a flow of the operation according to the present embodiment.

FIG. 20 shows an example of the virtual system configuration information 150201 according to the present embodiment. Note that the format shown in FIG. 20 is merely an example, and the virtual system configuration information is not limited to have this format. The virtual system configuration information 150201 has a column "system identification information" 310106, a column "virtual server device identification information" 310101, a column "physical server device identification information" 310102, a column "virtual HBA identification information" 310103, a column "virtual storage device identification information" 310104, and a column "virtual storage device LU identification information" 310105.

The column "system identification information" 310106 is information used by the virtual server management server device to identify the virtual system. The column "virtual server device identification information" 310101 is information used the virtual server management server device to identify the virtual server devices. The column "physical server device identification information" 310102 is information used by the virtual server management server device to identify the physical server device. The column "virtual HBA identification information" 310103 is information for identifying the virtual HBAs possessed by the virtual server devices, and is represented a WWN value, for example. The column "virtual storage device identification information" 310104 is information for identifying the virtual fiber channel port possessed by the virtual storage device, and is represented as a WWN value, for example. The column "virtual storage device LU identification information" 310105 is information for identifying the LU possessed by the virtual storage device, and is represented as an LU number (LUN), for example.

FIG. 21 shows an example of the system operating state information 150202 according to the present embodiment. The system operating state information 150202 has a column "system identification information" 320101, a column "virtual server device identification information" 320102, and a column "virtual server device operating state" 320103. The column "system identification information" 320101 is information for identifying the virtual system in the virtual server management server device. The column "virtual server device operating state" 320103 represents the operating state of each virtual server device, and information such as "operated" or "stopped" is stored therein. Here, the state in which the virtual server device is "operated" means that some sort of a program (BIOS or OS program) retained in the virtual memory is executed by the virtual CPU in the virtual server device. Further, the state in which the virtual server device is "stopped" means that any program of ones retained in the virtual memory is not executed by the virtual CPU.

FIG. 22 shows an example of the virtual server device configuration information 170200 according to the present embodiment. The virtual server device configuration information 170200 represents the virtual server device that uses the virtual storage device, as well as the repository of this virtual server device. The virtual server device configuration information 170200 has a column "virtual storage device identification information" 330101, a column "virtual server device identification information" 330102, and a column "physical server device identification information" 330103. The column "virtual storage device identification information" 330101 is information for identifying the virtual fiber channel port possessed by the virtual storage device, and is represented as a WWN value, for example.

FIG. 23 shows an example of the virtual storage device configuration information 170201 according to the present embodiment. The virtual storage device configuration information 170201 represents the physical storage device in which the virtual storage device is disposed, and the virtual SAN. The virtual storage device configuration information 170201 also represents the operating state of the virtual system having the virtual storage device.

The virtual storage device configuration information 170201 has a column "virtual storage device identification information" 340101, a column "physical storage device identification information" 340102, a column "virtual SAN identification information" 340103, and a column "operating state" 340104. The column "virtual SAN identification information" 340103 is information used by the SAN management server device 100700 to identify the virtual SAN, and a number, a name and the like are stored therein. The column "operating state" 340104 is information representing the operating state of the virtual system that uses the virtual storage device. For the virtual system having the virtual storage device, information indicating "active" is stored when the information indicating "operated" is stored in the column "virtual server device operating state" 320103, and "inactive" is stored in other situations, by referring to the system operating state information 150202 shown in FIG. 21. When at least one of the one or more virtual server devices configuring the virtual system is operated, it is determined that the virtual system is operated. If a different interpretation is adopted in the operation management of the virtual server devices, the operation may be changed to an operation for setting a value suitable for this interpretation.

FIG. 24 shows an example of the physical storage device information 170202 according to the present embodiment. The physical storage device information 170202 has a column "physical storage device identification information" 350101, a column "assignment order" 350102, a column "the maximum storage number of virtual storage devices to be housed" 350103, a column "the number of virtual storage devices to be housed" 350104, a column "the maximum number of active virtual storage devices" 350105, and a column "the number of active virtual storage devices" 350106.

The column "assignment order" 350102 shows the numbers in an order used when selecting, by means of a round robin, a physical storage device to dispose the virtual storage device therein. The round robin means that, when selecting one out of a plurality of available candidates, the selected candidate is determined according to an order that is provided beforehand, and the order is looped so that the next one of the last candidate comes to the top. Note that the order is changed to the next order when the number of virtual storage devices housed in the physical storage device becomes the maximum or when the determination is made immediately.

The "the maximum number of virtual storage devices to be housed" 350103 indicates the maximum value of the number of virtual storage devices that can be disposed on the physical storage device. The column "the number of virtual storage devices to be housed" 350104 indicates the number of virtual storage devices that are currently disposed in the physical storage device. The column "the maximum number of active virtual storage devices" 350105 indicates the maximum number of virtual storage devices that can be brought into an active state, out of the virtual storage devices disposed in the physical storage device. Specifically, "the maximum number of active virtual storage devices" falls within the performance tolerance range of the physical storage device. The column "the number of active virtual storage devices" 350106 indicates the number of virtual storage devices that are currently in the active state, out of the virtual storage devices disposed in the physical storage device.

FIG. 25 shows an example of the virtual storage device assignment next candidate information 170203 according to the present embodiment. The "virtual storage device assignment next candidate information" 170203 has a column "next candidate" 360101. The column "next candidate" 360101 indicates the number in the column "assignment order" 350102 that corresponds to the physical storage device to be selected next, when using the round robin to select the physical storage device for disposing the virtual storage devices therein.

Figure 26:
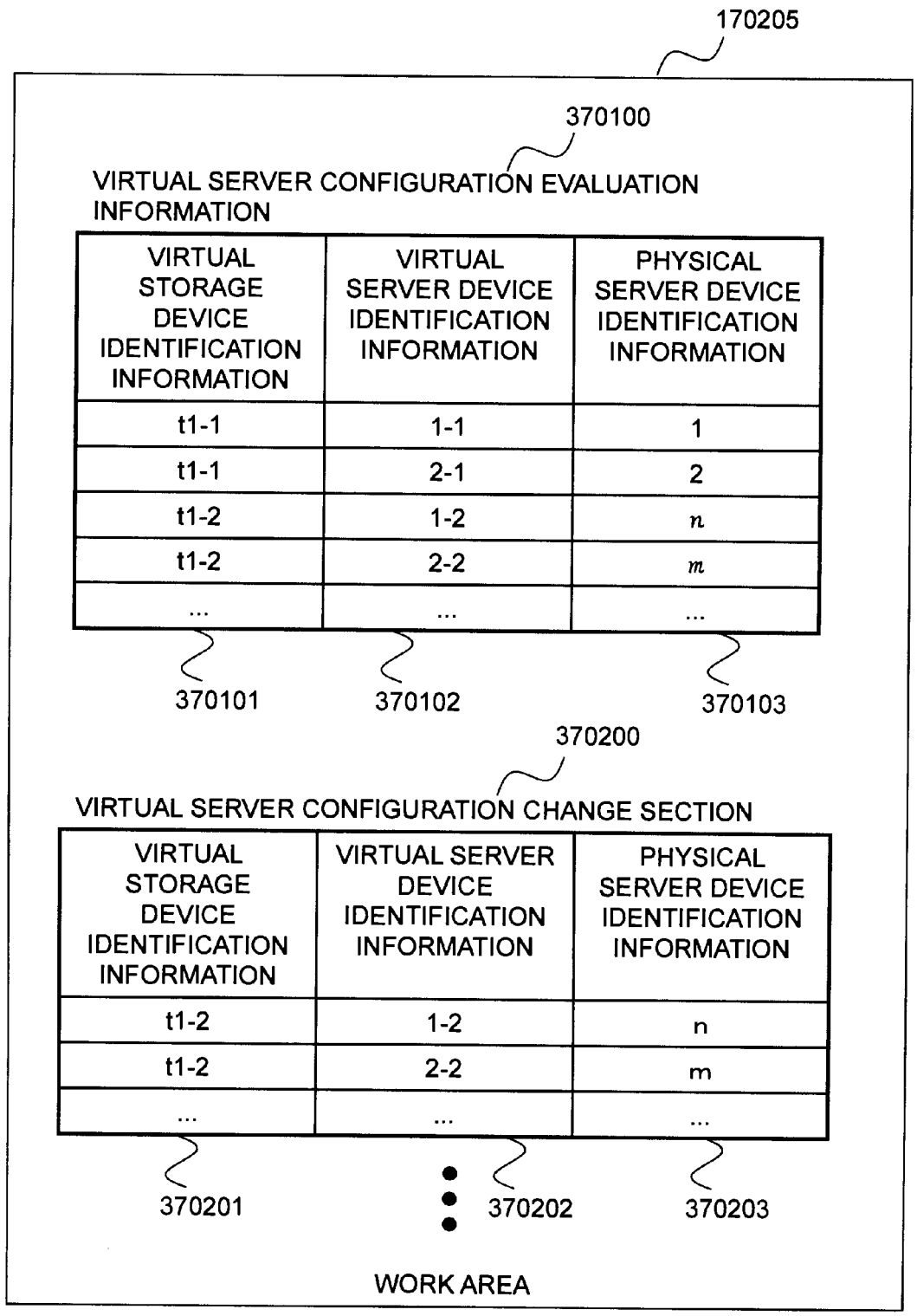
FIG. 26 shows an example of virtual server device configuration evaluation information and virtual server device configuration change section that are retained by a work area, according to Embodiment 1.

FIGS. 26 to 28 each show an example of the work area 170205 on the memory 160101 that is required when executing each program in the storage management server device according to the present embodiment.

The work area 170205 has virtual server device configuration evaluation information 370100 and virtual server device configuration change section 370200 that are shown in FIG. 26, an evaluation result 380100 shown in FIG. 27, and a relocation destination advice 390100 shown in FIG. 28.

The virtual server device configuration evaluation information 370100 indicates the virtual server devices that use the virtual storage device, as well as the repositories of the virtual server devices. The virtual server device configuration evaluation information 370100 has a column "virtual storage device identification information" 370101, a column "virtual server device identification information" 370102, and a column "physical server device identification information" 370103.

The virtual server device configuration change section 370200 shows the virtual server devices, the repositories of which are changed, and the physical server device in which the virtual server devices are disposed after the change. Further, the virtual server device configuration change section 370200 has a column "virtual storage device identification information" 370201, a column "virtual server device identification information" 370202, and a column "physical server device identification information" 370203.

The evaluation result 380100 shows an evaluation value of a candidate physical storage device in which the virtual storage device is disposed, in relation to another virtual system. The evaluation result 380100 has a column "virtual storage device identification information" 380101, a column "evaluation value" 380102, a column "physical storage device identification information" 380103, and a column "the number of remaining active virtual storage devices" 380104. The column "evaluation value" 380102 is a value resulting from the evaluation of the candidate physical storage device in which the virtual storage device is disposed. The column "the number of remaining active virtual storage devices" 380104 is the value obtained by subtracting the number of virtual storage devices in the active state, from the maximum number of active virtual storage devices 350105, in the physical storage device in which the virtual storage device is disposed.

The relocation destination advice 390100 is information on the ascending order or descending order of the evaluation values obtained when a certain virtual storage device is disposed on the candidate physical storage device. The relocation destination advice 390100 has a column "the maximum evaluation value" 390101, a column "physical storage device identification information" 390102, a column "the number of remaining housed virtual storage devices" 390103, and a column "the number of remaining active virtual storage devices" 390104. The relocation destination advice 390100 is created for each virtual storage device to be relocated.

For example, when a virtual system having the virtual storage device to be created or relocated is compared with a plurality of other virtual systems to compute the evaluation values, the largest value is stored in the column "the maximum evaluation value."

The column "the number of remaining housed virtual storage devices" 390103 is the value obtained by subtracting the number of virtual storage devices in the active state, from the maximum number of active virtual storage devices 350105, in the physical storage device in which the virtual storage device is disposed.

FIG. 29 shows screen-displayed contents 400100 of the display device 160200 of the storage management server device 100600. The screen-displayed contents 400100 have information "relocation destination advice to the virtual storage device 1-2" 400200. The information "relocation destination advice to the virtual storage device 1-2" 400200 has a column "the maximum evaluation value" 400201, a column "physical storage device identification information" 400202, a column "the number of remaining housed virtual storage devices" 400203, and a column "the number of remaining active virtual storage devices" 400204.

Hereinafter, a flow of the operation performed by the virtual server management server device 100500 is described with reference to FIGS. 30 to 35

Figure 30:
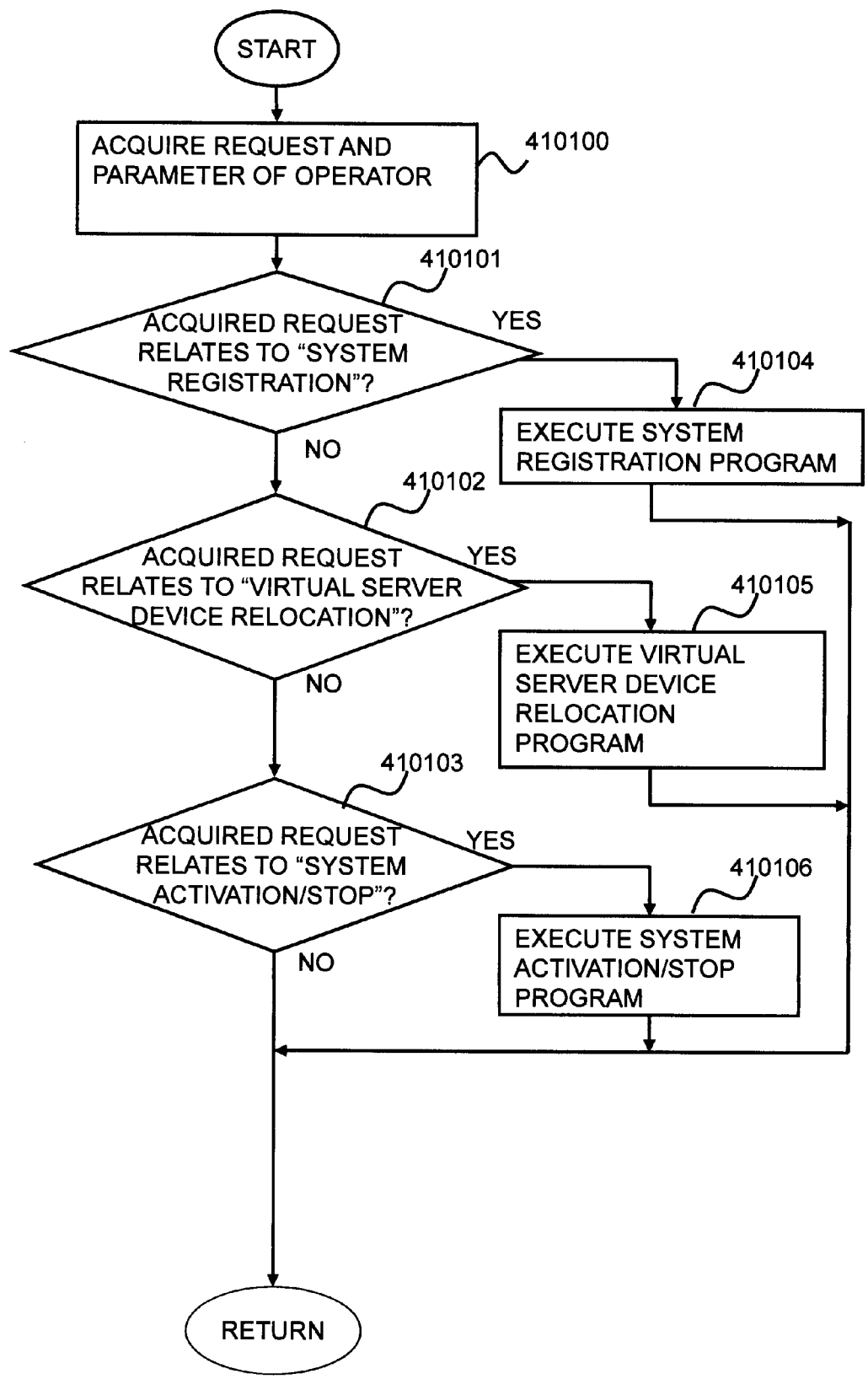
FIG. 30 shows an example of an operation performed by the virtual server management server device according to Embodiment 1.

FIG. 30 shows an example of the operation performed by the virtual server management server device 100500 according to the present embodiment, which is performed when a request is received from the operator or the like.

In a step 410100, the virtual server management server device acquires a request and a parameter from the operator.

In a step 410101, it is determined whether the request acquired in the step 410100 relates to "system registration" or not. When the request relates to the "system registration", the operation of a step 410104 is carried out. When the request does not relate to the "system registration," the operation of a step 410102 is carried out.

The system registration program 150102 is executed in the step 410104. The detail of this step is described hereinafter with reference to FIGS. 32 and 33.

In the step 410102, it is determined whether the acquired request relates to "relocation of virtual server devices" or not. When the request relates to the "relocation of virtual server devices," the operation of a step 410105 is carried out. When the request does not relate to the "relocation of virtual server devices," the operation of a step 410103 is carried out.

The virtual server device relocation program 150103 is executed in the step 410105. The detail of this step is described hereinafter with reference to FIG. 34.

In the step 410103, it is determined whether the acquired request relates to "system activation/stop" or not. When the request relates to the "system activation/stop," the operation of a step 410106 is performed. When the request does not relate to the "system activation/stop," the step is returned.

The system activation/stop program 150104 is executed in the step 410106. The detail of this step is described hereinafter in detail with reference to FIG. 35.

Figure 31:
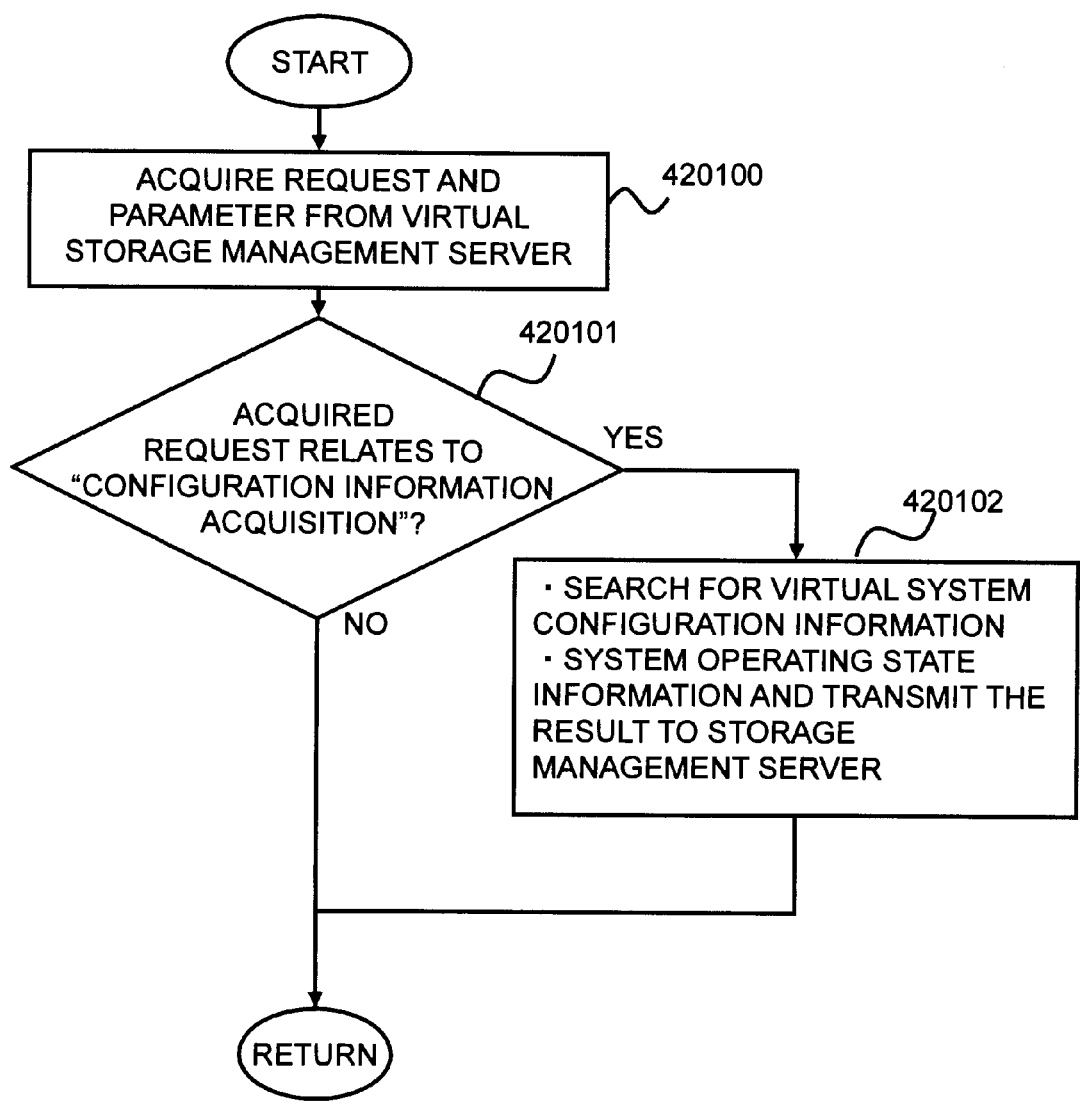
FIG. 31 shows an example of an operation performed by the virtual server management server device according to Embodiment 1.

FIG. 31 shows an example of the operation performed by the virtual server management server device on a request received from the storage management server device.

In a step 420100, the virtual server management server device 100500 acquires a request and a parameter from the storage management server device 100600, and performs the operation of a step 420101.

In the step 420101, it is determined whether the request acquired in the step 420100 relates to "configuration information acquisition." When the request relates to the "configuration information acquisition," the operation of a step 420102 is carried out. When the request does not relate to the "configuration information acquisition," the step is returned.

In the step 420102, a search condition is acquired as a parameter, from the storage management server device 100600. Then, the result of searching for the virtual system configuration information 150201 and the system operating state information 150202 according to the search condition is transmitted to the storage management server device 100600, and the step is returned.

Figure 32:
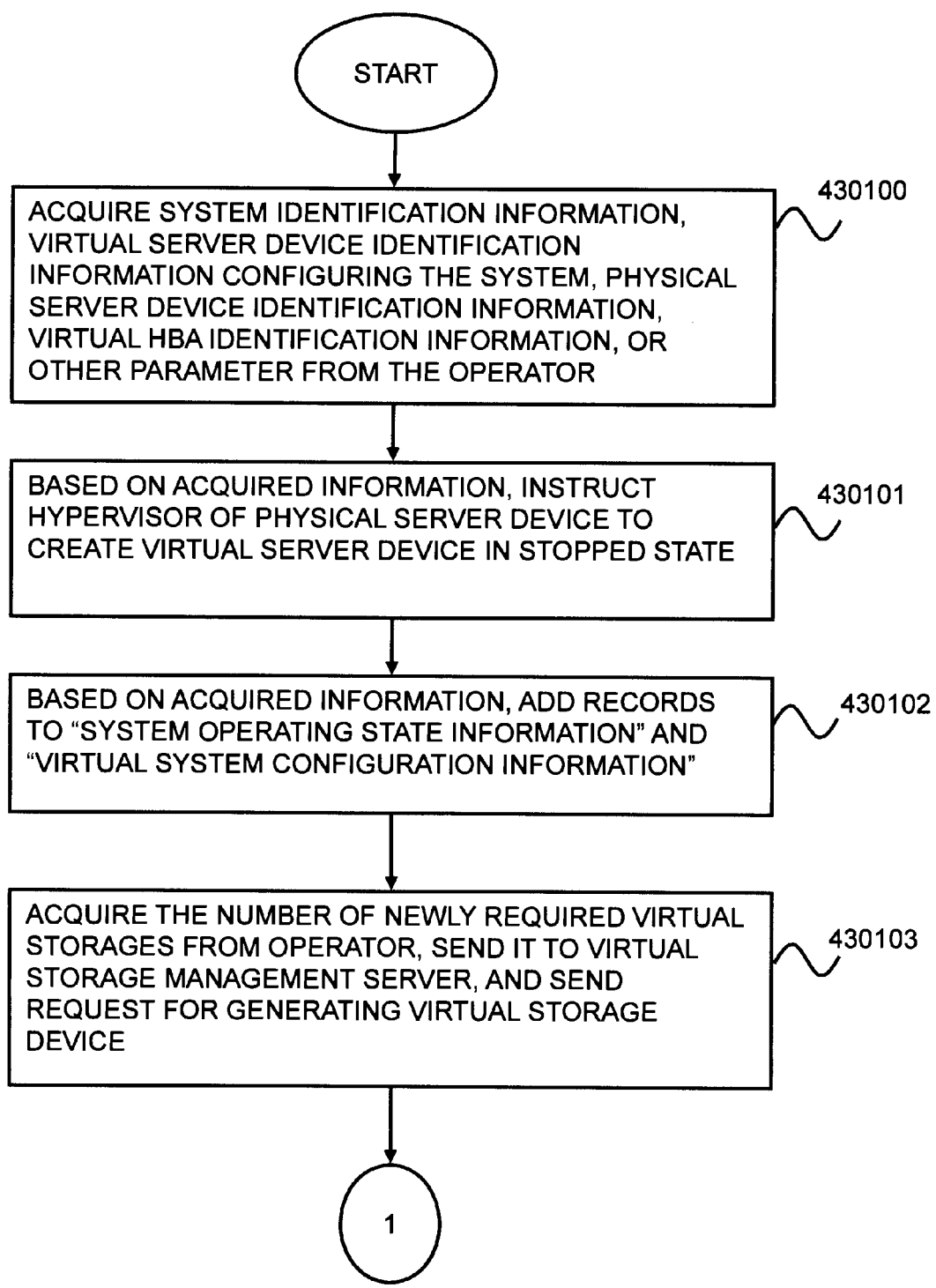
FIG. 32 shows an example of an operation of a system registration program performed by the virtual server management server device according to Embodiment 1.
Figure 33:
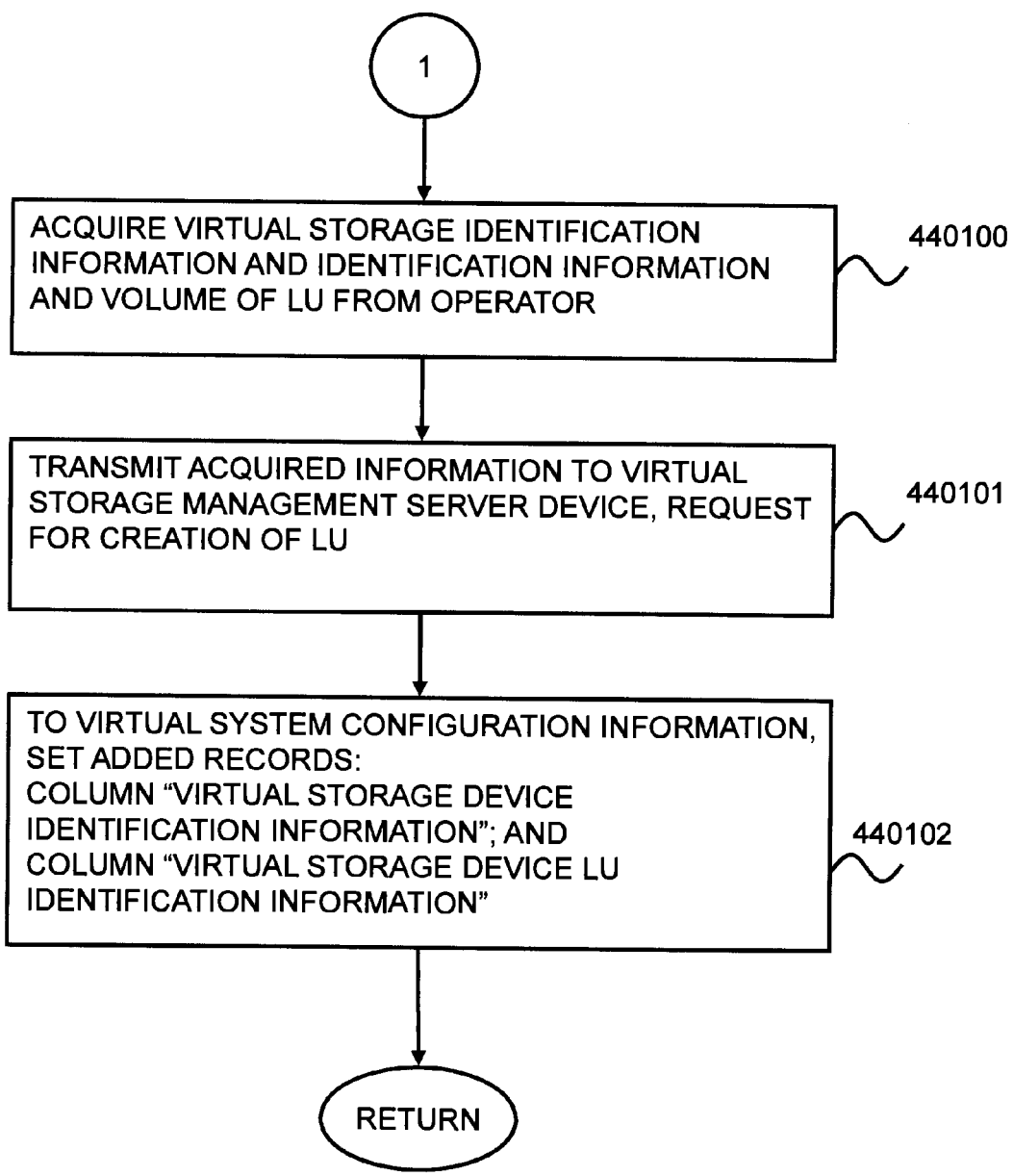
FIG. 33 shows an example of an operation of the system registration program performed by the virtual server management server device according to Embodiment 1.

FIGS. 32 and 33 each show an example of the operation of the system registration program 150102 performed by the virtual server management server device 100500 according to the present embodiment.

In a step 430100, the virtual server management server device 100500 acquires a parameter from the operator. Examples of the parameter include system identification information, virtual server device identification information configuring the system, physical server device identification information, and virtual HBA identification information.

In a step 430101, the virtual server management server device 100500 uses the parameter acquired in the step 430100 to instruct the physical server device to "generation of a stopped virtual server device" (the operation of the hypervisor program 120100).

In a step 430102, the virtual server management server device 100500 uses the parameter acquired in the step 430100 to add records to the system operating state information 150202 and to the virtual system configuration information 150201. The column that does not have a determinate value is set to a default (for example, value −1). However, the column "operating state" may be provided with a value "stop" as a default value.

In a step 430103, the virtual server management server device 100500 acquires, from the operator, the number of virtual storage devices included in a new virtual system. The virtual server management server device 100500 then sends the acquired number of virtual storage devices to the storage management server device 100600 and requests it to create a virtual storage device.

At this moment, the virtual server management server device 100500 acquires, from the storage management server device 100600, the identification information of the virtual storage device created in response to the request issued in the step 430103. The acquired identification information is displayed to the operator. At this moment, the number of created virtual storage devices is added to the column "the number of virtual storage devices to be housed" 350103 in the record of the physical storage device to which the physical storage device information 170202 corresponds.

In a step 440100, the virtual server management server device 100500 acquires, from the operator, the identification information and volume of the LU created in each virtual storage device, along with the virtual storage device identification information.

In a step 440101, the virtual server management server device 100500 sends the information acquired in the step 440100 to the storage management server device 100600 and requests it to create a LU. After sending the request, the virtual server management server device 100500 stands by until completion of creating the LU.

In a step 440102, the virtual server management server device 100500 uses the information defined up until the step 440100 to set, in the table "virtual system configuration information" 150201, the column "virtual storage device identification information" 310104 and the column "virtual storage device LU identification information" 310105 of the added records.

Figure 34:
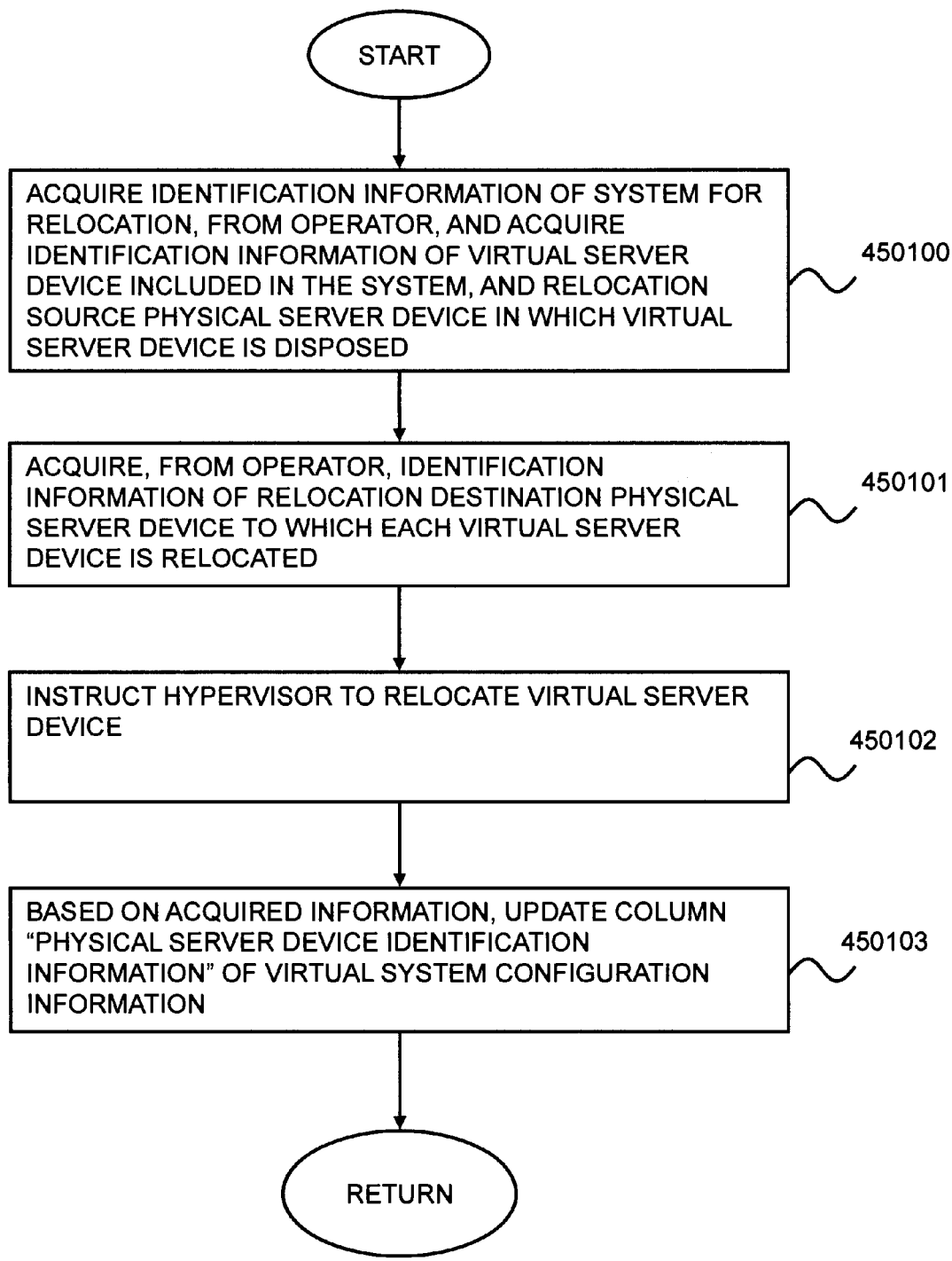
FIG. 34 shows an example of an operation of a virtual server device relocation program performed by the virtual server management server device according to Embodiment 1.

FIG. 34 shows an example of the operation of the virtual server device relocation program 150103 performed by the virtual server management server device 100500 according to the present embodiment.

In a step 450100, the virtual server management server device 100500 acquires, from the operator, the identification information of a system to which the virtual server devices are relocated. The virtual server management server device 100500 uses the acquired identification information and searches for the "system operating state information" 150202 to acquire the identification information of the virtual server devices included in the relocation destination system. In addition, the virtual server management server device 100500 acquires, from the "virtual system configuration" 150201, a relocation source physical server device in which the virtual server devices of the relocation destination system are disposed. The virtual server management server device 100500 then displays the information.

In a step 450101, the virtual server management server device 100500 acquires, from the operator, the identification information of the physical server device to which the virtual server devices are relocated.

In a step 450102, the virtual server management server device 100500 uses the information acquired in the step 450101 to instruct the relocation source and relocation destination physical server devices to relocate the virtual server devices (the operation of the hypervisor program).

Note that when the hypervisor program 120100 cannot realize the operation for relocating the virtual server devices, an instruction to create, in the relocation destination physical server device, virtual server devices having the same configuration as the virtual server devices to be relocated, and an instruction to delete the virtual server devices to be disposed on the relocation source physical server device may be sent.

In a step 450103, the virtual server management server device 100500 uses the information acquired in the step 450101 to update the column "physical server device identification information" 310102 of the virtual system configuration information 150201.

Figure 35:
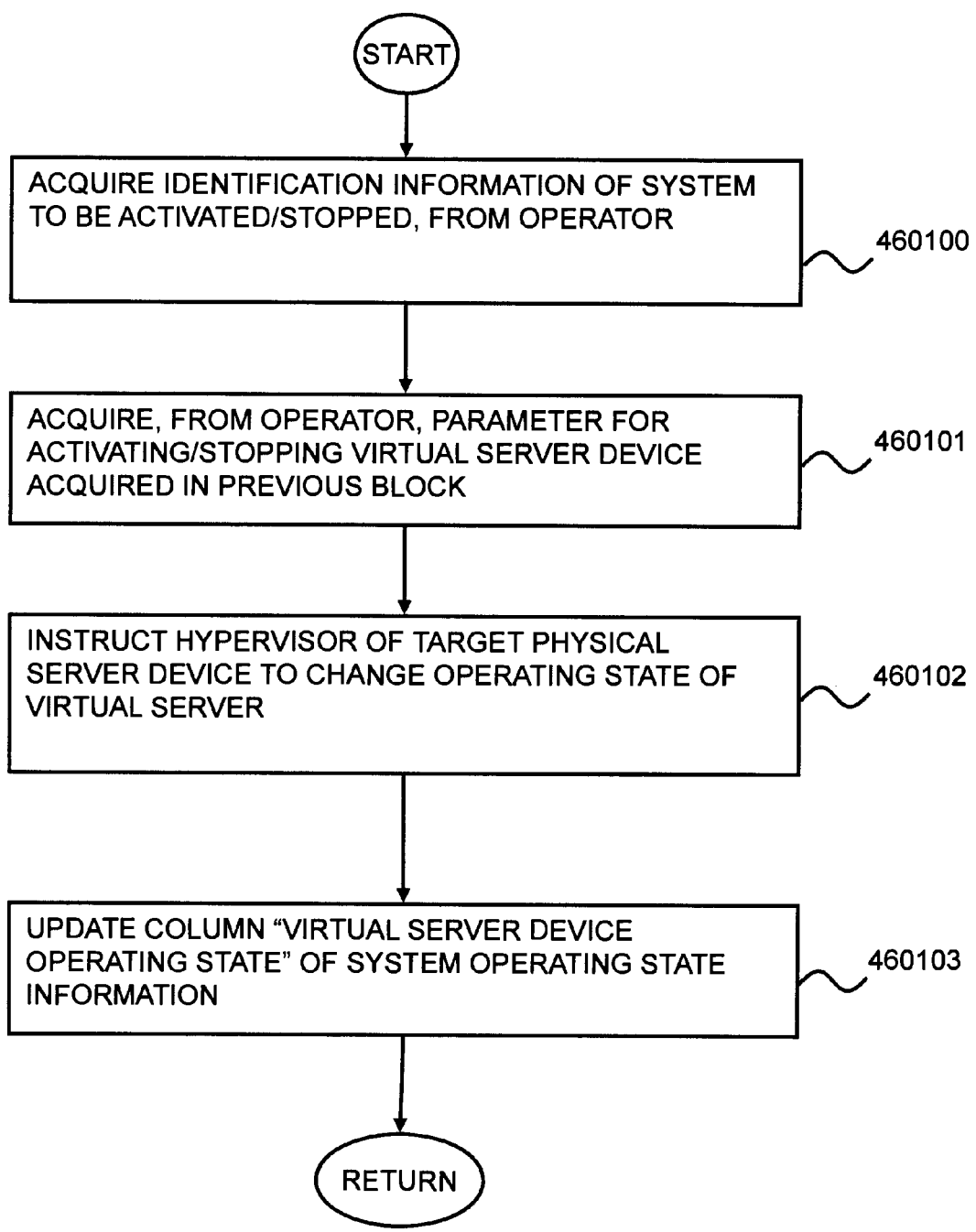
FIG. 35 shows an example of an operation of a system activation/stop program performed by the virtual server management server device according to Embodiment 1.

FIG. 35 shows an example of the operation of the system activation/stop program 150104 performed by the virtual server management server device 100600.

In a step 460100, the virtual server management server device 100500 acquires, from the operator, the identification information of the system to be activated/stopped. The virtual server management server device 100500 uses the acquired information and searches for the system operating state information 150202 to acquire the identification information of the virtual server devices to be activated/stopped. Further, a physical server device in which the virtual server devices are disposed is obtained from the virtual system configuration information 150201.

In a step 460101, the virtual server management server device 100500 acquires, from the operator, a parameter for activating/stopping the virtual server devices.

In a step 460102, the virtual server management server device 100500 uses the information acquired in the step 460100 to instruct the target physical device to change the operating states of the virtual server devices (the operation of the hypervisor program).

In a step 460103, the virtual server management server device 100600 uses the information acquired in the previous block, to update the column "virtual server device operating state" 320103 of the system operating state information 150202.

A flow of the operation performed by the storage management server device 100600 according to the present embodiment is described using FIGS. 36 to 46.

Figure 36:
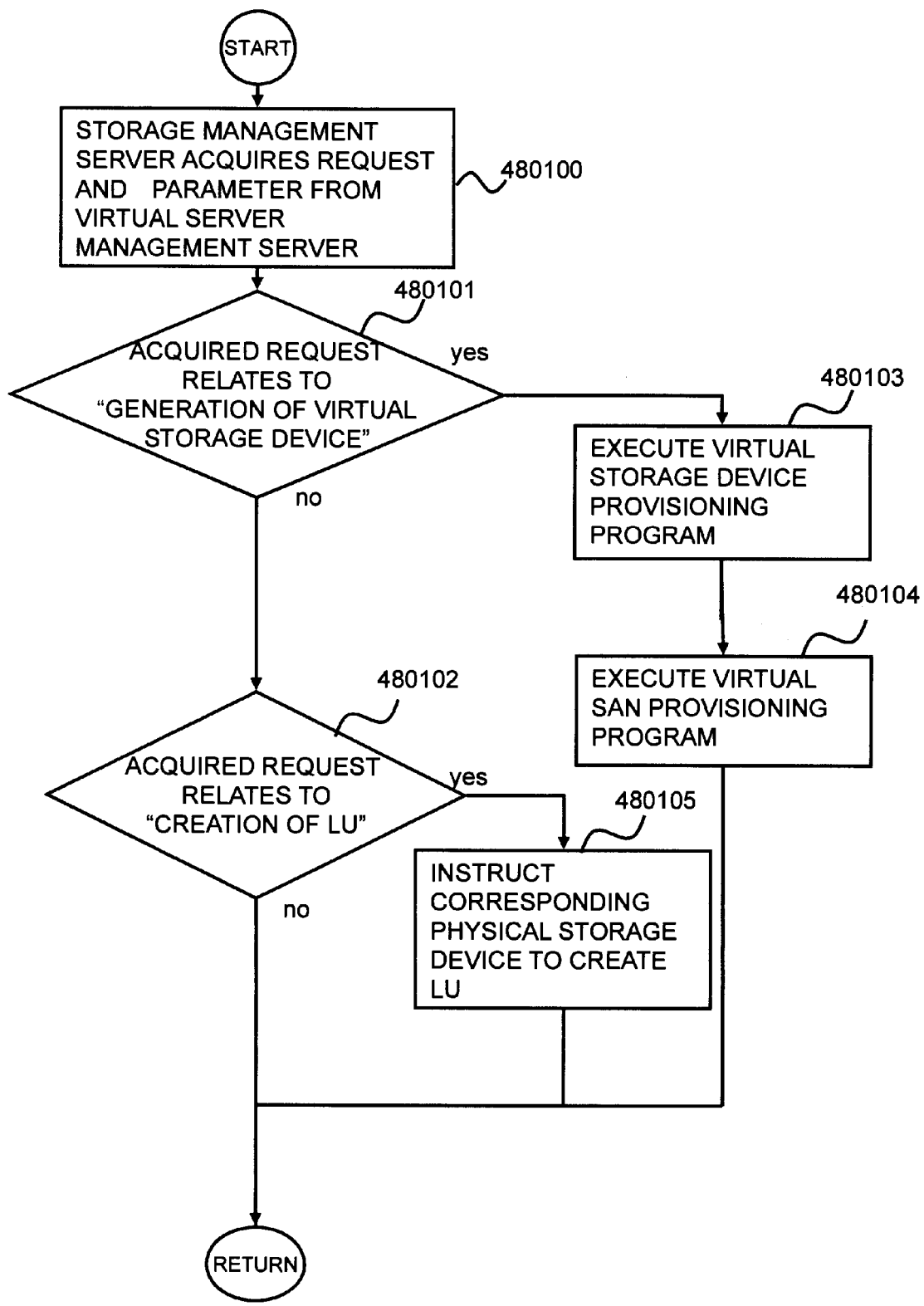
FIG. 36 shows an example of an operation performed by the storage management server device according to Embodiment 1.

FIG. 36 shows an example of the operation performed by the storage management server device 100600 on the request received from the virtual server management server device 100500.

In a step 480100, it is determined whether the acquired request relates to "creation of virtual storage devices." When the request relates to the "creation of virtual storage devices," the operations of steps 480103 and 480104 are executed sequentially and recovered. When the request does not relate to the "creation of virtual storage devices," the operation of a step 480102 is performed.

In the step 480103, the storage management server device 100600 executes the virtual storage device provisioning program 170102.

In the step 480104, the storage management server device 100600 executes the virtual SAN provisioning program 170107.

In the step 480102, it is determined whether the acquired request relates to "creation of LU." When the request relates to the "creation of LU," the operation of a step 480105 is carried out. When the request does not relate to the "creation of LU," the step is returned.

In the step 480105, creation of LU in the relevant physical storage device is requested.

Figure 37:
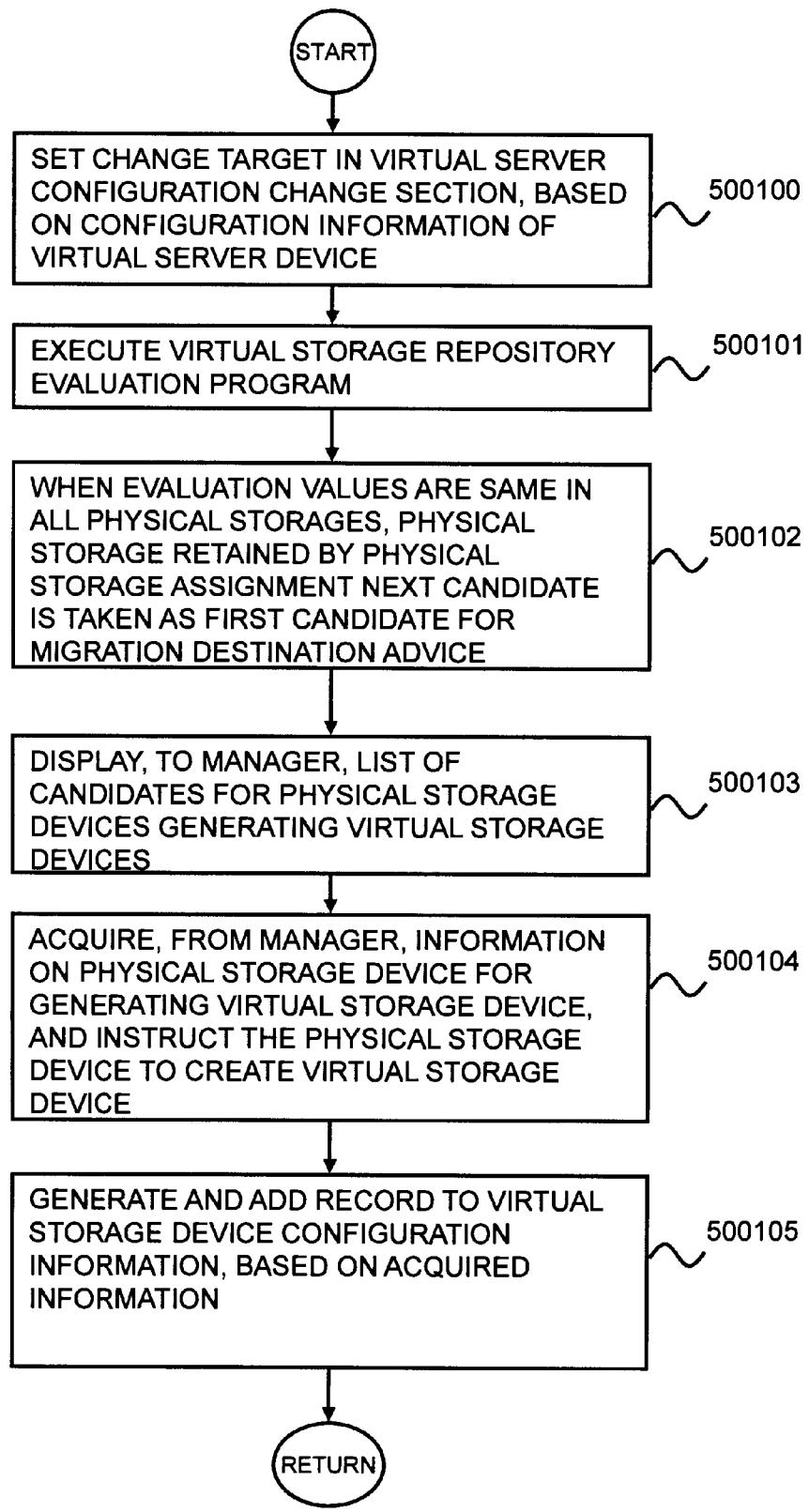
FIG. 37 shows an example of an operation of a virtual storage device provisioning program performed by the storage management server device according to Embodiment 1.

FIG. 37 shows an example of the operation of the virtual storage device provisioning program 170102 performed by the storage management server device 100600 according to the present embodiment.

In a step 500100, the storage management server device 100600 creates, as the virtual server device configuration change section 370200, "virtual server device configuration information" that is included in the virtual system and uses a virtual storage device created newly in the present operation.

The virtual storage device repository evaluation program 170104 is executed in a step 500101.

In a step 500102, when the same evaluation value is obtained for all of the physical storage devices, the storage management server device 100600 obtains, as the first candidate for the destination advice, the physical storage device corresponding to the value retained by the column "next candidate" 360101 of the physical storage device assignment next candidate 170203, on the basis of the result of the step 500101. At this moment, the identification information of the next physical storage device to which the virtual storage devices are assigned is obtained from the physical storage device information 170202 and then updated to the value of the column "next candidate" 360101.

In a step 500103, on the basis of the result of the step 500102, the storage management server device 100600 displays, to the manager, the information on the candidate physical storage device in which the virtual storage device is created (the information is not replaced, as with the screen-displayed contents 400100).

In a step 500104, the storage management server device 100600 acquires, from the manager, information on the physical storage device in which the virtual storage device is created. The storage management server device 100600 then instructs the physical storage device to create the virtual storage device.

In a step 500105, the storage management server device 100600 generates and adds a record to the virtual storage device configuration information 170201 on the basis of the information acquired up until the previous block. Note that the default value of the column "operating state" 340104 is inactive.

Note that the virtual server devices may be automatically relocated to a physical storage device having a high evaluation value, out of the candidate physical storage devices.

Figure 38:
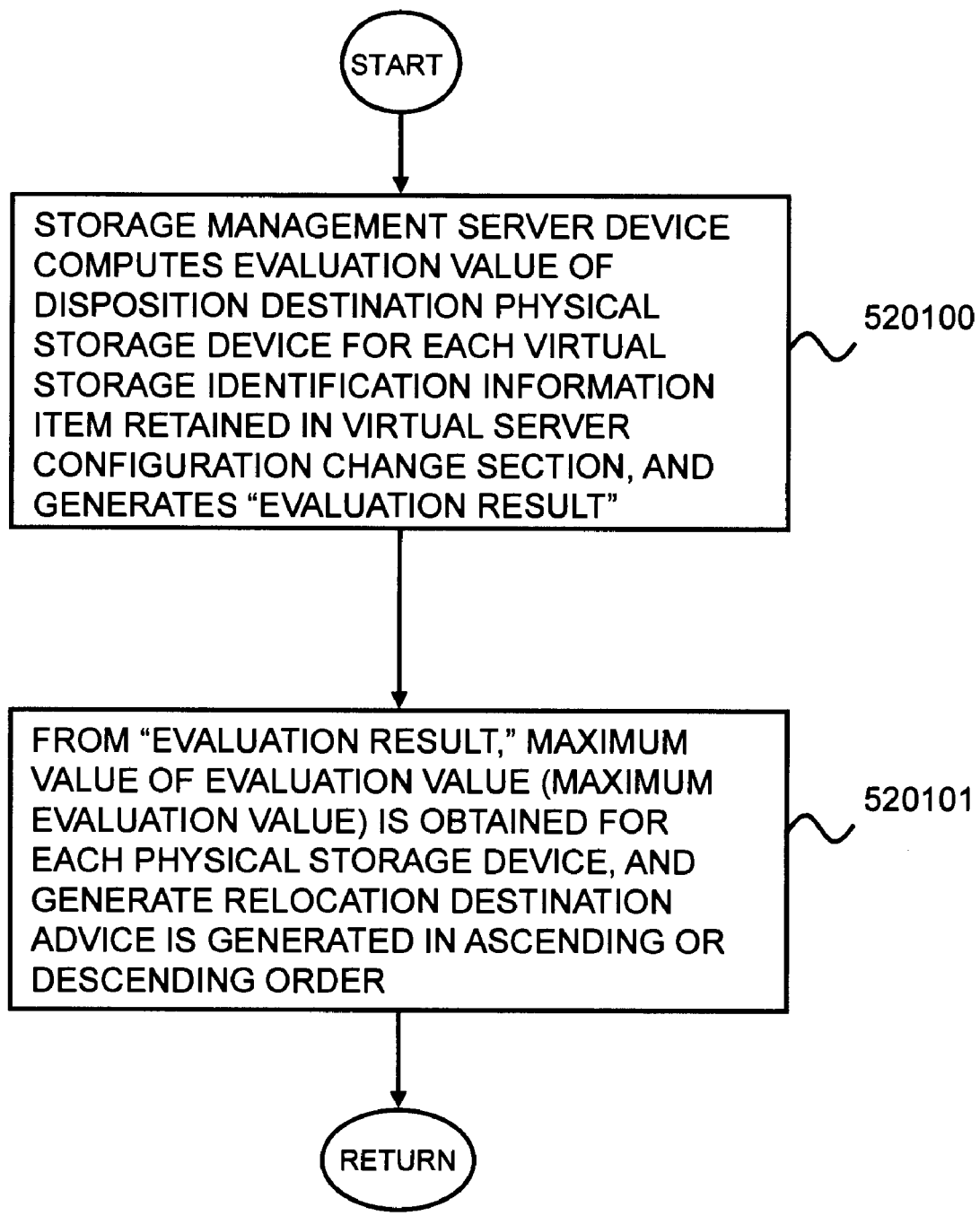
FIG. 38 shows an example of an operation of a virtual storage repository evaluation program performed by the storage management server device according to Embodiment 1.

FIG. 38 shows an example of the operation of the virtual storage device repository evaluation program 170104 performed by the storage management server device 100600 according to the present embodiment.

In a step 520100, the storage management server device 100600 searches for the virtual storage device identification information retained in the virtual server device configuration change section 370200. Then, for each identification information item of each virtual storage device (duplicate information is handled as one information item), the storage management server device 100600 computes the evaluation value of the physical storage device in which the virtual storage device is disposed, and the evaluation value obtained when the virtual storage devices are disposed in the physical storage device. Then, based on the computation result, the "evaluation result" 380100 is generated. Note that the column "the number of remaining active virtual storage devices" 380104 is a value obtained by subtracting the number of virtual storage devices in the active state, from the maximum number of active virtual storage devices 350105.

When computing the evaluation values of the repositories of the virtual storage devices, a plurality of computation methods are taken into consideration.

For example, the number of virtual server devices of the virtual system having the virtual storage devices to be evaluated and the number of virtual server devices of another virtual system disposed in the same physical server device are taken as the evaluation values of the physical storage device in which the virtual storage devices of the abovementioned another virtual system are disposed. Specifically, the virtual system to be evaluated is compared with the abovementioned another virtual system, and the number of physical server devices in which the virtual server devices of both systems are disposed is taken as the evaluation value of the physical storage device in which the virtual storage devices of the abovementioned another virtual system are disposed. The evaluation value is equivalent to the denominator of the equation shown in a block 380200 illustrated in FIG. 27. The definition of the function Vm (vs, ps) returns a value 1 when the virtual server devices of the virtual system of the virtual storage device vs are disposed in the physical server device ps, and returns a value 0 in other cases.

Based on the evaluation value described above, the virtual storage devices can be relocated to suitable physical storage devices in relation to the abovementioned another virtual system.

However, there is a case where it is not appropriate to evaluate the number of physical server devices as an absolute value. In this case, the evaluation value is standardized. The block 380200 in FIG. 27 shows an example of computing the evaluation value, including standardization computation. Out of the number of physical storage devices in which are disposed the virtual server devices of the virtual system having virtual storage devices for relocation, and the number of physical storage devices in which are disposed the virtual server devices of the virtual system having other virtual storage devices, the larger number is used to divide and standardize the evaluation value.

By performing the standardization as above, the inclusion relation of the physical server devices in which the virtual server devices are disposed can be taken into consideration. Specifically, the maximum value is shown when the repositories of the virtual server devices are completely conform to each other.

An example of evaluating a correlation degree, such as an evaluation formula shown in FIG. 55, is used. Out of the number of physical storage devices in which are disposed the virtual server devices of the virtual system having the virtual storage devices for relocation, and the number of physical storage devices in which are disposed the virtual server devices of the virtual system having other virtual storage devices, the smaller number is used to divide and standardize the evaluation value. By performing the standardization, duplication can be taken into consideration.

Note that there is a possibility that the evaluation formula is changed according to the system operation management policy, and the evaluation formula is changed depending on the characteristics of the consolidated systems.

In a step 520101, the maximum value of the evaluation value is computed for each physical storage device, on the basis of the "evaluation result" 380100. Then, for each virtual storage device to be relocated, the maximum evaluation values of the repositories of the virtual storage devices are stored in an ascending order or descending order, and the relocation destination advice 390100 is generated.

The virtual storage device repository evaluation program 170104 can be used to advise the repositories of the virtual server devices of the system, on the physical storage device as the relocation destination of the virtual storage devices, the physical storage device being used by a virtual system having a high correlation. When performing consolidation using the virtual system, it can be done by preventing the occurrence of an operational error in the non-operated virtual system. Similarly, in the case of aggregating the system for the purpose of power saving, even when the virtual server devices are migrated disproportionately to some of the physical server devices, the occurrence of an operational error can be prevented and accordingly the virtual storage devices can be migrated disproportionately to some of the physical storage devices.

Figure 39:
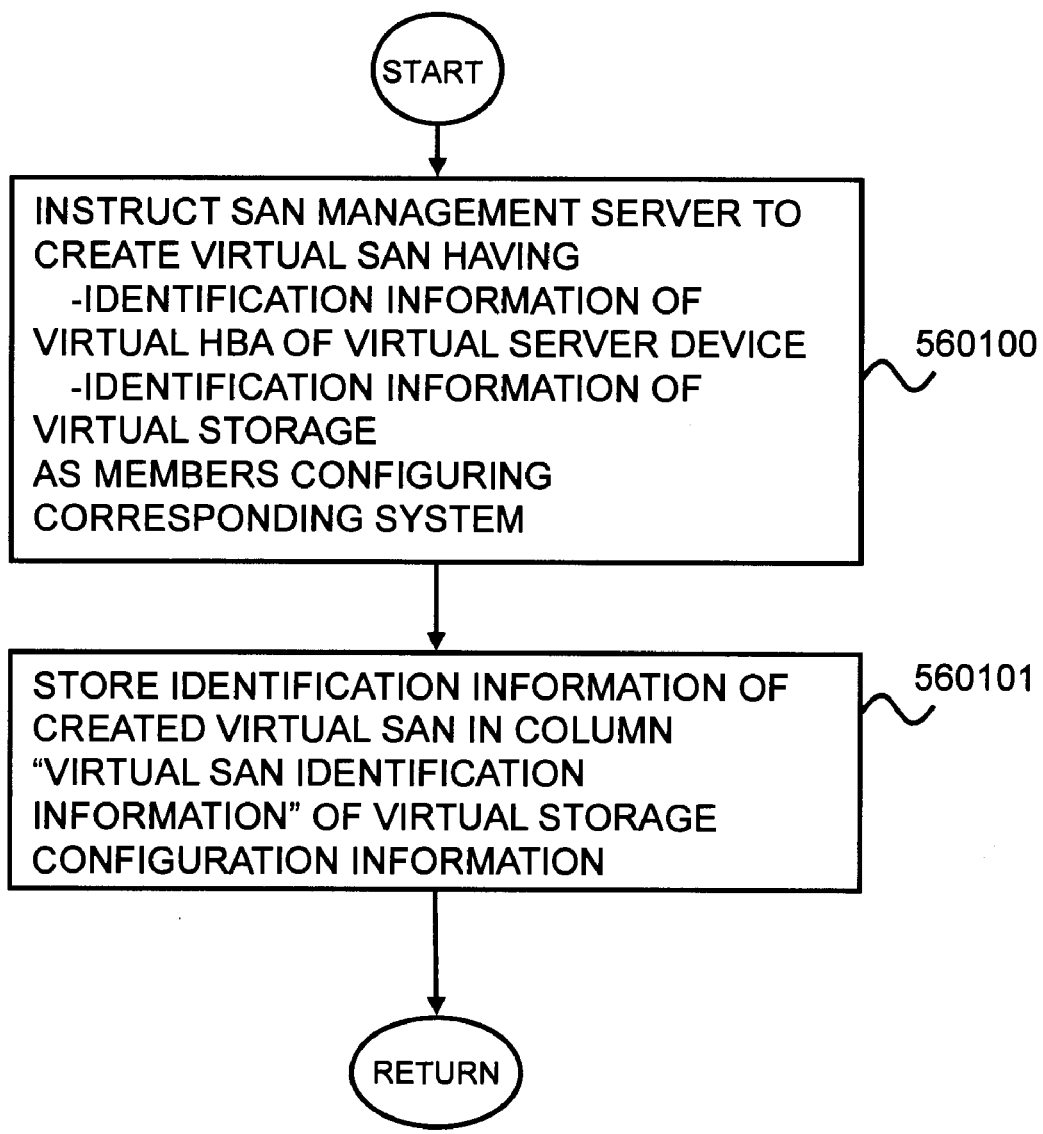
FIG. 39 shows an example of an operation of a virtual SAN provisioning program according to Embodiment 1.

FIG. 39 shows an example of the operation of the virtual SAN provisioning program 170107 according to the present embodiment.

In a step 560100, the storage management server device 100600 instructs the SAN management server device 100700 to create the virtual SAN that has, as members, the identification information of the virtual HBA of each of the virtual server devices configuring the corresponding system, and the identification information of the virtual storage devices.

In a step 560101, in relation to the virtual storage devices configuring the corresponding system, the identification information of the created virtual SAN is stored in the column "virtual SAN identification information" 340103 of the virtual storage configuration information 170201.

Figure 40:
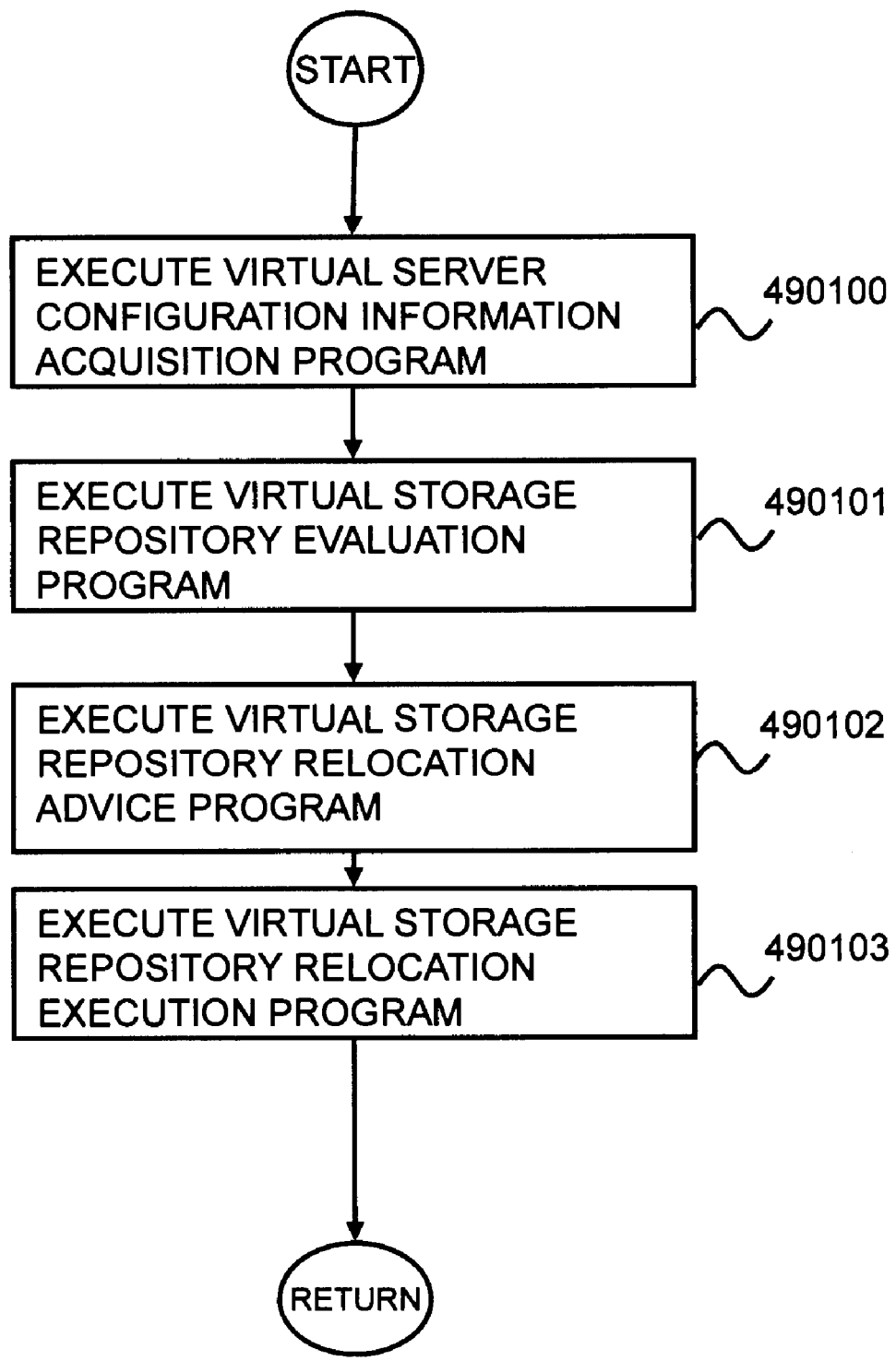
FIG. 40 shows an example of a monitoring operation performed by the storage management server device according to Embodiment 1.

FIG. 40 shows an example of a monitoring operation carried out regularly by the storage management server device 10600.

Figure 41:
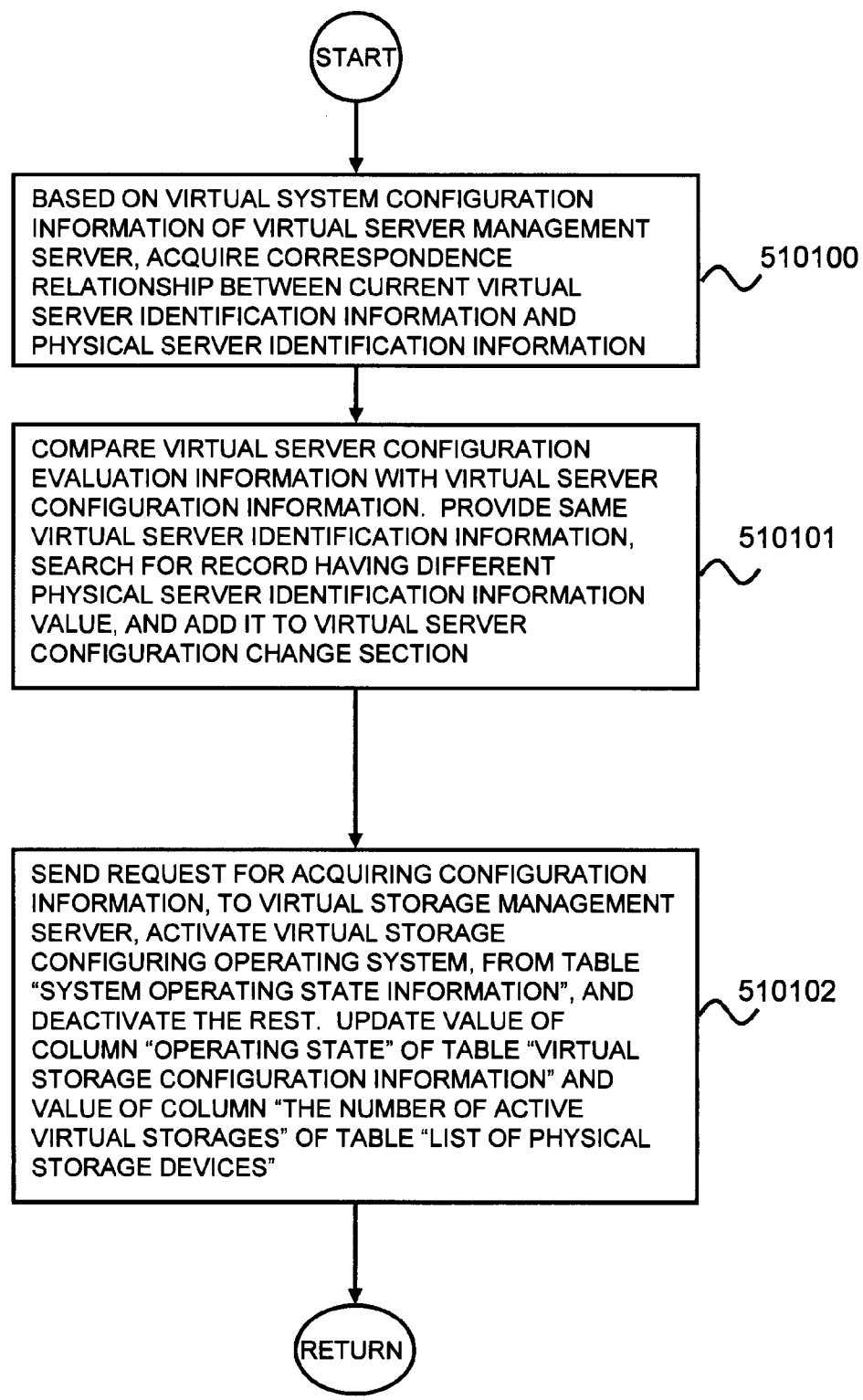
FIG. 41 shows an example of an operation of a virtual server device configuration information acquisition program performed by the storage management server device according to Embodiment 1.

The virtual server device configuration information acquisition program 170103 is executed in a step 490100. The detail of this step is shown in FIG. 41.

The virtual storage device repository evaluation program 170104 is executed in a step 490101. The detail of this step is shown in FIG. 38.

Figure 42:
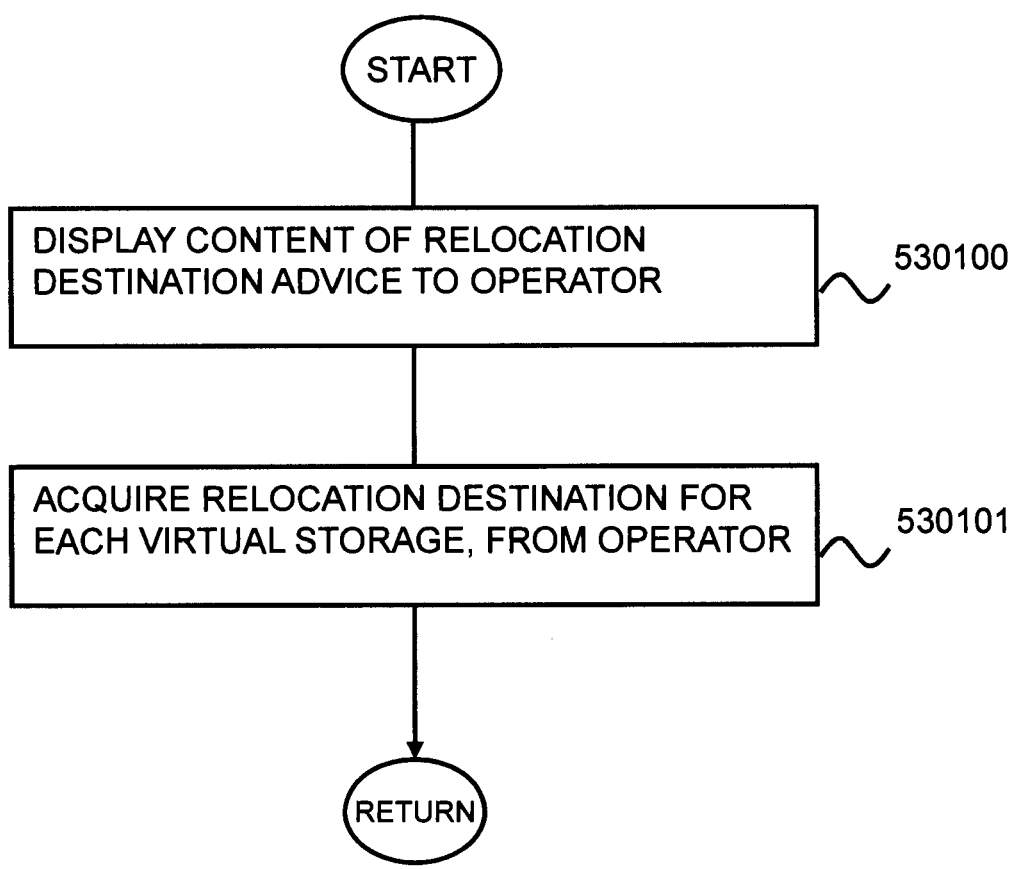
FIG. 42 shows an example of an operation of a virtual storage device repository relocation advice program performed by the storage management server device according to Embodiment 1.

The virtual storage device repository relocation advice program 170105 is executed in a step 490102. The detail of this is shown in FIG. 42.

Figure 43:
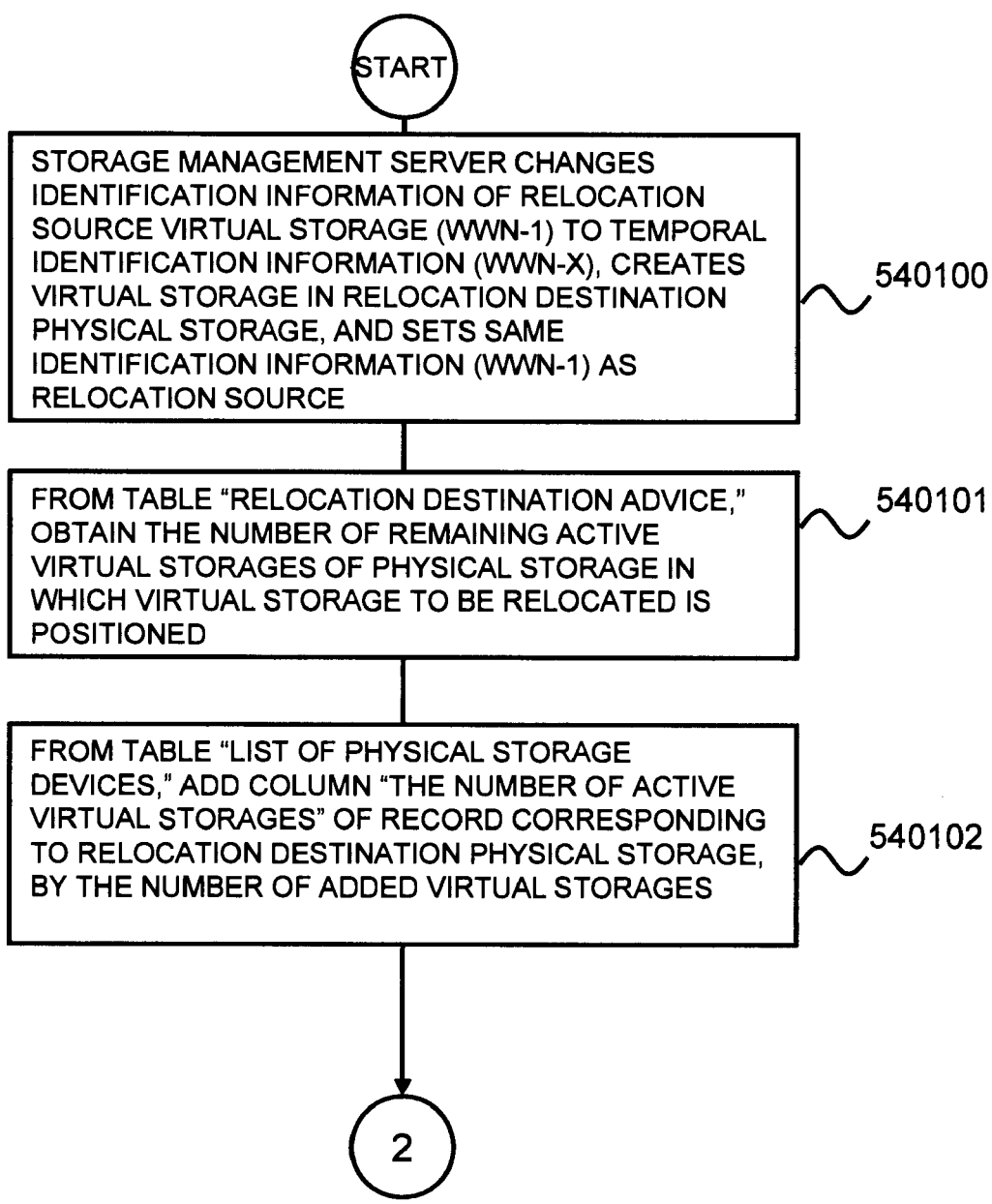
FIG. 43 shows an example of an operation of a virtual storage device repository relocation execution program according to Embodiment 1.

The virtual storage device repository relocation execution program 170106 is executed in a step 490103. The detail of it is shown in FIG. 43.

FIG. 41 shows a flow of the operation of the virtual server device configuration information acquisition program 170103 that is executed by the storage management server device 100600 according to the present embodiment. Using this program, a change in the physical server device in which the virtual server devices of the virtual system are disposed can be confirmed.

In a step 510100, the storage management server device 100600 issues a request for configuration information acquisition, to the virtual server management server device. Specifically, the correspondence relationship between the current virtual server device identification information and the physical server device identification information is acquired from the "virtual system configuration information" 150201 and stored in the virtual server device configuration evaluation information 370100.

In a step 510101, the storage management server device 100600 compares the virtual server device configuration evaluation information 370100 acquired in the step 510100 with the virtual server device configuration information 170200, in order to determine whether the repositories of the virtual server devices are changed. Although the storage management server device 100600 has the same identification information of the virtual server device, the storage management server device 100600 searches for the record having a different value of the identification information of the physical server device, and adds it to the virtual server device configuration change section 370200.

In a step 510102, the storage management server device acquires the operating states of the virtual server devices from the system operating state information 150202 of the virtual server management server device. The virtual storage devices configuring the operated system are taken as active devices, and the rest of the virtual storage devices are taken as inactive devices. Then, the value of the column "operating state" 340104 of the virtual storage device configuration information 170201 and the value of the column "the number of active virtual storage devices" 350106 of the physical storage device information 170202 are updated.

FIG. 42 shows an example of the operation of the virtual storage device repository relocation advice program 170105 according to the present embodiment.

In a step 530100, the storage management server device displays, to the operator, the content of the relocation destination advice 390100 as the displayed contents 400100, by means of the display device 160200.

In a step 530101, the storage management server device acquires, from the operator, the identification information of the relocation destination physical storage device for each virtual storage device, by means of the input device 160201.

Figure 44:
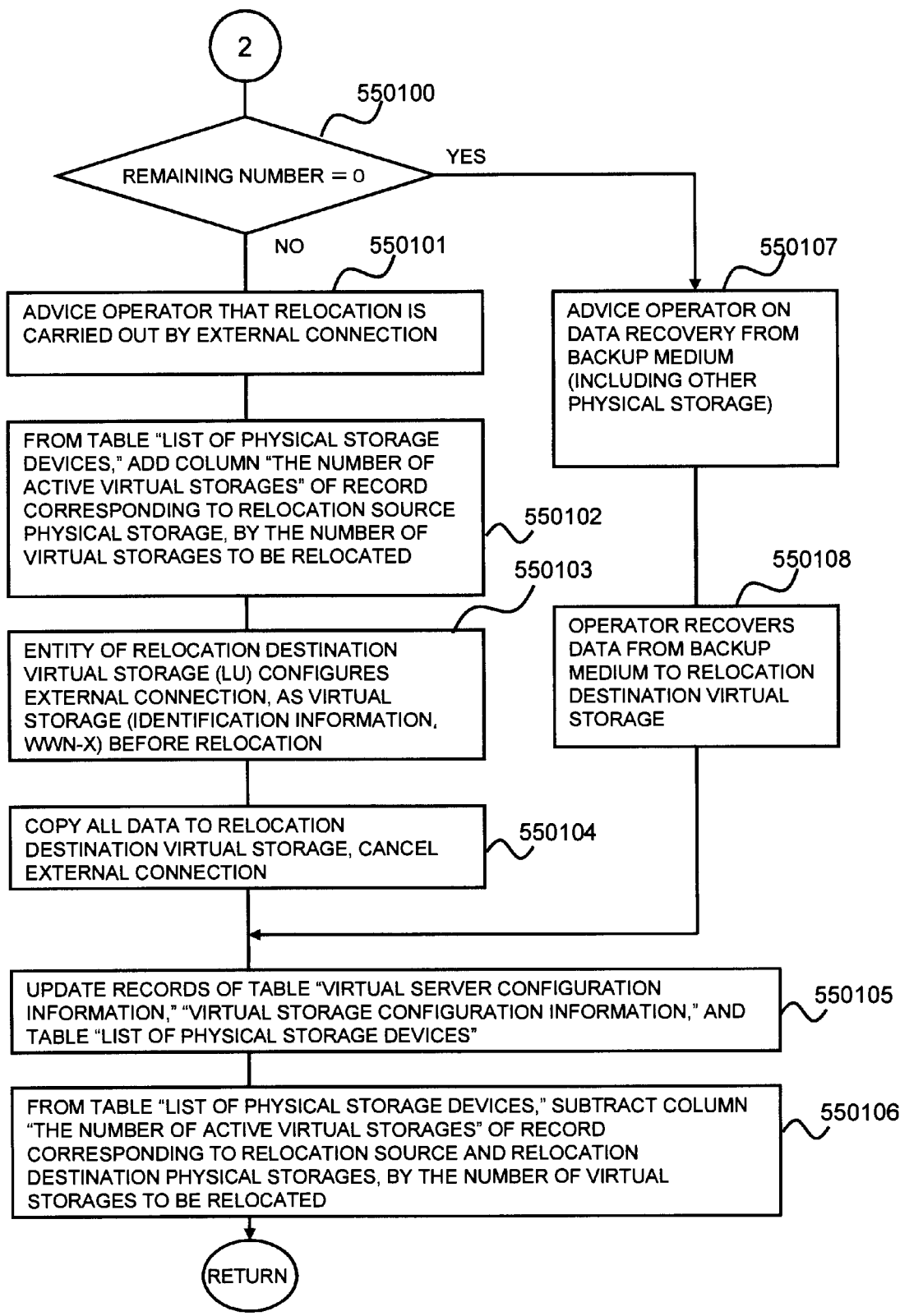
FIG. 44 shows an example of an operation of the virtual storage device repository relocation execution program according to Embodiment 1.

FIGS. 43 and 44 each show an example of the operation of the virtual storage device repository relocation execution program 170106 according to the present embodiment.

In a step 540100, the storage management server device 100600 changes the identification information (WWN-1) of the relocation source virtual storage devices to temporal identification information (WWN-x). The storage management server device 100600 then creates the virtual storage devices in the relocation destination physical storage device, and sets the same identification information (WWN-1) as that of the relocation source.

In a step 540101, the storage management server device 100600 acquires, from the relocation destination advice 390100, the number of remaining active virtual storage devices of the physical storage device in which the virtual storage devices to be relocated are disposed.

In a step 540102, the number of added virtual storage devices is added from the physical storage device information 170202 to the column "the number of active virtual storage devices" 350106 of the record corresponding to the relocation destination physical storage device.

In a step 550100 shown in FIG. 44, the storage management server device 100600 determines whether the number of remaining active virtual storage devices is 0. When it is 0, the operations of steps 550107 and 550108 are sequentially executed, and then the operation of a step 550105 is performed. When it is not 0, the operations of steps 550101, 550102, 550103 and 550104 are sequentially executed, and then the operation of the step 550105 is carried out.

First, the case where the number of remaining active virtual storage devices is not 0 is described.

In the step 550101, the fact that the relocation is carried out by means of external connection is displayed to the operator. The example of the relocation by means of external connection is as described above with reference to FIG. 18.

In the step 550102, the number of virtual storage devices to be relocated is added from the physical storage device information 170202 to the column "the number of active virtual storage devices" 350106 of the record corresponding to the relocation source physical storage device.

In the step 550103, the entity of the relocation destination virtual storage device (LU) is externally connected as the virtual storage device (identification information WWN-x) before relocation. Specifically, when access is made from a host computer or the like to the relocation destination virtual storage device, setting is done such that the access is made via the external connection to the virtual storage device before relocation.

In the step 550104, all of the data are copied (or transferred) to the relocation destination virtual storage device from the relocation source virtual storage device, and the external connection configured in the step 550103 is canceled.

In the step 550105, the records corresponding to the virtual server device configuration information 170200, the virtual storage device configuration information 170201, and the physical storage device information 170202 are updated, and the operation of the step 550106 is carried out.

In the step 550106, on the table "physical storage device information" 170202, the column "the number of active virtual storage devices" 350106 of the record corresponding to the relocation source physical storage device is subtracted from the number of virtual storage devices to be relocated, and the step is returned.

Next is described the case where the number of remaining active virtual storage devices is 0.

In the step 550107, an advice on data recovery from the backup medium (including another physical storage device) is displayed to the operator.

In the step 550108, the data of the relocation destination virtual storage devices are recovered from the backup medium in response to an instruction from the operator.

Figure 45:
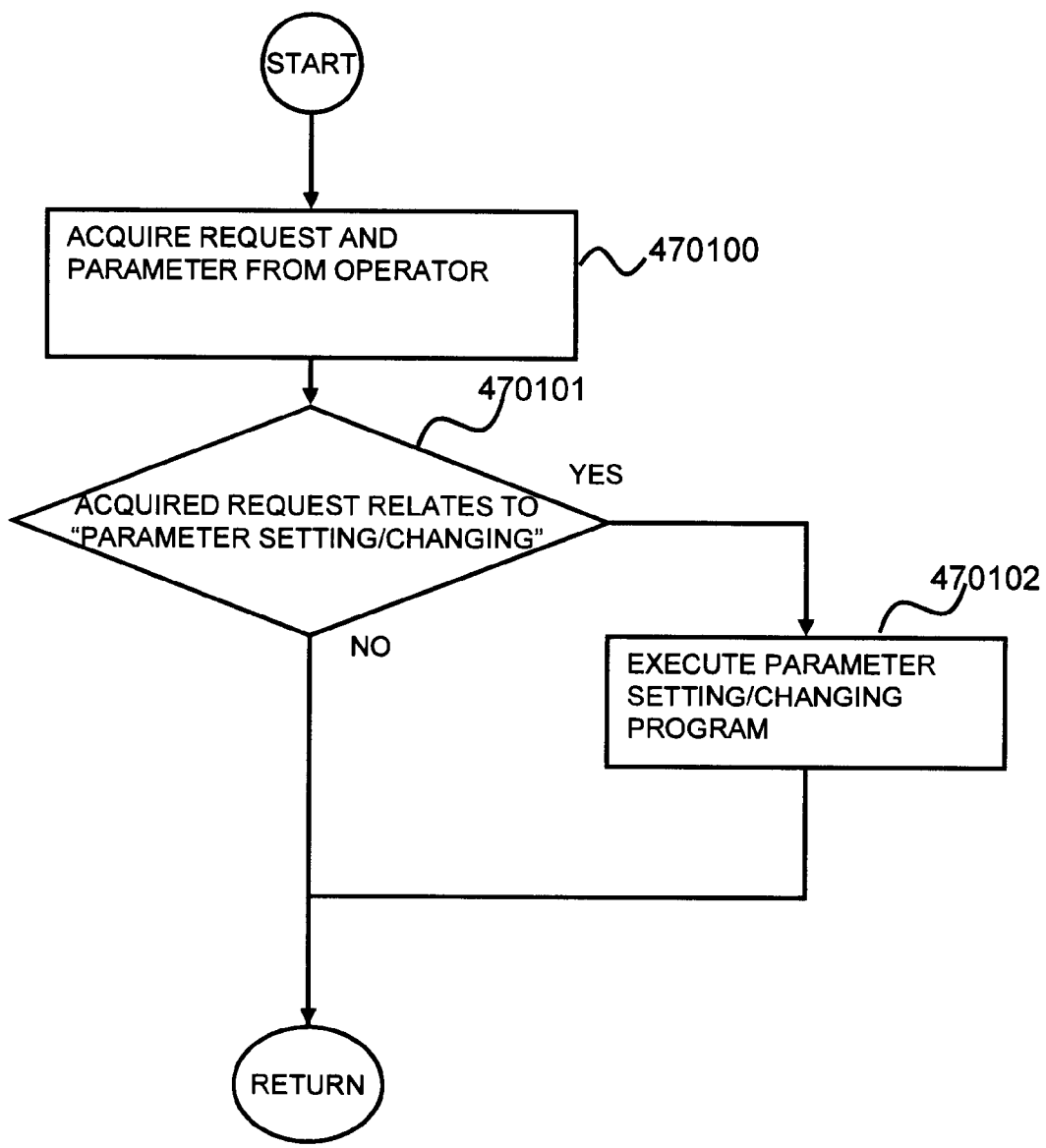
FIG. 45 shows an example of an operation of the storage management server device according to Embodiment 1.

FIG. 45 shows the flow of the operation performed by the storage management server device 100600 in response to a request from the operator, according to the present embodiment.

In a step 470100, the storage management server device 100600 acquires a request and parameter from the operator.

In a step 470101, it is determined whether the acquired request relates to "parameter setting/changing." When the acquired request relates to the "parameter setting/changing," the operation of a step 470102 is performed and the step is returned. When the acquired request does not relate to the "parameter setting/changing," the step is returned.

In the step 470102, the storage management server device 100600 executes the parameter setting/changing program 170108, and returns the step.

Figure 46:
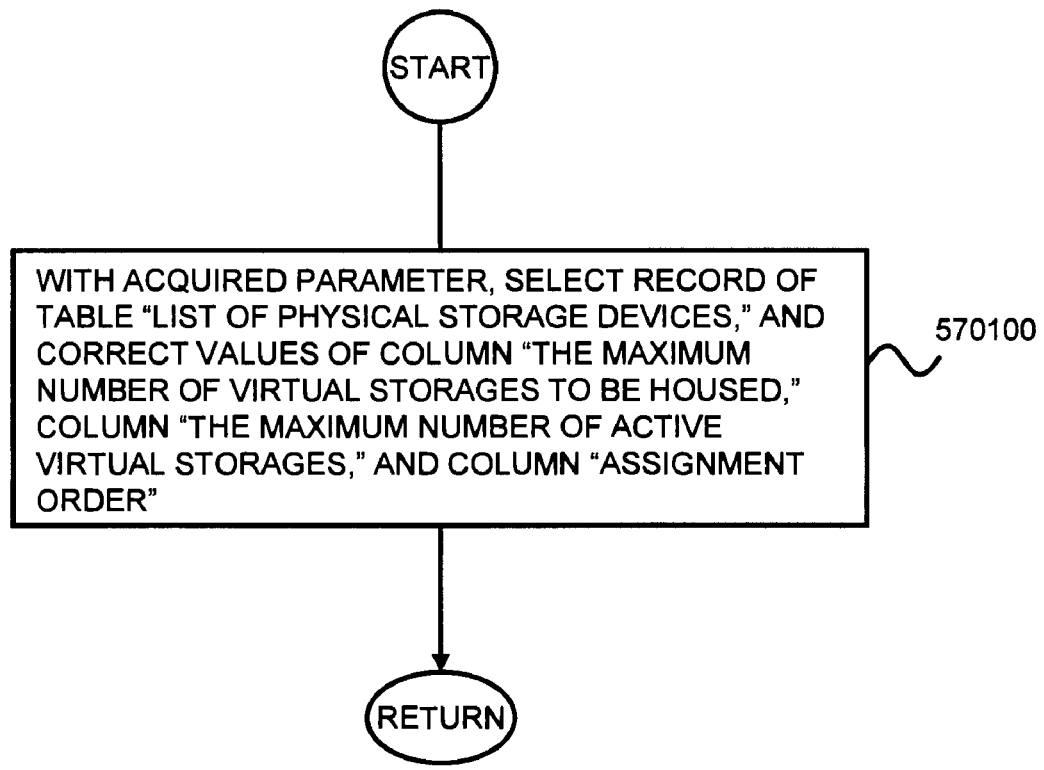
FIG. 46 shows an example of an operation of a parameter setting/changing program according to Embodiment 1.

FIG. 46 shows an example of the operation of the parameter setting/changing program 170108 according to the present embodiment.

In a step 570100, the record of the table "physical storage device information" 170202 is selected using the acquired parameter, and the values specified by the column "the maximum number of virtual storage devices to be housed" 350103, the column "the maximum number of active virtual storage devices" 350105, and the column "assignment order" 350102 are corrected.

Figure 47:
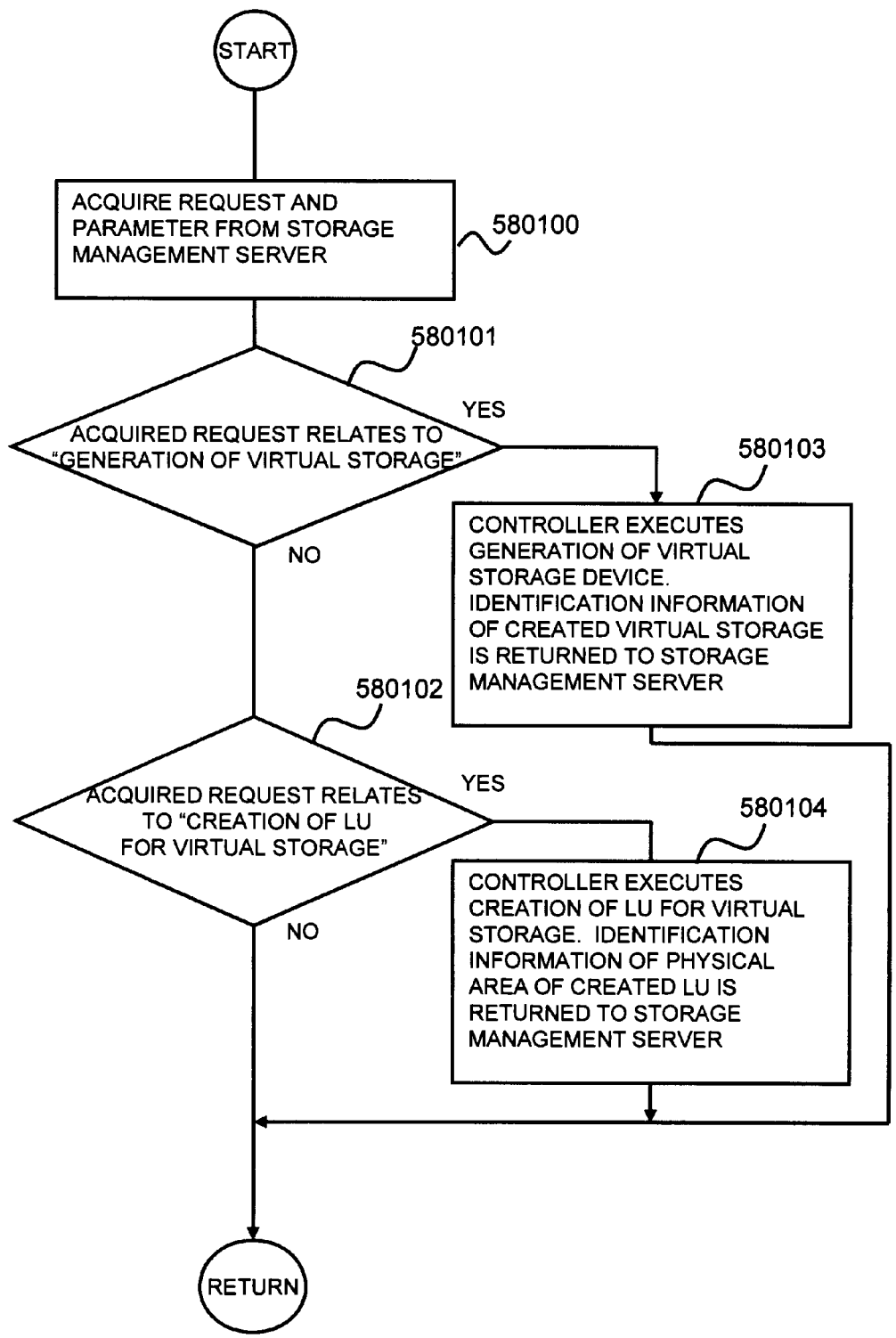
FIG. 47 shows an example of an operation of the physical storage device according to Embodiment 1.
Figure 48:
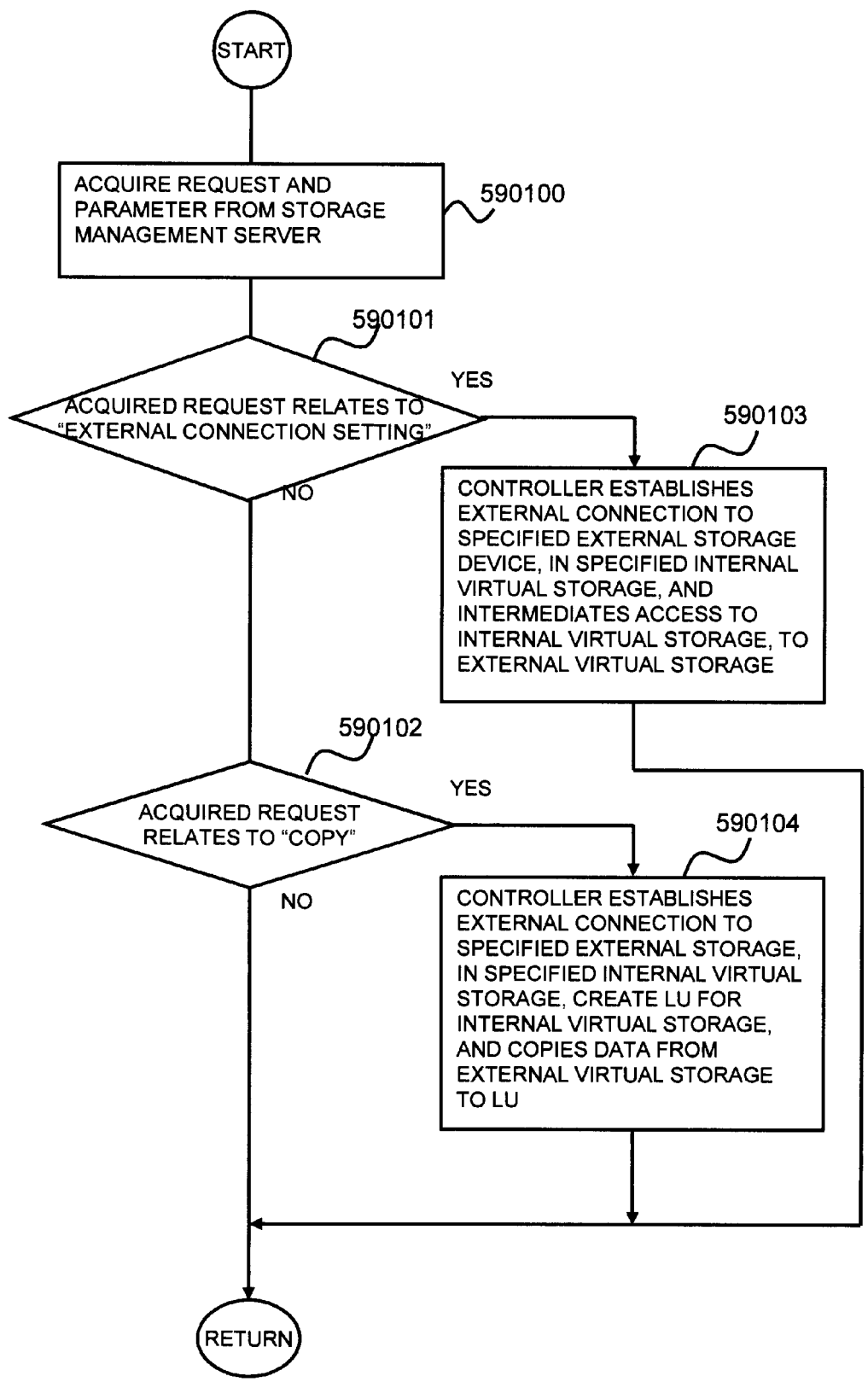
FIG. 48 shows an example of the operation of the physical storage device according to Embodiment 1.

FIGS. 47 and 48 each show an example of the operation of the physical storage device 100201 according to the present embodiment.

FIG. 47 shows an example of the operation of the physical storage device 100200 performed in response to a request from the storage management server device 100600, according to the present embodiment. Particularly, FIG. 47 shows a flow of the operation of the virtual storage management program 130102.

In a step 580100, the physical storage device 100201 acquires a request and parameter from the storage management server device.

In a step 580101, the controller (1) 130101 determines whether or not the acquired request relates to "creation of virtual storage devices". When the acquired request relates to the "creation of virtual storage devices," the operation of a step 580103 is performed, and the step is returned. When the acquired request does not relate to the "creation of virtual storage devices," the operation of a step 580102 is carried out.

In the step 580102, the controller (1) 130101 determines whether the acquired request relates to "creation of LUs for the virtual storage devices." When the acquired request relates to the "creation of LUs for the virtual storage devices," the operation of a step 580104 is carried out. When the acquired request does not relate to the "creation of LUs for the virtual storage devices," the step is returned.

In the step 580103, the controller (1) 130101 executes the creation of virtual storage devices. The identification information of the created virtual storage devices are transmitted to the storage management server device 100600.

In the step 580104, the controller (1) 130101 executes the creation of LUs for the virtual storage devices. The identification information of the created LUs are transmitted to the storage management server device 100600.

FIG. 48 shows an example of the operation of the physical storage device 100200 performed in response to a request from the storage management server device 100600 according to the present embodiment. Particularly, FIG. 48 shows an example of the operation of the external connection storage management program 130103.

In a step 590100, a request and parameter are acquired from the storage management server device.

In a step 590101, the controller (1) 130101 determines whether or not the acquired request relates to "external connection setting." When the acquired request relates to the "external connection setting," the operation of a step 590103 is executed. When the acquired request does not relate to the "external connection setting," the operation of a step 590102 is executed.

In the step 590102, the controller (1) 130101 determines whether the acquired request relates to "copy." When the acquired request relates to the "copy," the operation of a step 590104 is executed. When the acquired request does not relate to the "copy," the step is returned.

In the step 590103, the controller 130101 establishes the external connection to a specified relocation destination storage device, on a specified relocation source virtual storage device. Thereafter, the access to the relocation destination virtual storage device is made to the relocation source virtual storage device via the external connection.

In the step 590104, the controller 130101 establishes the external connection to the specified relocation destination storage device, on the specified relocation source virtual storage device. Thereafter, the LU is created for the relocation destination virtual storage device, and the data is copied from the relocation source virtual storage device to the LU of the relocation destination virtual storage device.

Figure 49:
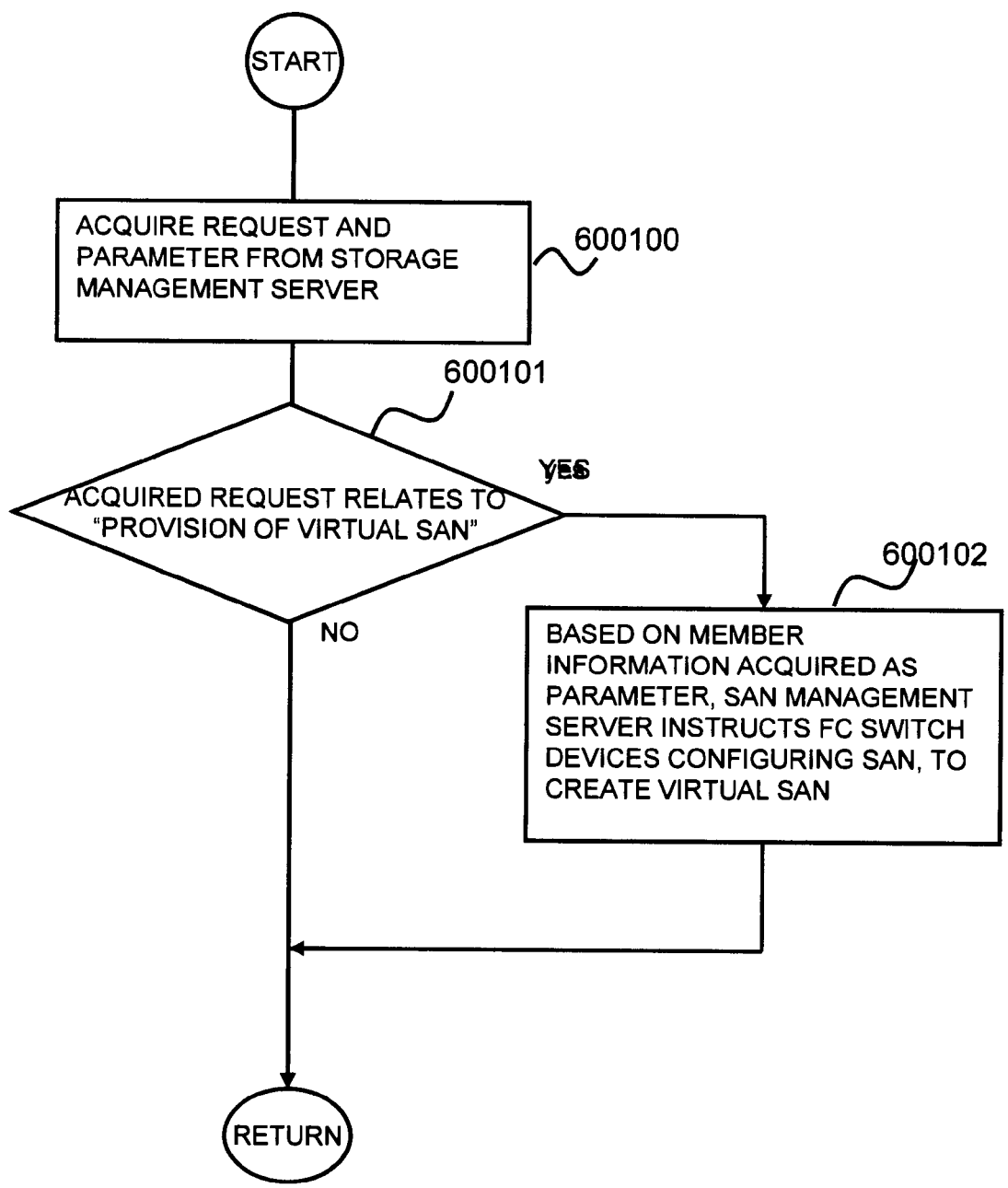
FIG. 49 shows an example of an operation of a SAN management program performed by the SAN management server device according to Embodiment 1.

FIG. 49 shows an example of the operation of the SAN management program 180105 performed by the SAN management server device 100700 according to the present embodiment.

In a step 600100, the SAN management server device 100700 acquires a request and parameter from the storage management server device 100600.

In a step 600101, the SAN management server device 100700 determines whether or not the acquired request relates to "provision of virtual SAN." When the acquired request relates to the "provision of virtual SAN," the operation of a step 600102 is performed. When the acquired request does not relate to the "provision of virtual SAN," the step is returned.

In the step 600102, the SAN management server device 100700 instructs the FC switch devices configuring the SAN to create the virtual SAN, on the basis of the member information acquired as the parameter.

FIGS. 50 and 51 each show an example in which the present embodiment is applied to a BC/DR system 23100.

FIG. 50 shows a configuration example of the BC/DR system 23100 for an extensive disaster, which has a distant backup system (sub-system) (upper diagram). The diagram also shows a configuration example of a BC/DR system 230200 obtained after aggregating one or more pairs of sub-systems according to the present embodiment (lower diagram). The present embodiment is described based on a cold standby system in primary and sub systems. However, a hot standby system may be used, in which case the "stopped" state may be described as a "standby" state. Here, the standby state means a state in which no transaction is received from the outside.

The BC/DR system 23100 before consolidation is provided with a primary site (A) 230101 and a distant sub-site (A) 230103, which are provided with a primary system (A) 230106 and a sub-system (A) 230108, respectively. Further, the primary system 230106 and the sub-system 230108 are connected to each other by a WAN 230105. In a normal condition, the primary system 230106 is operated, but the sub-system 230108 is stopped. The same is true for a primary site (B) and a sub-site (B). In this manner, the BC/DR system 23100 has at least one primary and sub pair described above.

A BC/DR system 230200 obtained after consolidation is a configuration example in which the sub-site is placed in one section and at least one pair of sub-systems 23103, 23104 are consolidated in this section. The at least one pair of sub-systems (A) 230103 and (B) 230104 are the virtual systems (A) 210100 and (B) 210200 shown in FIG. 1. By aggregating the sub-systems, the amount of physical resource (the number of installations, the number of sites) can be reduced, compared to before consolidation. Therefore, the cost reduction is expected in order to realize the BC/DR system.

On the other hand, when the primary site is affected by a disaster, the primary system and the sub-system are switched, and the consolidated sub-systems are operated. When the consolidation intensity of the sub-systems is increased at the time of the disaster affecting the primary site, a plurality of systems are operated by the same physical resource. Therefore, there is a risk of not achieving required performance. In order to avoid such a risk, it is necessary to look at the operating state of the sub-systems, and relocate the non-operated sub-systems to a different physical resource, whereby the present invention can be applied.

FIG. 51 shows an example of how the sub-system 230104 of the disaster-affected primary site (A) 230101 is re-disposed in the BC/DR system after consolidation. A physical device group (1) 230102 and a physical device group (n) 240400 each show a range in which the sub-systems of these groups share physical resources (at least the physical server devices and the physical storage devices). The BC/DR system 240100 shows a state immediately after the primary site (1) 230101 is affected by the disaster. The primary system and the sub-system are switched, consequently the primary system (A) 230106 enters the stopped state, and the sub-system (A) 230103 enters the operated state.

After the sub-system (A) 230103 is operated, the operating condition of the physical device group (1) 230102 is taken into consideration, and then relocation of the sub-system (B) 230104 is determined. Then, the sub-system (B) 230104 is relocated to the other physical device group (n) 240400.

By this relocation, the storage management server device 100600 can reevaluate and re-disposes the repositories of at least one virtual storage device, in conjunction with re-disposition of at least one virtual server device, which is carried out by the virtual server management server device 100500. As a result, particularly when aggregating the sub-systems in the BC/DR system for an extensive disaster, the occurrence of an operational error in re-disposing the repositories of the virtual storage devices can be prevented, whereby the consolidation intensity can be reliably improved.

Note that the embodiments of the present invention are described based on the storage system that adopts a SAN that uses a fiber channel to access storage device data, but the embodiments can be similarly applied to an IP storage system that adopts IP (Internet protocol) communication to access the storage device data, by, for example, reading "SAN" as "IP network," "virtual SAN" as "VLAN," "HBA" as "NIC," "fiber channel port" as "network port," and "WWN" as "IP address."

<Embodiment 2>

In the configuration of Embodiment 1, a table "virtual storage device LU configuration information" 170204 is added to the memory 160101 of the storage management server device 100600 shown in FIG. 8.

In the step 440101 shown in FIG. 33, when the virtual server management server receives an instruction to create the LU to be shared by a plurality of virtual systems from the operator, the storage management server issue an instruction to acquire an identification information of a storage area 604102 on the physical disk where the LU is created. When the storage management server does not issue the instruction, the storage management server issue an instruction to acquire an identification information of a storage area 604102 on the physical disk where the LU has been already created. Moreover, an operation for registering a record corresponding to the created LU in the table "virtual storage device LU configuration information" 170204 is added to the step 440102 shown in FIG. 33.

FIG. 53 shows an example of the virtual storage device LU configuration information 170204 according to the present embodiment. The virtual storage device LU configuration information 170204 is information retaining the configuration information of the LUs of the virtual storage devices. The virtual storage device LU configuration information 170204 has a column "virtual storage device identification information" 610101, a column "virtual storage device LU identification information" 610102, a column "physical storage device identification information" 610103, and a column "identification information of storage area of physical storage device" 610104.

The column "identification information of storage area of physical storage device" 610104 stores identification information of a storage area of a physical disk retaining the data of the LU. The controller may read the identification information of the storage area on the physical disk as a physical LU number.

Figure 52:
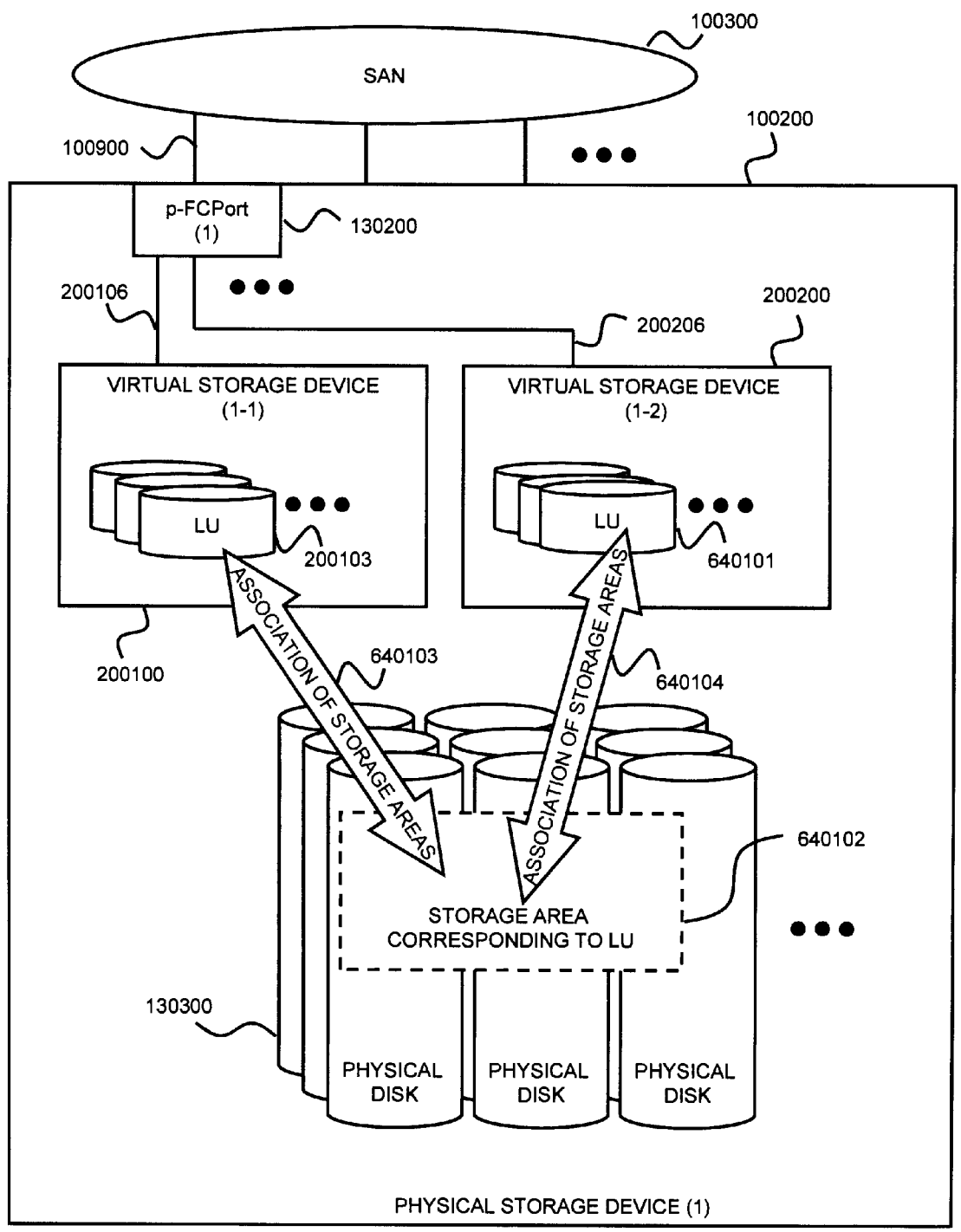
FIG. 52 shows an example of a configuration of a shared LU according to Embodiment 2.

The storage management server device 100600 can determine whether the same storage area on the physical disk 130200 is shared by the entities of the LUs of different virtual storage devices, as shown in FIG. 52. Specifically, the determination is made by searching the table "virtual storage device LU configuration information" 170204 for a record having the same value of a column "identification information of storage area on physical disk".

Sharing of the physical area shown in FIG. 52 is effective when a database is shared by different business systems or when a database or a file is shared for the purpose of a transitional measure for system partition that is caused when a department or a corporate organization is split.

Therefore, "information on virtual storage device 1-2 and on virtual storage devices sharing physical storage area" 400300 shown in FIG. 54 is added to the displayed content 400100 of the advice obtained by means of the virtual storage device repository relocation advice program 170105.

Because the virtual storage devices for relocation and the physical disk are shared, other virtual storage devices that are affected by the relocation of the virtual storage devices can be checked. Consequently, the occurrence of erroneous relocation of the virtual storage devices due to a misunderstanding of the configuration can be prevented.

<Embodiment 3>

Figure 56:
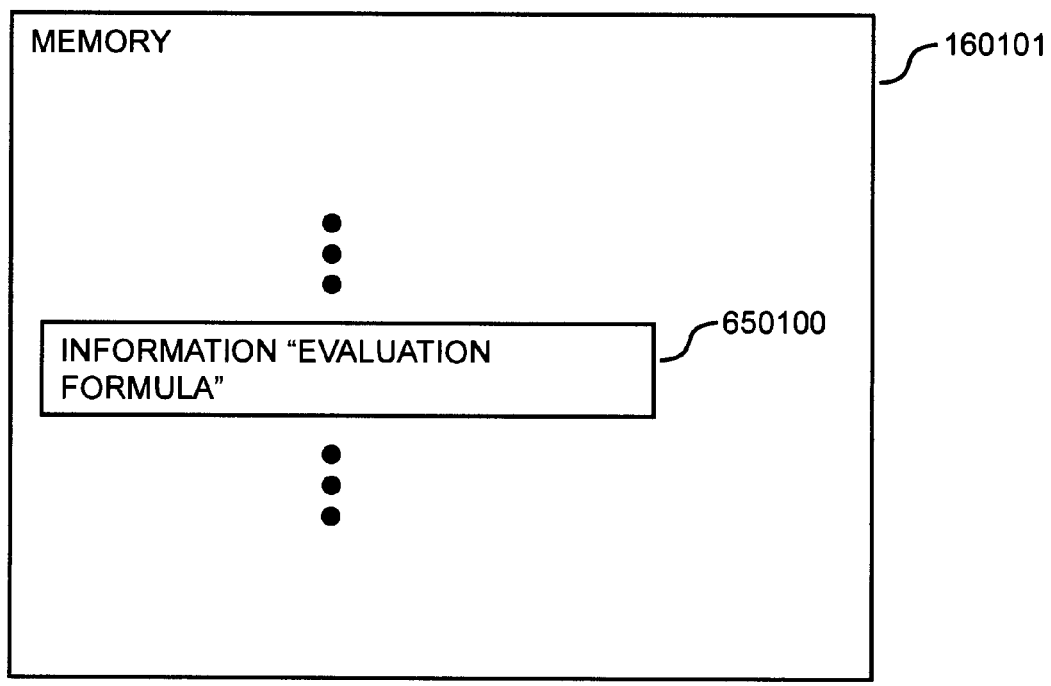
FIG. 56 shows an example of an information "evaluation formula" according to Embodiment 3.
Figure 57:
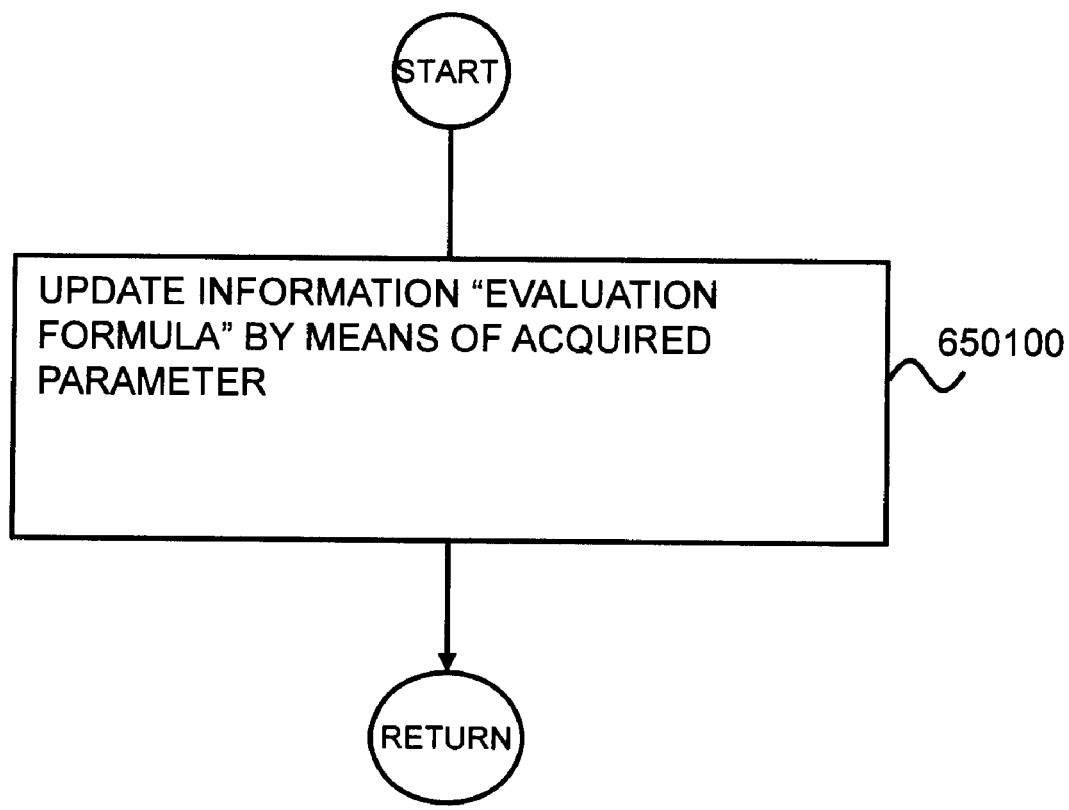
FIG. 57 shows an example of a parameter setting/changing program according to Embodiment 3.

In the configurations of Embodiment 1 and Embodiment 2, information "evaluation formula" 650100 shown in FIG. 56 is added to the memory 160101 of the storage management server device 100600. In conjunction with this, the parameter setting/changing program 170108 is caused to receive a "change of evaluation formula" as a request from the operator, and consequently the operation of a step 650100 shown in FIG. 57 is added.

In the step 650100, the storage management server device 100600 updates the information "evaluation formula" using the parameter acquired from the user, and returns the step.

Furthermore, an evaluation calculating formula that is used in the step 520100 shown in FIG. 41 is changed such that the information "evaluation formula" 650100 of the memory 160101 is used.

When a library (a fragment of an executable program) or the storage management server device has a script execution environment, the contents of the information "evaluation formula" may be text information of the script or information for computing the evaluation formula. Therefore, the evaluation formula can be changed easily for the managers having different operation management policies.

What is claimed is:

1. A computer system, comprising:
a plurality of physical server devices, each of which is configured to provide a virtual server device;
a plurality of physical storage devices, which are coupled to the plurality of physical server devices and each of which is configured to provide a virtual storage device; and
a management server device, which is coupled to the plurality of physical storage devices and is configured to retain
first configuration information relating to a plurality of first virtual server devices included in a first virtual system and disposed in at least one of the plurality of physical server devices and relating to a first virtual storage device included in the first virtual system and disposed in one of the plurality of physical storage devices,
second configuration information relating to a plurality of second virtual server devices included in a second virtual system and disposed in at least one of the plurality of physical server devices and relating to a second virtual storage device included in the second virtual system and disposed in one of the plurality of physical storage devices, and
third configuration information relating to a plurality of third virtual server devices included in a third virtual system and disposed in at least one of the plurality of physical server devices and to a third virtual storage device included in the third virtual system and disposed in any of the plurality of physical storage devices,
wherein the management is configured migrate at least one of the plurality of first virtual server devices to another physical server device by:
calculating a first evaluation value by comparing at least one candidate physical server device in which the plurality of first virtual server devices are disposed with at least one candidate physical server device in which the plurality of second virtual server devices are disposed, based on the first configuration information and the second configuration information, and
calculating a second evaluation value by comparing at least one candidate physical server device in which the plurality of first virtual server devices are disposed, with at least one candidate physical server device in which the plurality of third virtual server devices are disposed, based on the first configuration information and the third configuration information, and
wherein the management server device is configured to instruct the plurality of physical storage devices to migrate the first virtual storage device to another physical storage device, on the basis of the first evaluation value and the second evaluation value.

2. The computer system according to claim 1, further comprising a backup medium configured to store a replication of data stored in a volume assigned to a first virtual computer, wherein
each of the plurality of physical storage devices includes a plurality of storage devices configuring a plurality of logical volumes, a first memory, a controller and a first port, and is configured to assign the plurality of logical volumes, a first virtual memory which is a partial area of the first memory, a virtual controller obtained by logically dividing the controller, and a first virtual port obtained by logically dividing the first port, to the virtual storage devices,
each of the server devices has a second memory, a processor and a second port, and is configured to assign a second virtual memory which is a partial area of the second memory, a virtual processor obtained by logically dividing the processor, and a second virtual port obtained by logically dividing the second port, to the virtual server devices,
the first evaluation value is obtained by dividing a number of one or more candidate physical server devices in which the plurality of first virtual server devices is disposed, the candidate physical server devices being included in at least one candidate physical server device in which the plurality of second virtual server devices are disposed, by a larger one of the number of candidate physical server devices in which the plurality of first virtual server devices are disposed, and a number of candidate physical server devices in which the plurality of second virtual server devices are disposed,
the second evaluation value is obtained by dividing the number of one or more candidate physical server devices in which the plurality of first virtual server devices are disposed, the candidate physical server devices being included in at least one candidate physical server device in which the plurality of third virtual server devices are disposed, by a larger one of the number of candidate physical server devices in which the plurality of first virtual server devices are disposed, and the number of candidate physical server devices in which the plurality of third virtual server devices are disposed,
the management server device further is configured to retain information relating to an assignment order for assigning the plurality of physical storage devices,
the management server device is configured to
compare the first evaluation value with the second evaluation value, and when the first evaluation value is higher than the second evaluation value,
issue an instruction to migrate the first virtual storage device to the physical storage device in which the second virtual storage device is disposed, and when the first evaluation value is equal to the second evaluation value,
refer to the information relating to the assignment order and
issue an instruction to migrate the first virtual storage device to a physical storage device that is high in the assignment order, out of the physical storage device in which the second virtual storage device is disposed and the physical storage device in which the third virtual storage device is disposed,
the management server device further is configured to retain identification information of the first virtual port of the virtual storage device, retain to the identification information and instruct a physical storage device to which the first virtual storage device is migrated to create a virtual storage device that has a first virtual port having the same identifier as the first virtual port of the first virtual storage device, and
wherein
when a number of virtual storage devices in an operated state, out of the virtual storage devices disposed in the physical storage device in which the first virtual storage device is disposed before the migration, is equal to or lower than a threshold value, the management server device is configured to issue an instruction to migrate data stored in a volume assigned to the first virtual storage device before the migration to a logical volume assigned to the created virtual server device, and when the number of virtual storage devices in the operated state, out of the virtual storage devices disposed in the physical storage device in which the first virtual storage device is disposed before the migration, exceeds the threshold value, the management server device is configured to issue an instruction to migrate the data stored in the backup medium to the logical volume assigned to the virtual server created in the physical storage device to which the first virtual storage device is migrated.

3. The computer system according to claim 1, wherein the management server device is configured to compare the first evaluation value with the second evaluation value, and issue an instruction to migrate the first virtual storage device to the physical storage device in which the second virtual storage device is disposed, when the first evaluation value is higher than the second evaluation value.

4. The computer system according to claim 3, wherein the management server device further is configured to retain information relating to an assignment order for assigning the plurality of physical storage devices, compare the first evaluation value with the second evaluation value, and, when the first evaluation value is equal to the second evaluation value, refer to the information relating to the assignment order, and then issue an instruction to migrate the first virtual storage device to a physical storage device that is high in the assignment order and included in the physical storage device in which the second virtual storage device is disposed and the physical storage device in which the third virtual storage device is disposed.

5. The computer system according to claim 3, wherein the first evaluation value is the number of candidate physical server devices in which the plurality of first virtual server devices are disposed, the candidate physical server devices being also included in at least one candidate physical server device in which the plurality of second virtual server devices are disposed, and the second evaluation value is the number of candidate physical server devices in which the plurality of first virtual server devices are disposed, the candidate physical server devices being also included in at least one candidate physical server device in which the plurality of third virtual server devices are disposed.

6. The computer system according to claim 3, wherein the first evaluation value is obtained by dividing a number of one or more candidate physical server devices in which the plurality of first virtual server devices are disposed, the candidate physical server devices being also included in at least one candidate physical server device in which the plurality of second virtual server devices are disposed, by a larger one of the number of candidate physical server devices in which the plurality of first virtual server devices are disposed, and the number of candidate physical server devices in which the plurality of second virtual server devices are disposed, and the second evaluation value is obtained by dividing the number of one or more candidate physical server devices in which the plurality of first virtual server devices are disposed, the candidate physical server devices being also included in at least one candidate physical server device in which the plurality of third virtual server devices are disposed, by a larger one of the number of candidate physical server devices in which the plurality of first virtual server devices are disposed, and the number of candidate physical server devices in which the plurality of third virtual server devices are disposed.

7. The computer system according to claim 3, wherein each of the plurality of physical storage devices includes a plurality of storage devices configuring a logical volume, a memory, a controller and a port, and is configured to assign the logical volume, a virtual memory which is a partial area of the memory, a virtual controller obtained by logically dividing the controller, and a virtual port obtained by logically dividing the port, to the virtual storage devices, the management server device further is configured to retain identification information of the virtual port of the virtual storage device, instruct a physical storage device to which the first virtual storage device is migrated, to create a virtual storage device that has a virtual port having the same identifier as the virtual port of the first virtual storage device, by referring the identification information and instruct to migrate data stored in a volume assigned to the first virtual storage device before the migration, to a logical volume assigned to the created virtual server device.

8. The computer system according to claim 3, further comprising a backup medium configured to store a replication of data stored in a volume assigned to a first virtual computer, wherein each of the plurality of physical storage devices includes a plurality of storage devices configuring a plurality of logical volumes, a memory, a controller and a port, and is configured to assign the plurality of logical volumes, a virtual memory which is a partial area of the memory, a virtual controller obtained by logically dividing the controller, and a virtual port obtained by logically dividing the port, to the virtual storage, the management server device further is configured to retain identification information of the virtual port of the virtual storage device, and instruct a physical storage device to which the first virtual storage device is migrated, to create a virtual storage device that includes a virtual port having the same identifier as the virtual port of the first virtual storage device, by referring to the identification information and, when the number of virtual storage devices in an operated state, out of the virtual storage devices disposed in the physical storage device in which the first virtual storage device is disposed before the migration, exceeds a threshold value, the management server device is configured to issue an instruction to migrate the data stored in the backup medium to the logical volume assigned to the virtual server created in the physical storage device to which the first virtual storage device is migrated.

9. A management method of a management server device configured to manage a plurality of physical storage devices which are coupled to a plurality of candidate physical server devices each providing a virtual server device, and each of which is configured to provide a virtual storage device, the management server device being coupled to the plurality of physical storage devices, wherein the management method comprises the steps of:
retaining, using at least one computer,
first configuration information relating to a plurality of first virtual server devices included in a first virtual system and disposed in at least one of the plurality of candidate physical server devices and relating to a first virtual storage device included in the first virtual system and disposed in one of the plurality of physical storage devices,
second configuration information relating to a plurality of second virtual server devices included in a second virtual system and disposed in at least one of the plurality of candidate physical server devices and relating to a second virtual storage device included in the second virtual system and disposed in one of the plurality of physical storage devices, and
third configuration information relating to a plurality of third virtual server devices included in a third virtual system and disposed in at least one of the plurality of candidate physical server devices and to a third virtual storage device included in the third virtual system and disposed in any of the plurality of physical storage devices;
migrating at least one of the plurality of first virtual server devices to another candidate physical server device by
calculating, using the at least one computer, a first evaluation value by comparing at least one candidate physical server device in which the plurality of first virtual server devices are disposed, with at least one candidate physical server device in which the plurality of second virtual server devices are disposed, based on the first configuration information and the second configuration information, and
calculating, using the at least one computer, a second evaluation value by comparing at least one candidate physical server device in which the plurality of first virtual server devices are disposed, with at least one candidate physical server device in which the plurality of third virtual server devices are disposed, based on the first configuration information and the third configuration information; and
instructing, using the least one computer, the plurality of physical storage devices to migrate the first virtual storage device to another physical storage device, on the basis of the first evaluation value and the second evaluation value.

10. The management method according to claim 9, further comprising the steps of comparing, using the at least one computer, the first evaluation value with the second evaluation value, and issuing an instruction to migrate the first virtual storage device to the physical storage device in which the second virtual storage device is disposed, when the first evaluation value is higher than the second evaluation value.

11. The management method according to claim 10, further comprising the steps of:
retaining, using the at least one computer, information relating to an assignment order for assigning the plurality of physical storage devices,
comparing, using the at least one computer, the first evaluation value with the second evaluation value; and
referring, using the at least one computer, to the information relating to the assignment order when the first evaluation value is equal to the second evaluation value, to issue an instruction to migrate the first virtual storage device to a physical storage device that is high in the assignment order and included in the physical storage device in which the second virtual storage device is disposed and the physical storage device in which the third virtual storage device is disposed.

12. The management method according to claim 10, wherein
the first evaluation value is a number of candidate physical server devices in which the plurality of first virtual server devices are disposed, the candidate physical server devices being included in at least one candidate physical server device in which the plurality of second virtual server devices are disposed, and
the second evaluation value is the number of candidate physical server devices in which the plurality of first virtual server devices are disposed, the candidate physical server devices being included in at least one candidate physical server device in which the plurality of third virtual server devices are disposed.

13. The management method according to claim 10, wherein
the first evaluation value is obtained by dividing the number of one or more candidate physical server devices in which the plurality of first virtual server devices are disposed, the candidate physical server devices being included in at least one candidate physical server device in which the plurality of second virtual server devices are disposed, by a larger one of the number of candidate physical server devices in which the plurality of first virtual server devices are disposed, and the number of candidate physical server devices in which the plurality of second virtual server devices are disposed, and
the second evaluation value is obtained by dividing the number of one or more candidate physical server devices in which the plurality of first virtual server devices are disposed, the candidate physical server devices being included in at least one candidate physical server device in which the plurality of third virtual server devices are disposed, by a larger one of the number of candidate physical server devices in which the plurality of first virtual server devices are disposed, and the number of candidate physical server devices in which the plurality of third virtual server devices are disposed.

14. The management method according to claim 10, wherein each of the plurality of physical storage devices includes a plurality of storage devices configuring a plurality of logical volumes, a memory, a controller and a port, and is configured to assign the plurality of logical volumes, a virtual memory which is a partial area of the memory, a virtual controller obtained by logically dividing the controller, and a virtual port obtained by logically dividing the port, to the virtual storage devices, and
wherein the method further comprises the steps of:
retaining, using the at least one computer, identification information of the virtual port of the virtual storage device;
instructing, using the at least one computer, a physical storage device to which the first virtual storage device is migrated, to create a virtual storage device that has a virtual port having the same identifier as the virtual port of the first virtual storage device, by referring the identification information; and
issuing an instruction to migrate data stored in a volume assigned to the first virtual storage device before the migration, to a logical volume assigned to the created virtual server device.

15. The management method according to claim 10, wherein each of the plurality of physical storage devices includes a plurality of storage devices configuring a plurality of logical volumes, a memory, a controller and a port, and is configured to assign the plurality of logical volumes, a virtual memory serving as a partial area of the memory, a virtual controller obtained by logically dividing the controller, and a virtual port obtained by logically dividing the port, to the virtual storage devices, and wherein the method further comprises the steps of:

retaining, using the at least one computer, identification information of the virtual port of the virtual storage device;

instructing, using the at least one computer, a physical storage device to which the first virtual storage device is migrated, to create a virtual storage device that has a virtual port having the same identifier as the virtual port of the first virtual storage device to the identification information; and issuing, using the at least one computer, an instruction to migrate the data of a backup medium storing a replication of data used by a first virtual computer, to a logical volume assigned to the virtual server created in the physical storage device to which the first virtual storage device is migrated, when the number of virtual storage devices in an operated state, out of the virtual storage devices disposed in the physical storage device in which the first virtual storage device is disposed before the migration, exceeds a threshold value.

* * * * *